United States Patent [19]
Tsuboi et al.

[11] Patent Number: 5,140,582
[45] Date of Patent: Aug. 18, 1992

[54] PACKET SWITCHING SYSTEM HAVING BUS MATRIX SWITCH

[75] Inventors: Mitsuru Tsuboi, Kawasaki; Susumu Tominaga, Yokohama; Akira Takeyama; Satoshi Nojima, both of Tokyo, all of Japan

[73] Assignee: Fujitsu Limited, Dawasaki, Japan

[21] Appl. No.: 516,687

[22] Filed: Apr. 30, 1991

[30] Foreign Application Priority Data

| Aug. 22, 1989 | [JP] | Japan | 1-215745 |
| Sep. 13, 1989 | [JP] | Japan | 1-238204 |
| Dec. 5, 1989 | [JP] | Japan | 1-315588 |
| Jan. 12, 1990 | [JP] | Japan | 2-004790 |

[51] Int. Cl.[5] .......................................... H04Q 11/04
[52] U.S. Cl. ..................................... 370/60; 370/94.1
[58] Field of Search .................... 370/94.1, 60, 60.1, 370/58.1; 340/825.5

[56] References Cited

U.S. PATENT DOCUMENTS

| 4,621,359 | 11/1986 | McMillen | 370/94.1 |
| 4,646,292 | 2/1987 | Okada et al. | 370/94.1 |
| 4,754,451 | 6/1988 | Eng et al. | 370/60 |
| 4,862,454 | 8/1989 | Dias et al. | 370/60 |
| 4,918,686 | 4/1990 | Hayashi et al. | 370/94.1 |

*Primary Examiner*—Douglas W. Olmas
*Assistant Examiner*—Dang T. Ton
*Attorney, Agent, or Firm*—Staas & Halsey

[57] ABSTRACT

A packet switching system having a matrix switch including input packet transfer buses and output packet transfer buses. Transfer buffers or gates are provided at cross points of the input and output packet transfer buses. An input packet is supplied to the matrix switch through a transfer control circuit, and an output packet from the matrix switch is output through the transfer control circuit. The input packet is permitted to be applied to the matrix switch so that each of the output packet transfer buses has only one packet during one packet transfer cycle.

46 Claims, 38 Drawing Sheets

FIG.11B

|  | STATUS INFORMATION | | | TRANSFER REQUEST INFORMATION | | | |
|---|---|---|---|---|---|---|---|
| FROM R#0 | 1 | 0 | 0 | 0 | 0 | 0 | 1 | PACKET |
| FROM R#1 | 0 | 0 | 0 | 0 | 0 | 0 | 0 | PACKET |
| FROM R#2 | 0 | 0 | 0 | 0 | 0 | 1 | 0 | 0 | PACKET |
| FROM R#3 | 0 | 0 | 0 | 1 | 0 | 0 | 0 | 1 | PACKET |
|  | #0 | #1 | #2 | #3 | #0 | #1 | #2 | #3 |

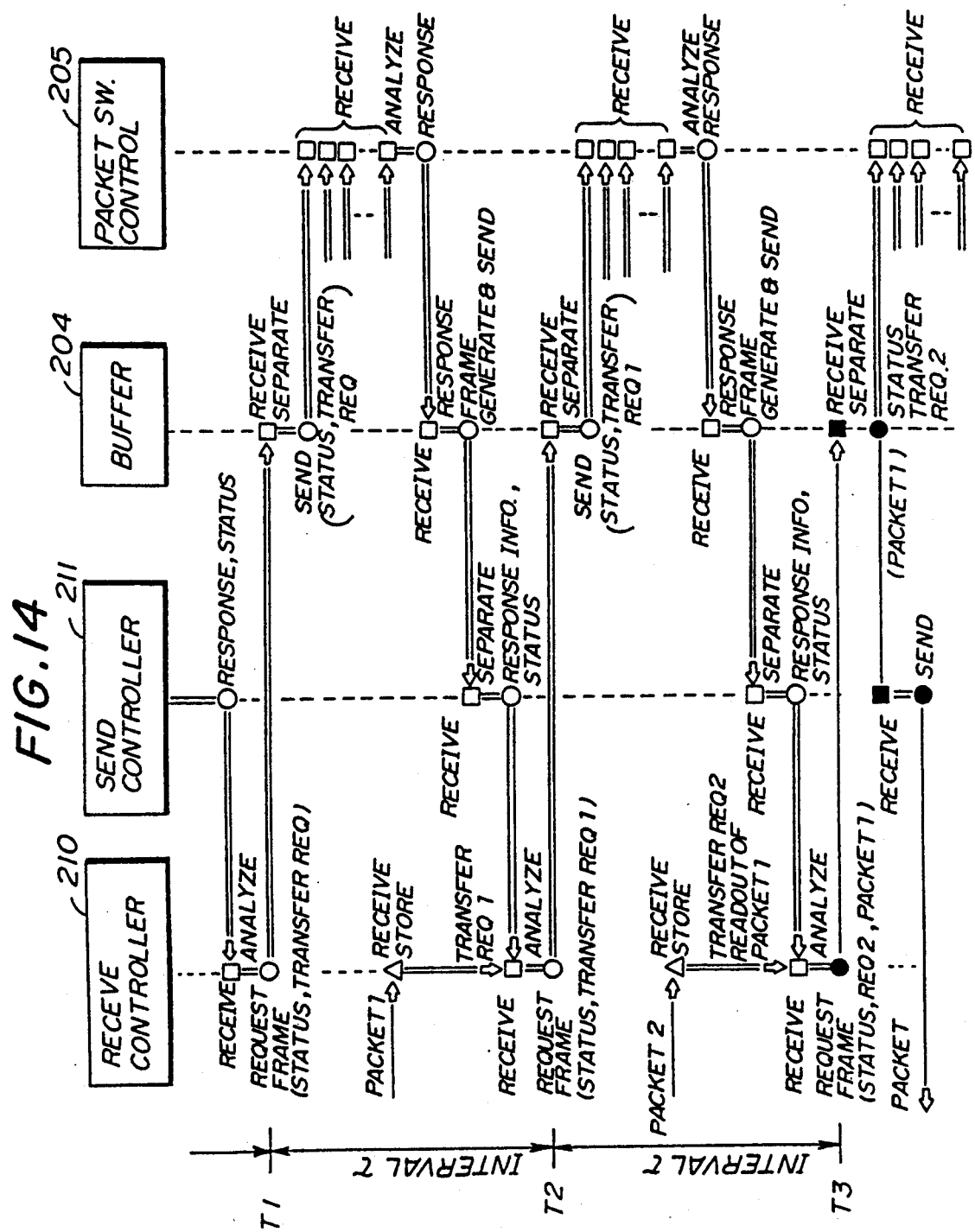

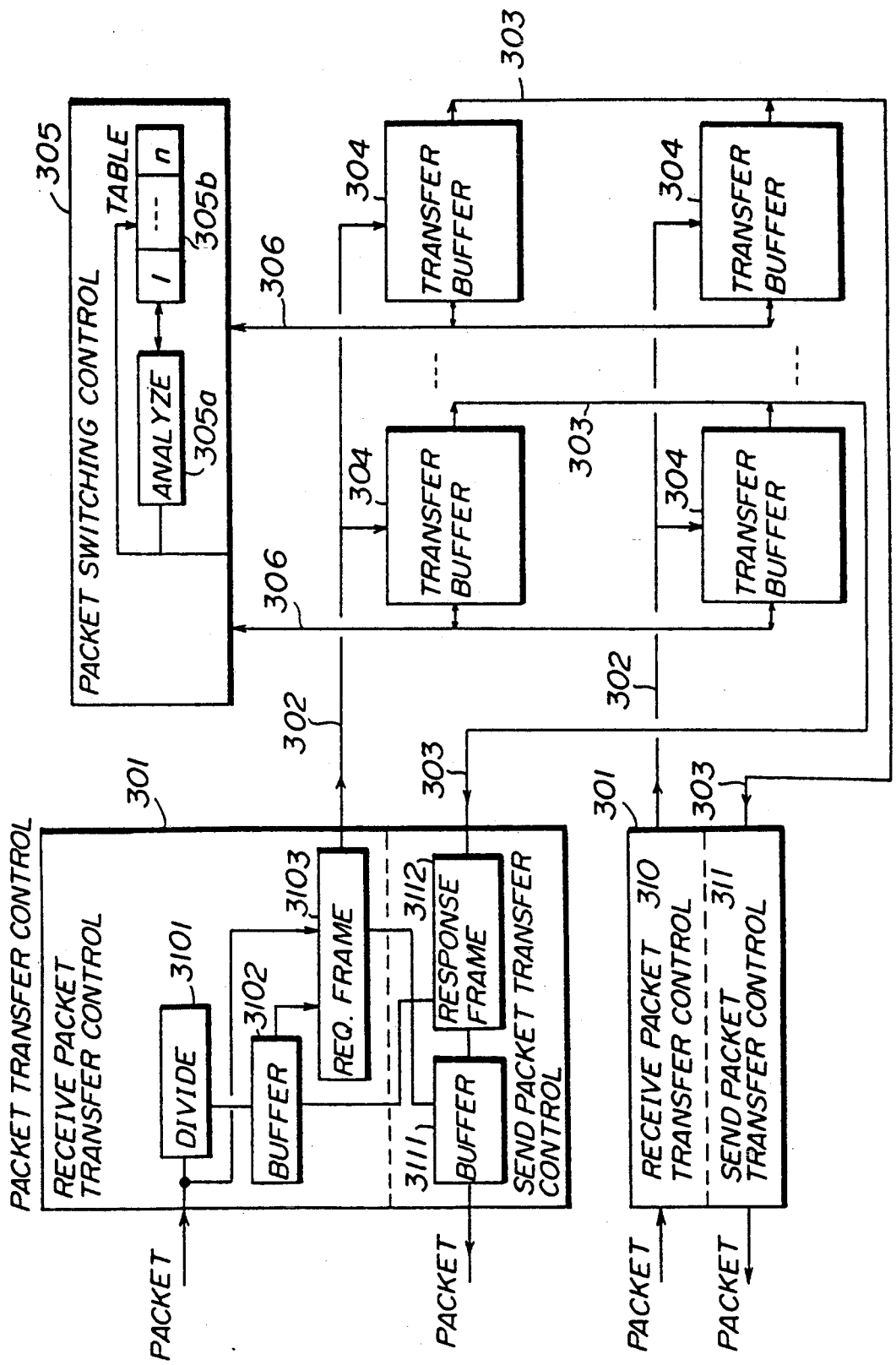

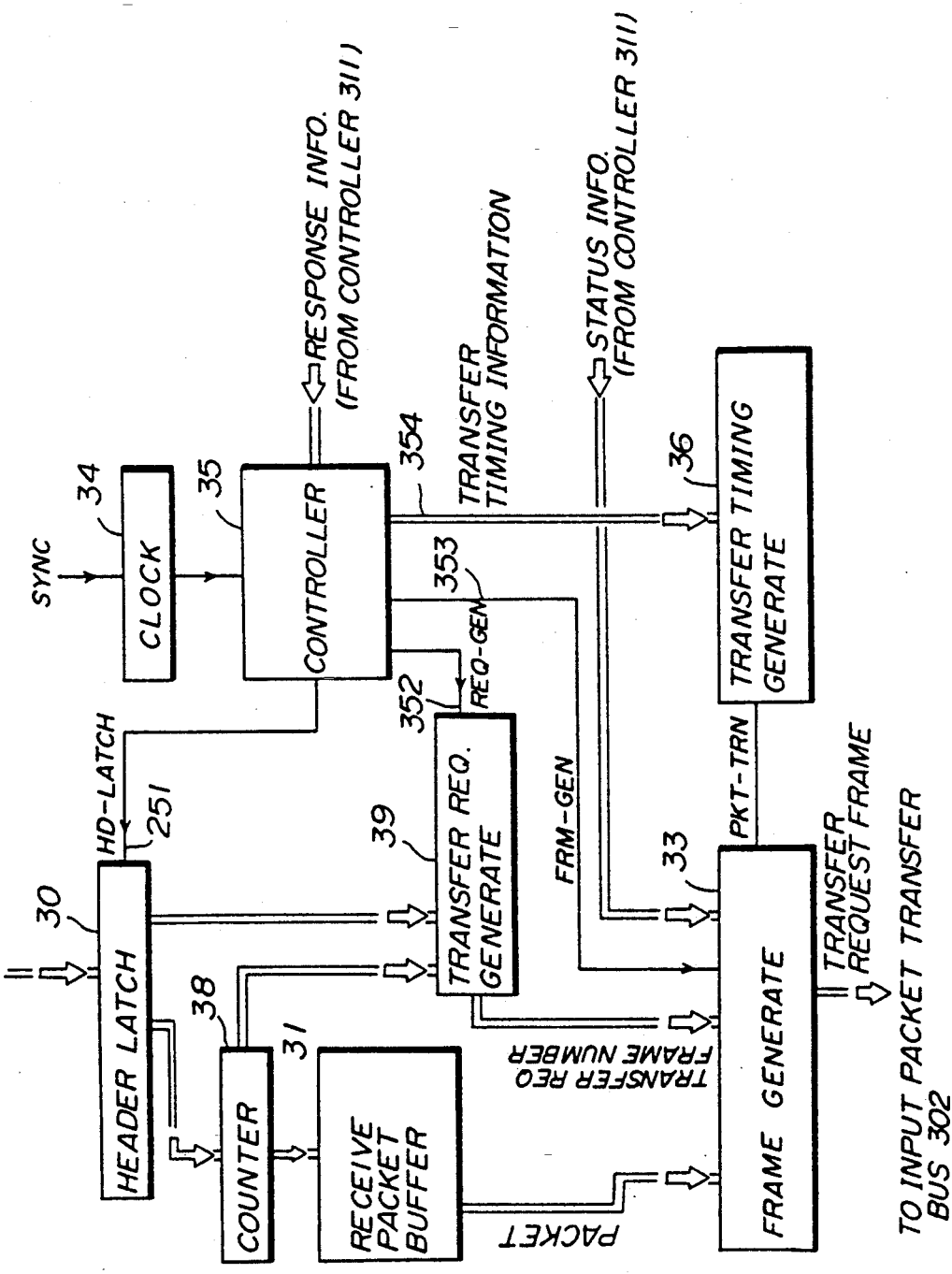

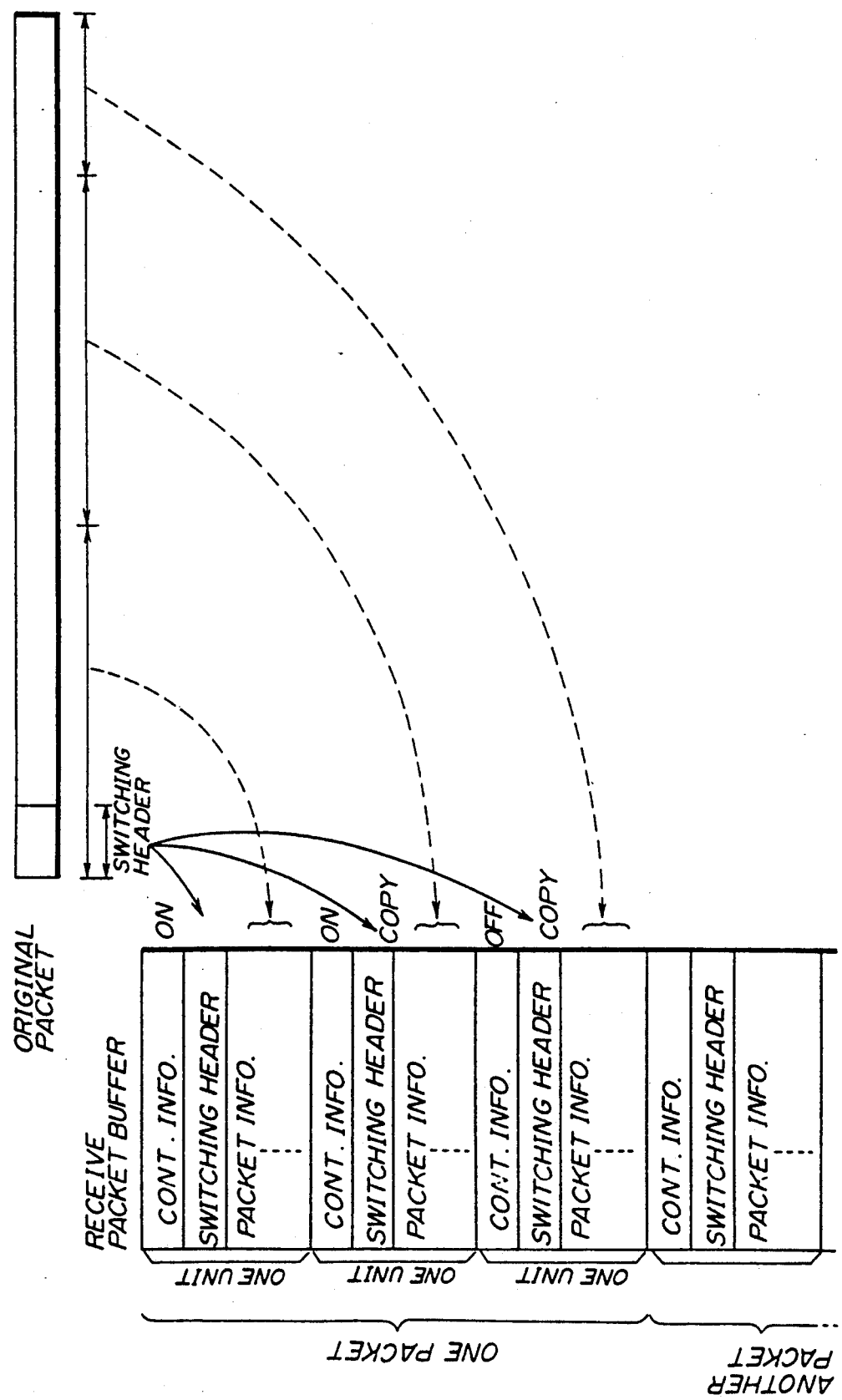

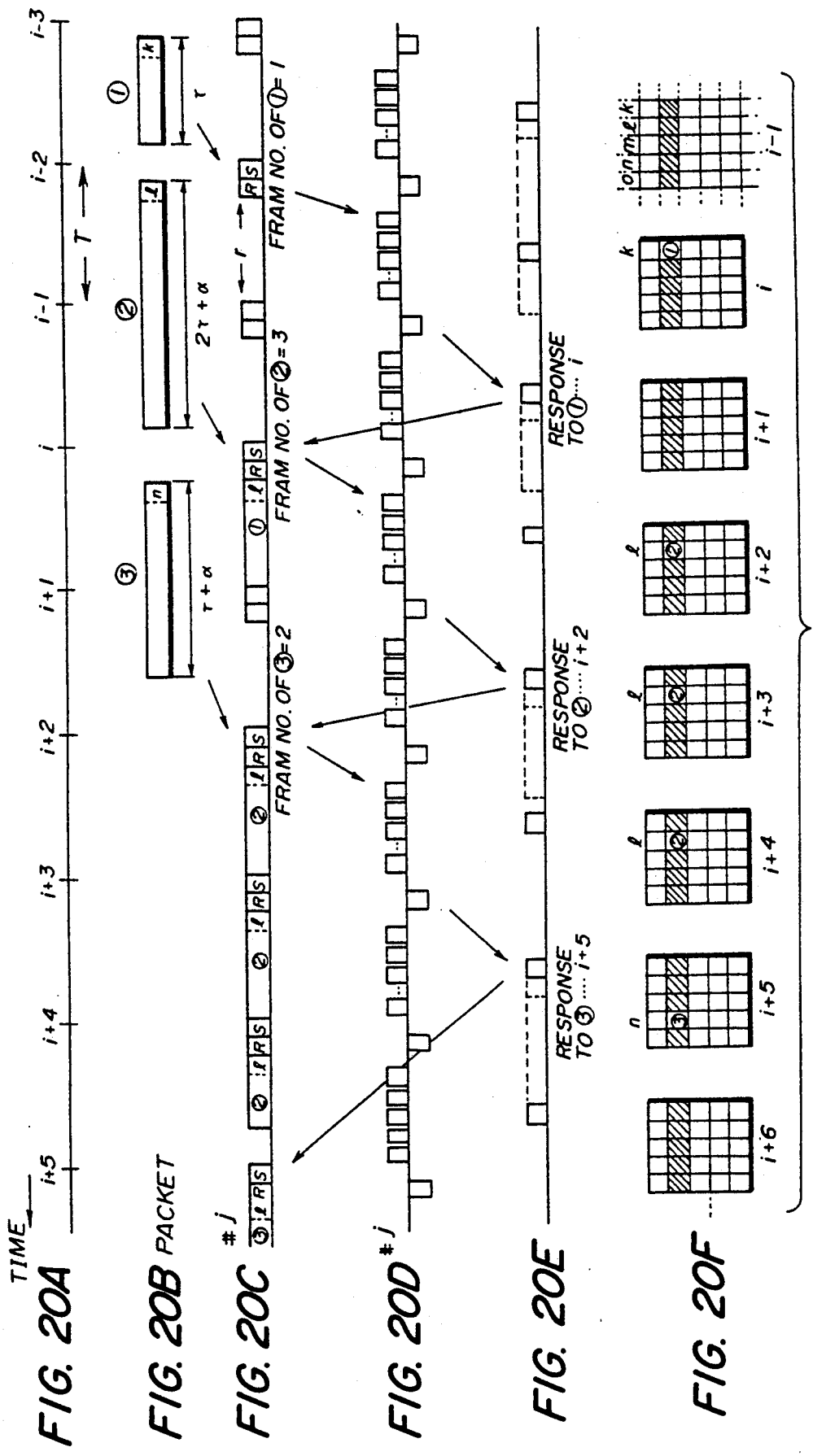

FIG. 21

| TIME | RECEIVE PACKET TRANSFER CONTROLLER | PACKET SWITCHING CONTROLLER | SEND PACKET TRANSFER CONTROLLER |
|---|---|---|---|
| i-3 | RECEIVE PACKET ① { REQ.=k, FRAME NO.=1 } | | |
| i-2 | SEND REQ. TO TRANSFER ① | | |
| i-1 | RECEIVE PACKET ② { REQ.=l, FRAME NO.=3 } | RECEIVE TRANSFER REQ. FOR ① / CALCULATE TRANSFER REQ. FOR ① | |
| i | SEND REQ. TO TRANSFER ② / START TO TRANSFER ① | SEND RESPONSE TO ① | RECEIVE RESPONSE TO ① PERMISSION TIME = i |
| i+1 | RECEIVE PACKET ③ { REQ.=n, FRAME NO.=2 } | RECEIVE TRANSFER REQ. FOR ② / CALCULATE TRANSFER REQ. FOR ② | |
| i+2 | SEND REQ. TO TRANSFER ③ / START TO TRANSFER ② | SEND RESPONSE TO ② | RECEIVE RESPONSE TO ② PERMISSION TIME = i+2 |
| i+3 | ② TRANSFERRING | RECEIVE TRANSFER REQ. FOR ③ / CALCULATE TRANSFER REQ. FOR ③ | |
| i+4 | COMPLETE TRANSFER OF ② | SEND RESPONSE TO ③ | RECEIVE RESPONSE TO ③ PERMISSION TIME = i+5 |
| i+5 | START TO TRANSFER ③ | | |

SEND PACKETS

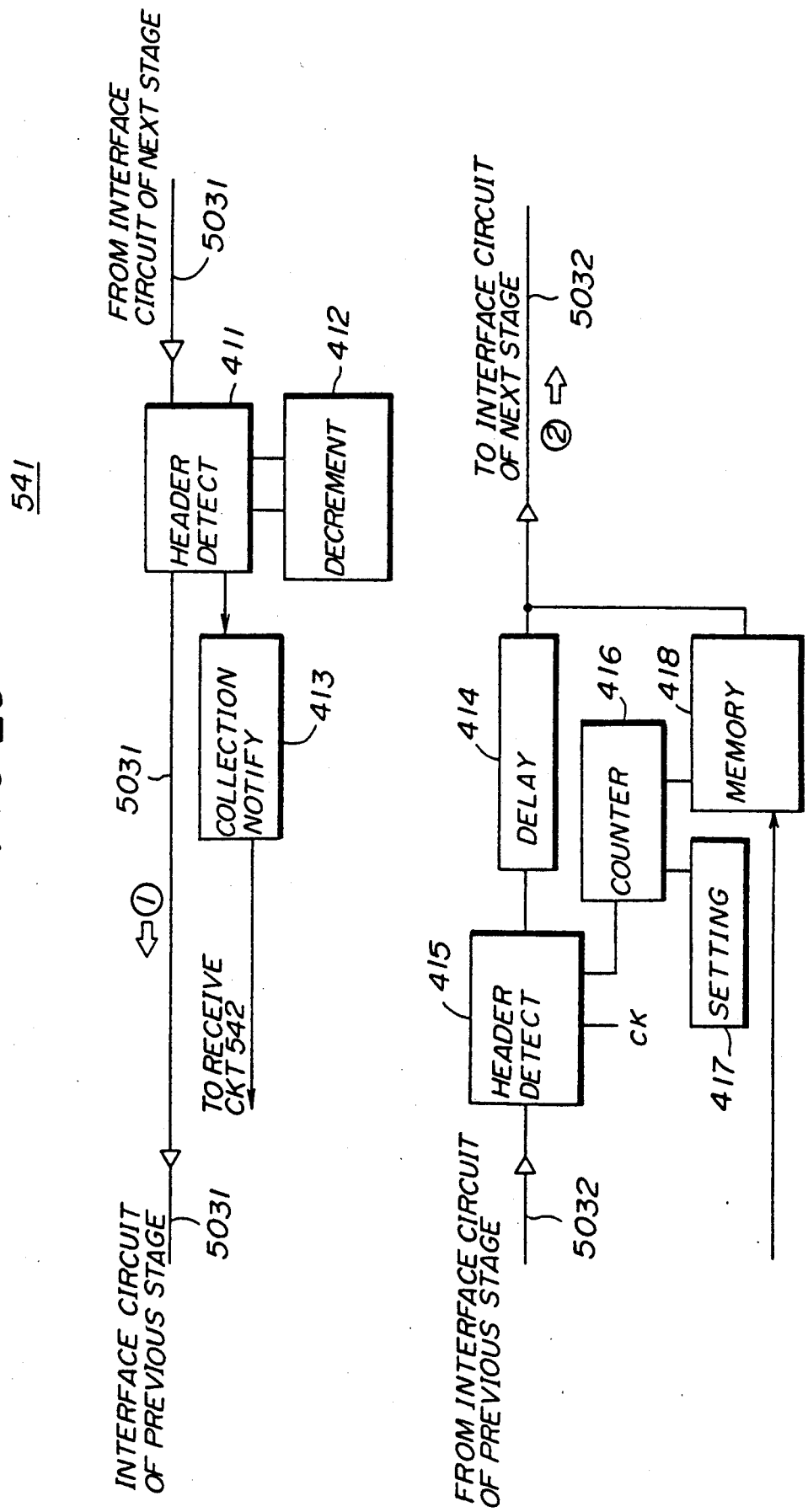

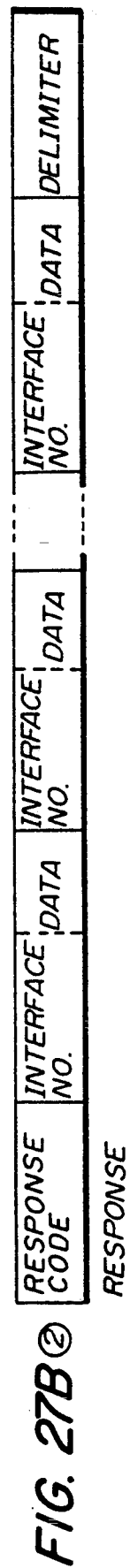
FIG. 27A ① COMMAND
FIG. 27B ② RESPONSE

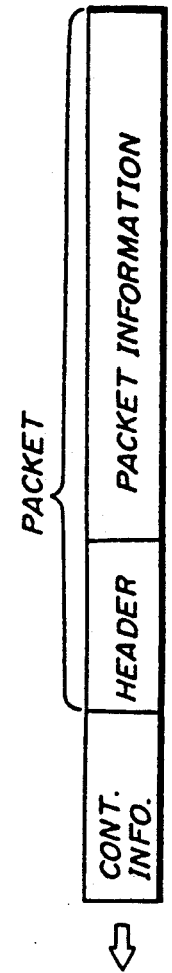
FIG. 34A TRANSFER REQUEST FRAME
FIG. 34B RESPONSE FRAME
FIG. 34C TRANSFER BUS FRAME

PACKET SWITCHING SYSTEM HAVING BUS MATRIX SWITCH

BACKGROUND OF THE INVENTION

The present invention generally relates to a packet switching system having a bus matrix switch, and more particularly to a packet switching system which includes a bus matrix switch having a plurality of buses arranged into a matrix and transfer buffers provided at cross points of the buses.

Recently, a packet switching network for transferring a variety of data has become practical to use. In some packet switching networks, switching of packet data is realized by a matrix switch having buses arranged into a matrix and transfer buffers provided at cross points of the buses. A packet incoming through an input path (bus) is temporarily stored in a transfer buffer and then sent to an output path (bus) connected to a destination terminal. The basic concept of packet switching networks is directed to realizing packet switching by means of parallel processing implemented by hardware as well as simplifying protocols of packet switching so that throughput at switch nodes is improved.

Referring to FIG. 1, there is illustrated a conventional packet switching system which employs a bus matrix switch. The packet switching system shown in FIG. 1 includes packet transfer controllers 100, input packet transfer buses 103, output packet transfer buses 104 and transfer buffers 105 (#00-#nn). One packet controller 100 and one input packet transfer bus 103 are provided for each of the transfer buffers #00-#nn. It will be noted that the first digit of the number assigned to each transfer buffer 105 indicates a corresponding input packet transfer bus, and the second digit thereof indicates one of the transfer buffers connected to the input packet transfer bus indicated by the first digit. Each of the packet transfer controllers 100 is made up of a receive packet transfer controller 101 and a send packet transfer controller 102. The receive packet transfer controller 101 operates independently of the send packet transfer controller 102.

A bus matrix switch is composed of the input packet transfer buses 103, the output packet transfer buses 104 and the transfer buffers 105. A switching operation is as follows. It is now assumed that the receive packet transfer controller 101 of the packet transfer controller 100 labeled #0 receives a packet and sends the same to the input packet transfer bus 103 labeled #0. The packet on the input packet transfer bus 103 is input to the transfer buffer 105 which is connected to the output packet transfer bus 104 to which a destination terminal is connected. The packet is temporarily stored in the transfer buffer being considered and is then sent to the send packet transfer controller 102 through the corresponding output packet transfer bus 104.

The packet sent to the input packet transfer bus 103 includes information (packet header) representative of a destination terminal to which the present packet is to be sent. When the above-mentioned information is detected by the transfer buffer 105 connected to the output packet transfer bus 104 to which the destination terminal is connected, it becomes possible for the transfer buffer 105 being considered to enter the packet. Then the packet is read out from the transfer buffer 105 and then sent to the corresponding send packet transfer controller 102. Then the packet is sent to the destination terminal from the send packet transfer controller 102.

The above-mentioned prior packet switching system in FIG. 1 has disadvantages as described below. The packet switching system handles a variety of data. When the packet switching system processes a large amount of multi-media data, the following problems take place. In many cases, multi-media data is generated in the form of burst. Thus, it is difficult to estimate the distribution of generated multi-media data on the time base. From this point of view, there is a possibility that the traffic concentrates at a specific transfer buffer in the bus matrix switch. When the traffic concentrates at a specific transfer buffer, it overflows with packets and thus some packets are destroyed or lost (hereafter this is referred to as blocking). In order to overcome this problem, it is necessary to use transfer buffers having a large capacity and control the traffic so as to be sufficiently small on the input side of the bus matrix switch. However, the use of large-capacity transfer buffers needs an increased scale of hardware. In addition, the storage capacity of each transfer buffer is proportional to the number of input packet transfer buses 103. When the system is expanded so that new input packet transfer buses are added, the storage capacity of each transfer buffer must be increased depending on the number of the added input packet transfer buses. Thus, it is desired that the system be expanded without increasing the storage capacity of each transfer buffer.

SUMMARY OF THE INVENTION

It is a general object of the present invention to provide an improved packet switching system having a bus matrix switch in which the aforementioned disadvantages are eliminated.

A more specific object of the present invention is to provide a packet switching system preventing the occurrence of traffic concentration without using transfer buffers having a large capacity and an increased scale of hardware.

The above-mentioned objects of the present invention are achieved by a packet switching system comprising:

input packet transfer buses;

output packet transfer buses, the input packet transfer buses and the output packet transfer buses being arranged into a matrix;

transfer means for transferring packets from the input packet transfer buses to the output packet transfer buses;

packet receiving means, provided for each of the input packet transfer buses, for receiving an input packet to be switched, the packet receiving means including at least one packet buffer storing the input packet;

management means, coupled to the packet receiving means, for managing a status of the packet buffer and for controlling the packet receiving means provided for each of the input packet transfer buses so that the input packet is stored in the packet buffer which is not busy;

selecting means, provided for the packet receiving means provided for each of the input packet transfer buses, for selecting one of the packet receiving means for each of the output packet transfer buses used for a next packet transfer cycle in response to a select signal; and control means, operatively coupled to the packet receiving means and the selecting means, for selecting the packet receiving means provided for each of the input packet transfer buses so that each of the output packet transfer buses has only one packet transferred from the packet receiving means via the transfer means during one packet transfer cycle.

The above-mentioned objects of the present invention are also achieved by a packet switching system comprising:

input packet transfer buses;

output packet transfer buses, the input packet transfer buses and the output packet transfer buses being arranged into a matrix;

transfer means for transferring packets from the input packet transfer buses to the output packet transfer buses;

packet receiving means, provided for each of the input packet transfer buses, for receiving an input packet to be switched, the packet receiving means including packet buffers each provided for a corresponding one of the output packet transfer buses and storing the input packet;

management means, coupled to the packet receiving means, for managing a status of each of the packet buffers and for controlling the packet receiving means so that the input packet is stored in one of the packet buffers which is not busy;

selecting means, provided for the packet receiving means provided for each of the input packet transfer buses, for selecting one of the packet buffers used for a next packet transfer cycle in response to a select signal; and control means, operatively coupled to the packet buffers and the selecting means, for determining whether or not each of the packet buffers has any packet and for generating the select signal which selects one of the packet buffers which has the input packet so that each of the output packet transfer buses has only one packet transferred from the packet receiving means via the transfer means during one packet transfer cycle.

The aforementioned objects of the present invention are also achieved by a packet switching system comprising:

a matrix switch including input packet transfer buses, output packet transfer buses and a plurality of transfer buffers provided for cross points of the input packet transfer buses and the output packet transfer buses arranged into a matrix, each of the transfer buffers temporarily storing an inputs packet from a corresponding one of the input packet transfer buses and then outputting, as an output packet, the input packet to a corresponding one of the output packet transfer buses;

a plurality of packet transfer controllers each connected to a corresponding one of the input packet transfer buses and a corresponding one of the output packet transfer buses, each of the plurality of packet transfer controllers including input packet transfer control means for storing the input packet supplied from an input bus and for sending the input packet to the corresponding one of the input packet transfer buses in accordance with response information, and output packet transfer control means for storing the output packet from the corresponding one of the output packet transfer buses and for sending the output packet to an output bus;

transfer request frame generating means, provided for each of the packet transfer controllers, for generating a transfer request frame including transfer request information indicating whether or not the input packet transfer control means has any packet requesting to be transferred to a destination coupled to the packet switching system and status information indicating whether or not the output packet transfer control means paired with the input packet transfer control means is busy; and packet switching control means, operatively coupled to the plurality of packet transfer controllers, for receiving the transfer request frame from the transfer request frame generating means provided for each of the packet transfer controllers and for generating, on the basis of the transfer request frame, the response information indicative of a transfer timing with which the input packet transfer control means provided for each of the plurality of packet transfer controllers sends the input packet to the corresponding one of the input packet transfers.

The aforementioned objects of the present invention are also achieved by a packet switching system comprising:

a matrix switch including input packet transfer buses, output packet transfer buses and a plurality of transfer buffers provided for cross points of the input packet transfer buses and the output packet transfer buses arranged into a matrix, each of the transfer buffers temporarily storing an inputs packet from a corresponding one of the input packet transfer buses and then outputting, as an output packet, the input packet to a corresponding one of the output packet transfer buses;

a plurality of packet transfer controllers each connected to a corresponding one of the input packet transfer buses and a corresponding one of the output packet transfer buses, each of the plurality of packet transfer controllers including input packet transfer control means for storing the input packet supplied from an input bus and for sending the input packet to the corresponding one of the input packet transfer buses in accordance with response information, and output packet transfer control means for storing the output packet from the corresponding one of the output packet transfer buses and for sending the output packet to an output bus;

transfer request frame generating means, provided for each of the packet transfer controllers, for generating a transfer request frame including information indicative of a number of packet frames obtained by dividing the input packet for every predetermined length, transfer request information indicating whether or not the input packet transfer control means has any packet requesting to be transferred to a destination coupled to the packet switching system and status information indicating whether or not the output packet transfer control means paired with the input packet transfer control means is busy; and packet switching control means, operatively coupled to the plurality of packet transfer controllers, for receiving the transfer request frame from the transfer request frame generating means provided for each of the packet transfer controllers and for generating, on the basis of the transfer request frame, the response information indicative of a transfer timing with which the input packet transfer control means provided for each of the plurality of packet transfer controllers continuously sends the packet frames forming the input packet to the corresponding one of the input packet transfers.

The aforementioned objects of the present invention are also achieved by a packet switching system comprising:

a matrix switch including input packet transfer buses, output packet transfer buses and a plurality of transfer buffers provided for cross points of the input packet transfer buses and the output packet transfer buses arranged into a matrix, each of the transfer buffers temporarily storing an inputs packet from a corresponding one of the input packet transfer buses and then outputting, as an output packet, the input packet to a corresponding one of the output packet transfer buses;

a plurality of bus controllers each connected to a corresponding one of the input packet transfer buses and a corresponding one of the output packet transfer buses and connected to an input bus, an output bus and a collection control bus;

a plurality of interface circuits which are tandem-connected to each other and are connected to the input bus and the output bus, each of the interface circuits including status information generating means for generating status information whether or not there is any packet requesting to be switched by the matrix switch and for outputting the status information to the collection control bus;

a plurality of terminals each provided for a corresponding one of the interface circuits; and control means, coupled to the bus controllers and the matrix switch, for controlling the matrix switch on the basis of the interface circuit status information supplied from the collection control bus through the bus controllers and a status of the matrix switch so that the input packet passing through the input bus, a corresponding one of the bus controllers and the corresponding one of the input packet transfer buses is transferred to the output bus related to one of the bus controllers through one of the transfer buffers, one of the output packet transfer buses and the one of the bus controllers.

The aforementioned objects of the present invention are also achieved by a packet switching system comprising:

a matrix switch including input packet transfer buses, output packet transfer buses and a plurality of transfer buffers provided for cross points of the input packet transfer buses and the output packet transfer buses arranged into a matrix, each of the transfer buffers temporarily storing an inputs packet from a corresponding one of the input packet transfer buses and then outputting, as an output packet, the input packet to a corresponding one of the output packet transfer buses;

a plurality of packet transfer controllers each connected to a corresponding one of the input packet transfer buses and a corresponding one of the output packet transfer buses, each of the plurality of packet transfer controllers including input packet transfer control means for storing the input packet supplied from an input bus and for sending the input packet to the corresponding one of the input packet transfer buses in accordance with response information, and output packet transfer control means for storing the output packet from the corresponding one of the output packet transfer buses and for sending the output packet to an output bus;

transfer request frame generating means, provided for each of the packet transfer controllers, for generating a transfer request frame including transfer request information indicating whether or not the input packet transfer control means has any packet requesting to be transferred to a destination coupled to the packet switching system and status information indicating whether or not the output packet transfer control means paired with the input packet transfer control means is busy;

a control bus coupled to the transfer request frame generating means provided for each of the packet transfer controllers; and packet switching control means, operatively coupled to the plurality of packet transfer controllers and connected to the control bus, for receiving the transfer request frame from the transfer request frame generating means provided for each of the packet transfer controllers through the control bus and for generating, on the basis of the transfer request frame, the response information indicative of a transfer timing with which the input packet transfer control means provided for each of the plurality of packet transfer controllers sends the input packet to the corresponding one of the input packet transfers, the response information being sent to the transfer request frame generating means through the control bus.

BRIEF DESCRIPTION OF THE DRAWINGS

Other objects, features and advantages of the present invention will become apparent from the following detailed description when read in conjunction with the accompanying drawings, in which:

FIG. 11B is a diagram illustrating an example of a transfer request frame;

FIG. 14 is a diagram illustrating an operating sequence realized by the packet switching system according to the second embodiment of the present invention shown in FIG. 5;

FIG. 15 is a block diagram of a packet switching system according to a third preferred embodiment of the present invention;

FIG. 17 is a block diagram of a receive packet transfer controller used in the packet switching system shown in FIG. 15;

FIG. 18 is a block diagram illustrating how to divide an input packet into a plurality of packet frames and manage the packet frames in the packet switching system shown in FIG. 15;

FIGS. 20A-20F are a diagram showing an operating sequence according to the third embodiment of the present invention shown in FIG. 15;

FIG. 21 is a diagram showing status of structural elements shown in FIG. 15;

FIG. 26 is a block diagram of a filter circuit in the interface circuit shown in FIG. 23;

FIGS. 27A-27B are a diagram showing formats of a command and a response used in the packet switching system shown in FIG. 23;

FIGS. 34A-34C are a diagram illustrating formats of frames used in the packet switching system shown in FIG. 32;

DESCRIPTION OF THE PREFERRED EMBODIMENTS

Figure 1:
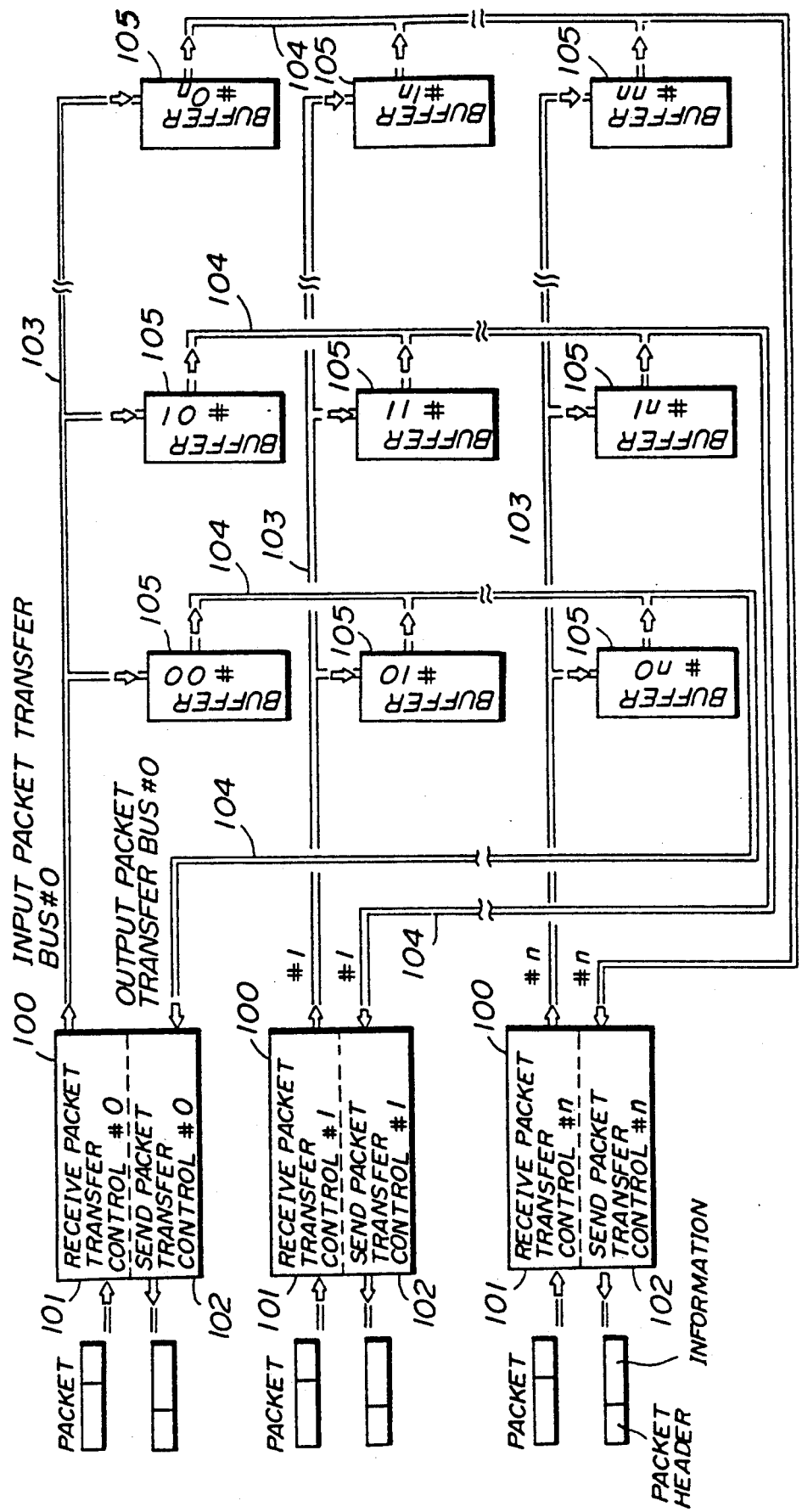
FIG. 1 is a block diagram of a conventional bus matrix switching system.

A description will now be given of a packet switching switching system according to a first preferred embodiment of the present invention with reference to FIG. 2. The packet switching system shown in FIG. 2 includes input ports $2i$ ($i=1, 2, \ldots, n$), input packet transfer buses (buses) $6_1-6_n$, output packet transfer buses (buses) $8_1-8_n$, selectors $18_1-18_n$, output ports $10_1-10_n$, a queue management block 16, and an output packet transfer bus scheduler 20 (hereafter simply referred to as a scheduler). The input port $2_1$ includes a buffer memory $12_1$ for temporarily storing queue packet inputs, and packet buffers $14_{11}-14_{1n}$ equal in number to the output packet transfer buses $8_1-8_n$. The packet buffers $14_{11}-14_{1n}$ are connected to an output terminal of the buffer memory $12_1$ and stores packets to be transferred to the output packet transfer buses $8_1-8_n$, respectively. Each of the packet buffers $14_1-14_n$ has an output terminal through which idle/busy information is sent to the scheduler 20, and an inhibit input terminal through which an output inhibit signal is applied from the scheduler 20. Each of the input ports $2_2-2_n$ is configured in the same way as the input port $2_1$. The queue management block 16 controls the buffer memory $12_1$ and the packet buffers $14_1-14_n$ so that a packet stored in the packet memory $12_1$ is transferred to an idle packet buffer among the packet buffers $14_1-14_n$. The other input ports $2_2-2_n$ are controlled by the queue management block 16 in the same way. Each of the selectors $18_1-18_n$ is provided for a corresponding one of the input ports $2_1-2_n$. Each selector $18_i$ is controlled so as to select one of the packet buffers $14_{11}-14_{1n}$ by an input port select information supplied from the scheduler 20. The scheduler 20 receives the idle/busy information from the packet buffers $14_{i1}-14_{in}$ of the input ports $2i$ ($i=1, 2, \ldots, n$) and selects an input port to be used for the next packet switching from among the input ports $2_1-2_n$ on the basis of the received idle/busy information and sends input port select information to the selected input port.

Packets which are input to the input port $2_i$ are individually provided with switching information and are accumulated in turn in the buffer memory $12_i$ for storing queue input packets. Switching information indicates the output port to which the corresponding packet is to be transferred. Each packet read out from the buffer memory $12_i$ is written into an idle packet buffer $14_{ij}$ (j is one of the numbers $1, 2, \ldots, n$ and indicates that the packet buffer being considered is idle) selected from among the packet buffers under the control of the queue management block 16.

Out of the packet buffers $14_{11}-14_{nn}$, the scheduler 20 refers to, for every transfer cycle, idle/busy information about packet buffers other than packet buffers which are in an inhibit mode where packets are inhibited from being transferred. Then the scheduler 20 derives input port/buffer select information on the basis of the idle/busy information and sends the same to the corresponding selector or selectors. It is possible to select a maximum of n input ports $2_1-2_n$ at the same time. When each selector receives the input port select information, one of the packets stored in packet buffers which are not in the inhibit mode is output to the corresponding input packet transfer bus $6_i$. The packet output on each of the input packet transfer buses $6_1-6_n$ is output to the output packet transfer bus which is designated by the switching information added to the packet.

In the above-mentioned manner, the packet output from the selector is supplied to the corresponding one of the packet output transfer buses $8_i$ at one time. In other words, each of the packet output transfer buses has one packet at one time. As a result, it becomes possible to transfer a packet from one of the input packet transfer buses $6_i$ to one of the output packet transfer buses $8_1$ without using a transfer buffer. Thus, the occurrence of the aforementioned blocking can be prevented. Alternatively, it is possible to provide each of the input ports $2_1$-$2_n$ with at least one packet buffer so that each of said output packet transfer buses has only one packet transferred from said packet receiving means via said transfer means during one packet transfer cycle.

Figure 2:
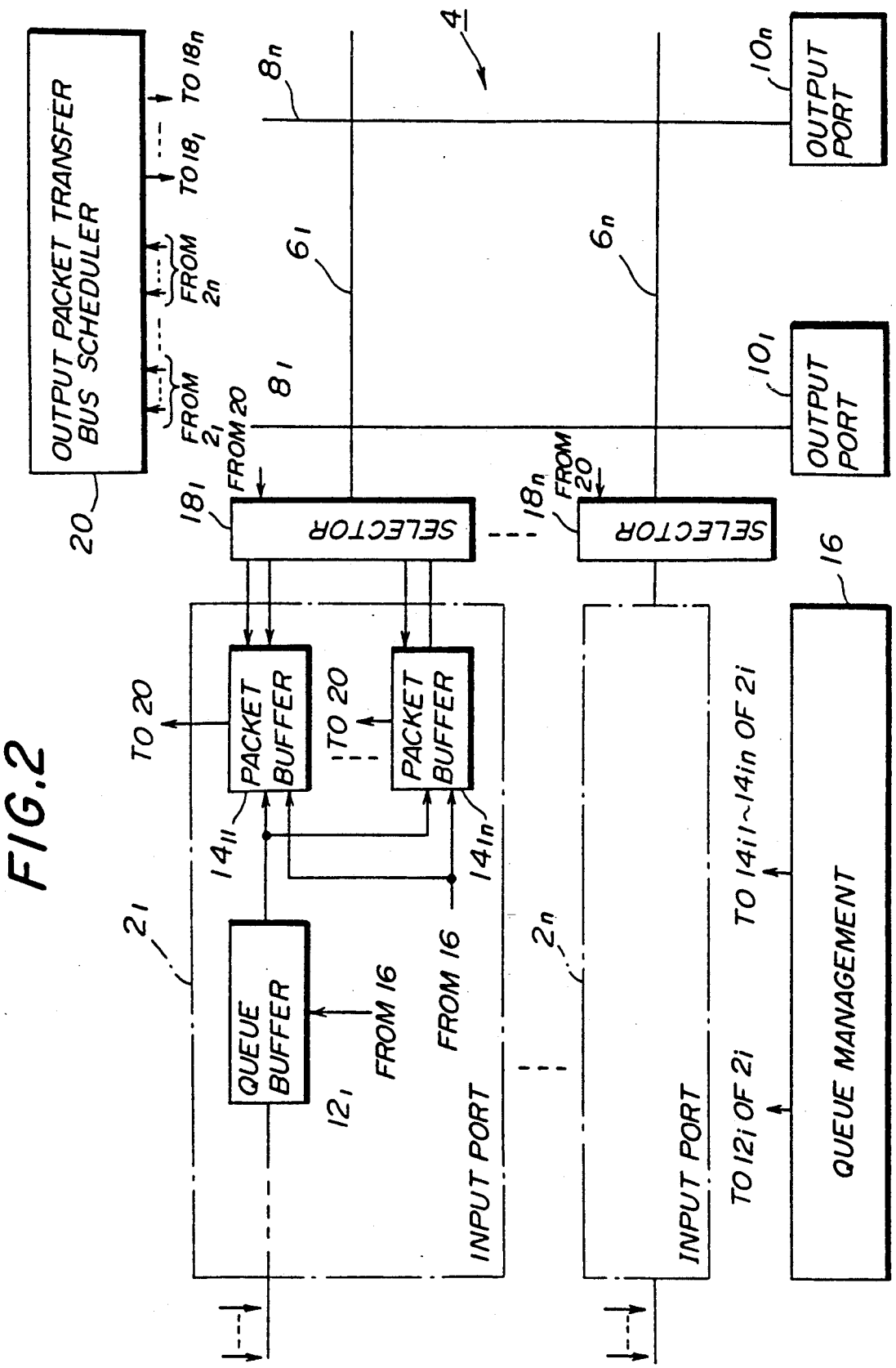
FIG. 2 is a block diagram illustrating the principle of a packet switching system according to a first preferred embodiment of the present invention.

A description will now be given of a detailed structure of the first embodiment of the present invention with reference to FIG. 3, in which those parts which are the same as those shown in FIG. 2 are given the same reference numerals. The configuration shown in FIG. 3 has a 2×2 bus matrix switch. Input transmission lines $1_1$ and $1_2$ are connected to packet input processing blocks $11_1$ and $11_2$ of the input port $2_1$ and $2_2$, respectively. The scheduler 20 shown in FIG. 2 is made up of two schedulers 21 and 22 provided for the output packet transfer buses $8_1$ and $8_2$, respectively. Cross points of the output packet transfer buses $8_1$ and $8_2$ and the input packet transfer buses $6_1$ and $6_2$ are provided with transfer buffers (not shown) necessary only to absorb asynchronization therebetween. Thus, in a system having an asynchronization bus structure, gate circuits having the function of simply passing packets are used in place of transfer buffers.

The input ports $2_1$ and $2_2$ establish an interface with the input packet transfer buses $1_1$ and $1_2$ to which terminals or transmission lines are connected. Alternatively, transmission lines are connected directly to each input port. In addition to the packet input processing block $11_1$, the input port $2_1$ includes the buffer memory $12_1$ and two packet buffers $14_{11}$ and $14_{12}$ related to the output packet transfer buses $8_1$ and $8_2$, respectively. Similarly, the input port $2_2$ includes the buffer memory $12_2$ and two packet buffers $14_{21}$ and $14_{22}$ related to the output packet transfer buses $8_1$ and $8_2$, respectively. Each of the packet buffers $14_{11}$-$14_{22}$ has a storage capacity equal to one packet. The queue management block 16 controls the buffer memories $12_1$ and $12_2$, and the packet buffers $14_{11}$-$14_{22}$.

Each of the packet input processing blocks $11_1$ and $11_2$ determines an output port to which each packet is to be sent, and adds switching information representative of the destination (the number of bus to be used) to each packet. This function is conventional and is realized by referring to a packet header of each packet. Each packet with the switching information added is input to a corresponding one of the buffer memories $12_1$ and $12_2$. Each of the buffer memories $12_1$ and $12_2$ has a capacity which amounts to a predetermined number of packets. Each of the packet buffers $14_{11}$-$14_{22}$ has idle/busy information representative of whether or not the packet buffer being considered has a packet. The idle/busy information related to each of the packet buffers $14_{11}$-$14_{22}$ is referred to the corresponding one of either the schedulers 21 or 22. The selectors $18_1$ and $18_2$ receive individual input port select information from the packet scheduler 20 and hold the same therein. The selectors $18_1$ and $18_2$ individually execute a packet select and output control and an inhibit signal output control in accordance with the received input port select information. In the packet select and output control, one of the packet buffers $14_1$ and $14_2$ is selected and a packet stored therein is output to the corresponding input packet transfer bus. In the inhibit signal output control, the other other buffer is prevented from outputting the packet stored therein.

The scheduler 21 for the output packet transfer bus #1 is connected to the scheduler 22 for the output packet transfer bus #2 through coupling lines 23 and 24 so that a control system is configured. In this control system, either one of the scheduler 21 or the scheduler 22 operates. The scheduler which is operating (selected) receives idle/busy information from the packet buffers $14_{11}$-$14_{22}$ and selects at least one of the input ports $2_1$ and $2_2$ which is to be used during the next cycle. The input port select information representative of this input port to be selected is sent to the related selector and held therein.

During operation, packets input to the input ports $2_1$ and $2_2$ through the input transmission lines $1_1$ and $1_2$ are individually provided with switching information due to the function of the packet input processing blocks $11_1$ and $11_2$, and are then sent to the buffer memories $12_1$ and $12_2$, respectively. The packets in the buffer memories $12_1$ and $12_2$ are then written into idle packet buffers selected from among the packet buffers $14_{11}$, $14_{12}$, $14_{21}$ and $14_{22}$ under the control of the queue management block 16.

On the other hand, the scheduler 20 composed of the schedulers 21 and 22 selects, for every transfer cycle, either one of the schedulers 21 or 22 which is used for packet transferring control. The selected scheduler refers to the idle/busy information related to the packet buffers $14_{11}$, $14_{12}$, $14_{21}$ and $14_{22}$, and selects at least one input port which uses either output packet transfer bus $8_1$ or $8_2$ during the next transfer cycle. The input port select information representative of at least one selected input port is transferred to the corresponding selector and then held therein. The selector or selectors $18_1$ and $18_2$ select the corresponding one of the two packet buffers $14_1$ and $14_2$ and passes the packet from the selected packet buffer. For example, when the input port select information is supplied to the selector $18_2$ from the scheduler 21, the selector $18_1$ selects the packet buffer $14_1$ related to the output packet transfer bus $8_1$.

The packet from each of the selectors is sent to the corresponding input packet transfer bus and then the related input output packet transfer bus via the transfer buffer or gate circuit which is designated by the switching information added to the packet. Then the packet on the corresponding output packet transfer bus is transferred to an output port (not shown for the sake of simplicity), to which the destination terminal is coupled.

Figure 4:
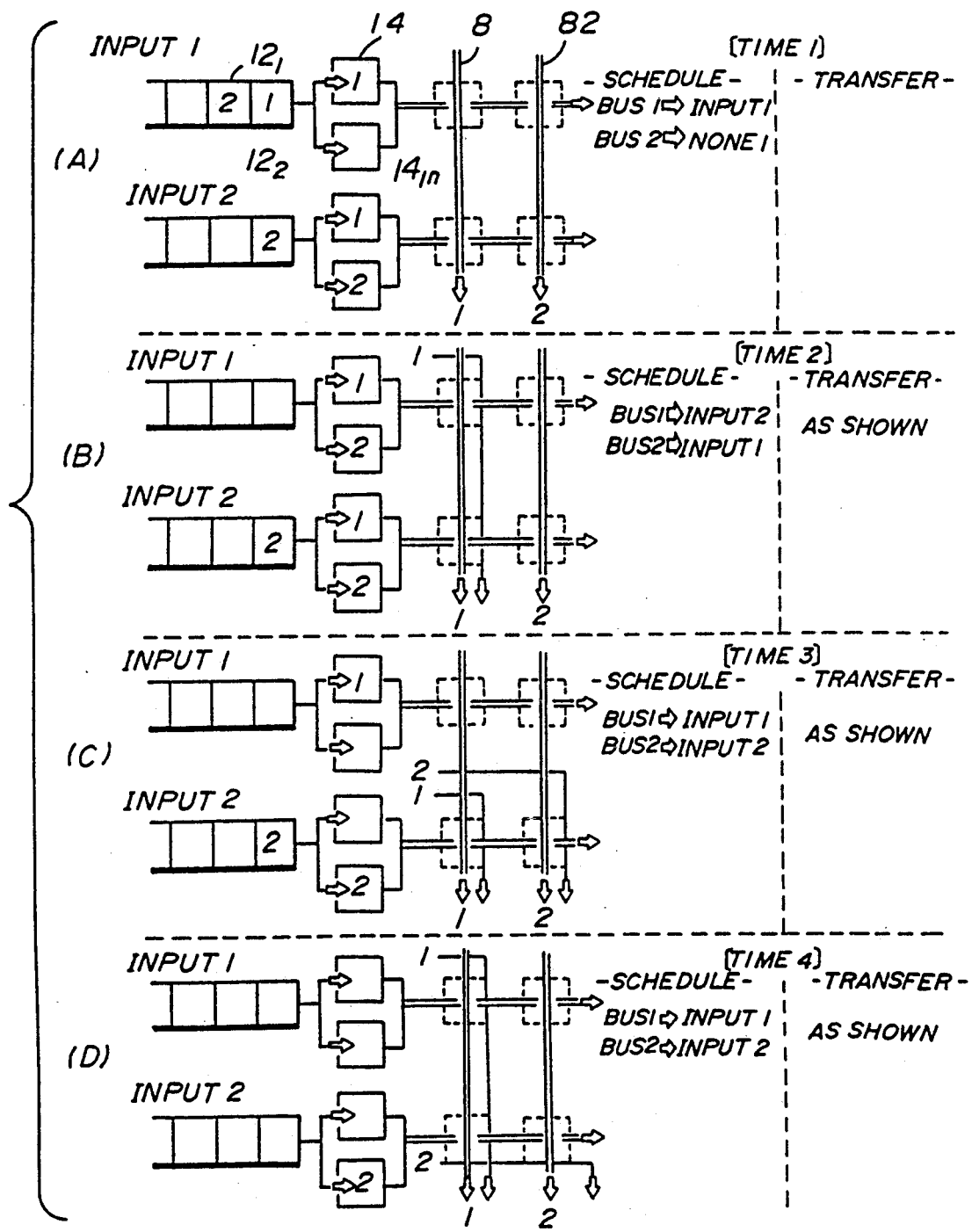
FIG. 4 is a diagram illustrating a scheduling procedure and a transfer cycle in the packet switching system shown in FIG. 3.

FIG. 4 illustrates how packets are actually processed. For the sake of convenience, the buffer memories $12_1$ and $12_2$ are hereafter also referred to input 1 and input 2, respectively, and output packet transfer buses $8_1$ and $8_2$ are also referred to as bus 1 and bus 2, respectively. It is now assumed that as shown in FIG. 4-(A), the buffer memories $12_1$ and $12_2$ have queue packets and the packet buffers $14_1$ and $14_2$ have packets and that there is no incoming input packet after time 1. In FIG. 4-(A), packet 1 and 2 addressed to the output packet transfer buses 1 ($8_1$) and 2 ($8_2$) are stored in the buffer memory $12_1$, and packet 2 is stored in the buffer memory $12_2$. Packet 1 is stored in the packet buffer $14_{11}$. No packet is stored in the packet buffer $14_2$. Packet 1 and 2 are stored in the packet buffers $14_1$ and $14_2$, respectively. The scheduling executed by the schedulers 21 and 22 at time 1 is determined as shown in FIG. 4-(A). At time 2, the packet in the packet buffer $12_1$ is transferred as shown in FIG. 4-(B), and the contents of the buffer memories $12_1$ and $12_2$ and the packet buffers $14_{11}$, $14_{12}$, $14_{21}$ and $14_{22}$ change as shown in FIG. 4-(B) under the control of the queue management block 16. The scheduling executed at this time is also renewed as shown in FIG. 4-(B).

Figure 3:
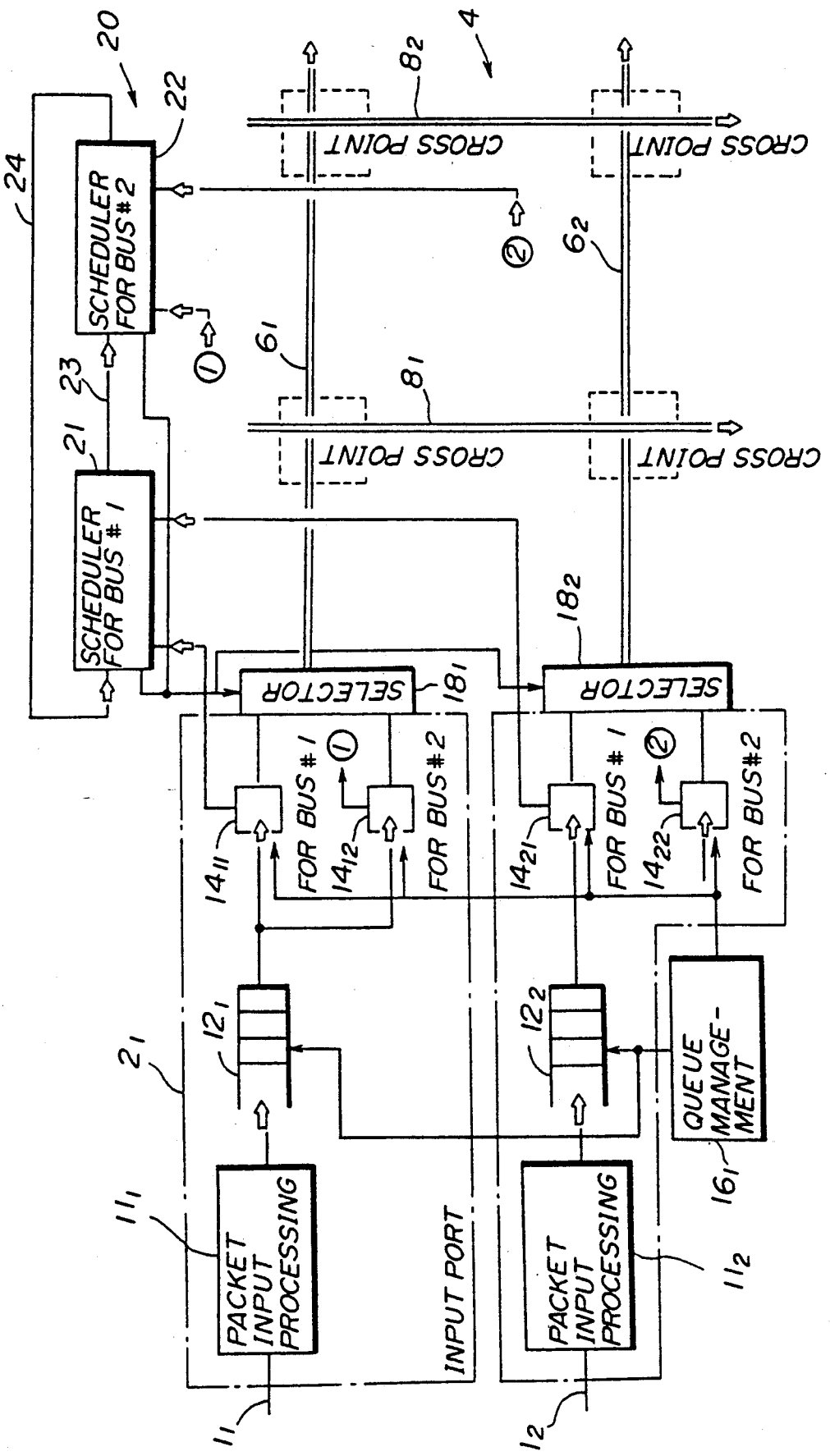
FIG. 3 is a block diagram of a detailed structure of the packet switching system shown in FIG. 2.

FIG. 4-(C) shows the transfer of packets from the packet buffers $14_{11}$, $14_{12}$, $14_{21}$ and $14_{22}$ to the output packet transfer buses 1 and 2 (which correspond to the output packet transfer buses $8_1$ and $8_2$ shown in FIG. 3, respectively), the transfer of packets from the buffer memories $12_1$ and $12_2$ to the corresponding packet buffers $14_{11}$, $14_{12}$, $14_{21}$ and $14_{22}$, and scheduling at time 3. At time 4, as shown in FIG. 4-(D), the transfer of packets and scheduling are carried out in the same way as in the case of FIG. 4-(C). When the processing at time 4 is completed, there is only a packet to be switched in the packet buffer $14_{22}$. The scheduling is determined as shown in FIG. 4-(D). The packet in the packet buffer $14_{22}$ for the output packet transfer bus #2 is set to the output packet transfer bus 2 ($8_2$) at time 5 (not shown), and is then input to the destination terminal. It is possible to transfer packets while the scheduling is carried out. Alternatively, it is possible to alternately transfer packets and perform the scheduling.

A description will now be given of a packet switching system according to a second preferred embodiment of the present invention with reference to FIG. 5. The packet switching system shown in FIG. 5 includes a plurality of packet transfer controllers 201 labeled #0-#n. Each of the packet transfer controllers 201 is made up of a pair of a receive packet transfer controller 210 and a send packet transfer controller 211. An input packet transmission bus 202 is provided for each of the receive packet transfer controllers 210. An output packet transmission bus 203 is provided for each of the send packet transfer controllers 211. Packet buffers 204 (#00-#nn) are provided for cross points of the input packet transfer buses 202 and the output packet transfer buses 203. A packet switching control block 205 is connected to the transfer buffers 204 through control buses 206. The packet switching control block 205 includes packet switching controllers 500 which are individually provided for the output packet transfer buses 203 and which are connected to each other through a connection bus 207.

Each of the receive packet transfer controllers 210 sends transfer request information on the input packet and status information about the send packet transfer controller 211 which is paired with the corresponding receive packet transfer controller 210 to the corresponding input packet transfer bus 202. Thereby, the above-mentioned information is written into the transfer buffers 204 connected to the above input packet transfer bus 202. Then the information is read out from the transfer buffers 204 and then sent to the packet switching controllers 500 through the control buses 206. Each of the packet switching controllers 500 determines a packet transfer timing based on the received information, and notifies the receive packet transfer controller 210 of information on the determined packet transfer timing.

During operation, a packet is input to the receive packet transfer controller 210 and is temporarily stored therein. Each of the receive packet transfer controllers 210 sends a transfer request frame to all the transfer buffers 204 connected to the corresponding input packet transfer bus 202 at a predetermined period. For example, when the receive packet transfer controller 210 labeled #0 sends the transfer request frame to the transfer buffers 204 labeled #00-#0n.

Figure 6:
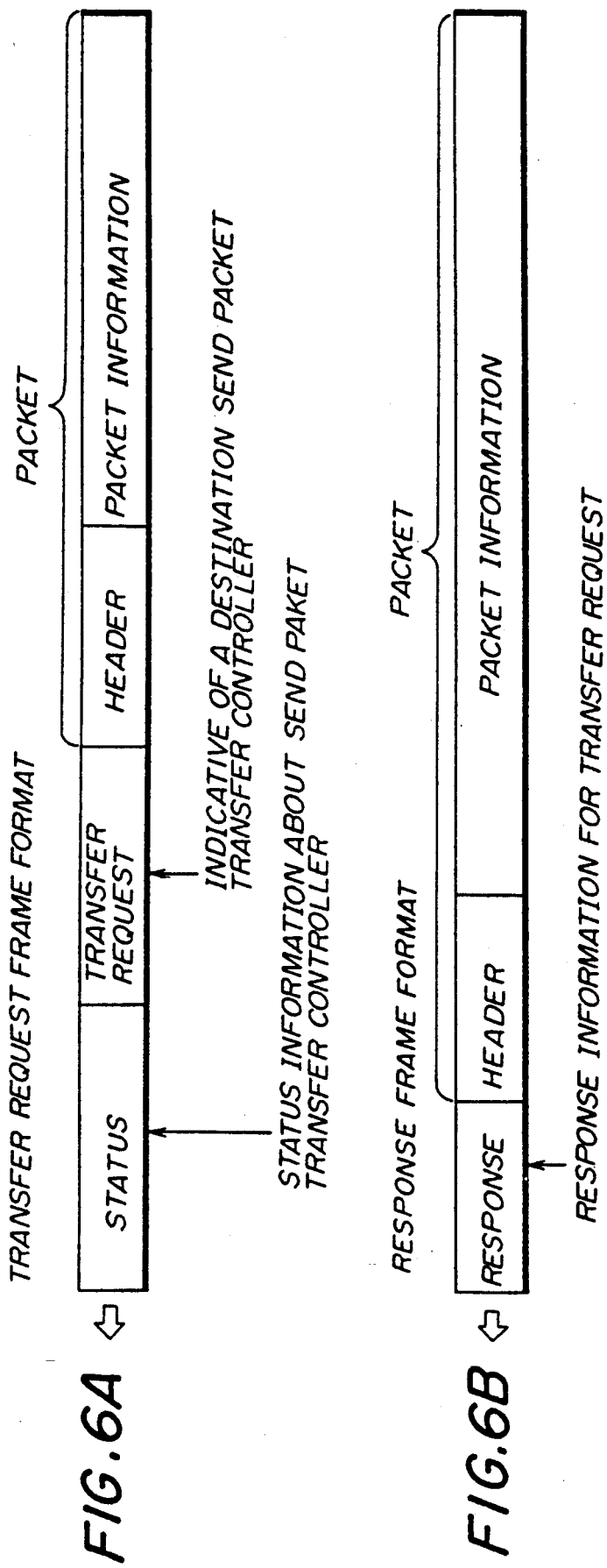
FIG. 6A is a diagram showing a format of a transfer request frame, used in the packet switching system shown in FIG. 5.
FIG. 6B is a diagram showing a format of a response frame frame used in the packet switching system shown in FIG. 5.

A format of the transfer request frame is shown in FIG. 6A. The request frame includes status information, the transfer request information and the packet to be switched. The status information represents the status of the send packet transfer controller 211 which is paired with the corresponding receive packet transfer controller 210 within the same packet transfer controller 201. In other words, the status information indicates whether or not the paired send packet transfer controller 211 is in a packet receivable state. The transfer request information indicates a transfer destination (send packet transfer controller 211) to which the packet from the receive packet transfer controller 210 is to be sent. A packet includes a packet header and packet information.

All the transfer buffers 204 connected to the input packet transfer buses 202 extract the status information and the transfer request information from the transfer request frame, and hold the same therein. The packet contained in the transfer request frame is subjected to a switching operation and is output to the output packet transfer bus 203 related to the transfer destination. The status information and the transfer request information stored in each of the transfer buffers 204 are successively read out therefrom by the instruction from the corresponding packet switching controller 500, and are transferred thereto through the corresponding control bus 206. Each of the packet switching controllers 500 renews the status of all the packet transfer controllers 201 (the transfer request status related to the receive packet transfer controllers 210 and the status of the send packet transfer controllers 211) by the received information. Then, each of the packet switching controllers 500 checks the status of the send packet transfer controller 211 related to the transfer request, and determines whether this transfer request is acceptable or not. The determination result is sent, as response information, to the transfer buffers 204 through the corresponding control bus 206.

The transfer buffer 204 connected to the transfer destination inputs the response information and then transfers the same to the send packet transfer controller 211 (transfer destination) through the corresponding output packet transfer bus 203. On the other hand, when the packet input from the input packet transfer bus 202 is permitted to be transmitted by the corresponding packet exchange controller 500, the packet is subjected to a timing control so that it is transmitted to the output packet transfer bus 203 through the corresponding transfer buffer 204. The aforementioned response information is transferred at a timing which precedes the timing at which the packet is transferred. Response information is composed of the response information and the packet. A format of the response frame is illustrated in FIG. 6B.

When each of the send packet transfer controllers 211 receives the response frame, the response information contained therein is supplied to the paired receive packet transfer controller 210 (together with the status information about the send packet transfer controller 211). Then, each of the send packet transfer controllers 211 executes a packet transmit control so that the received packet is externally output therefrom.

Figure 5:
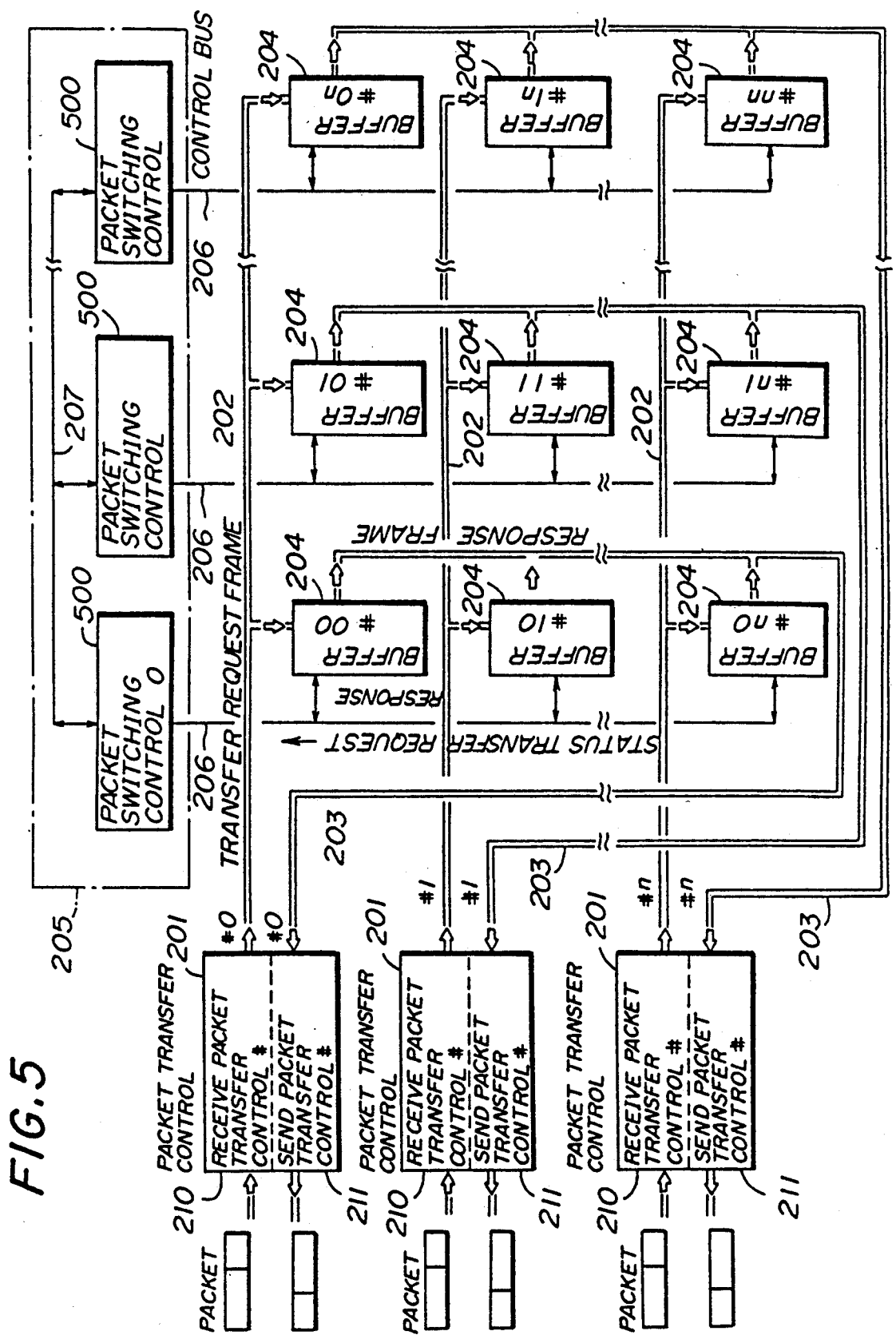
FIG. 5 is a block diagram of a packet switching system according to a second preferred embodiment of the present invention.
Figure 7:
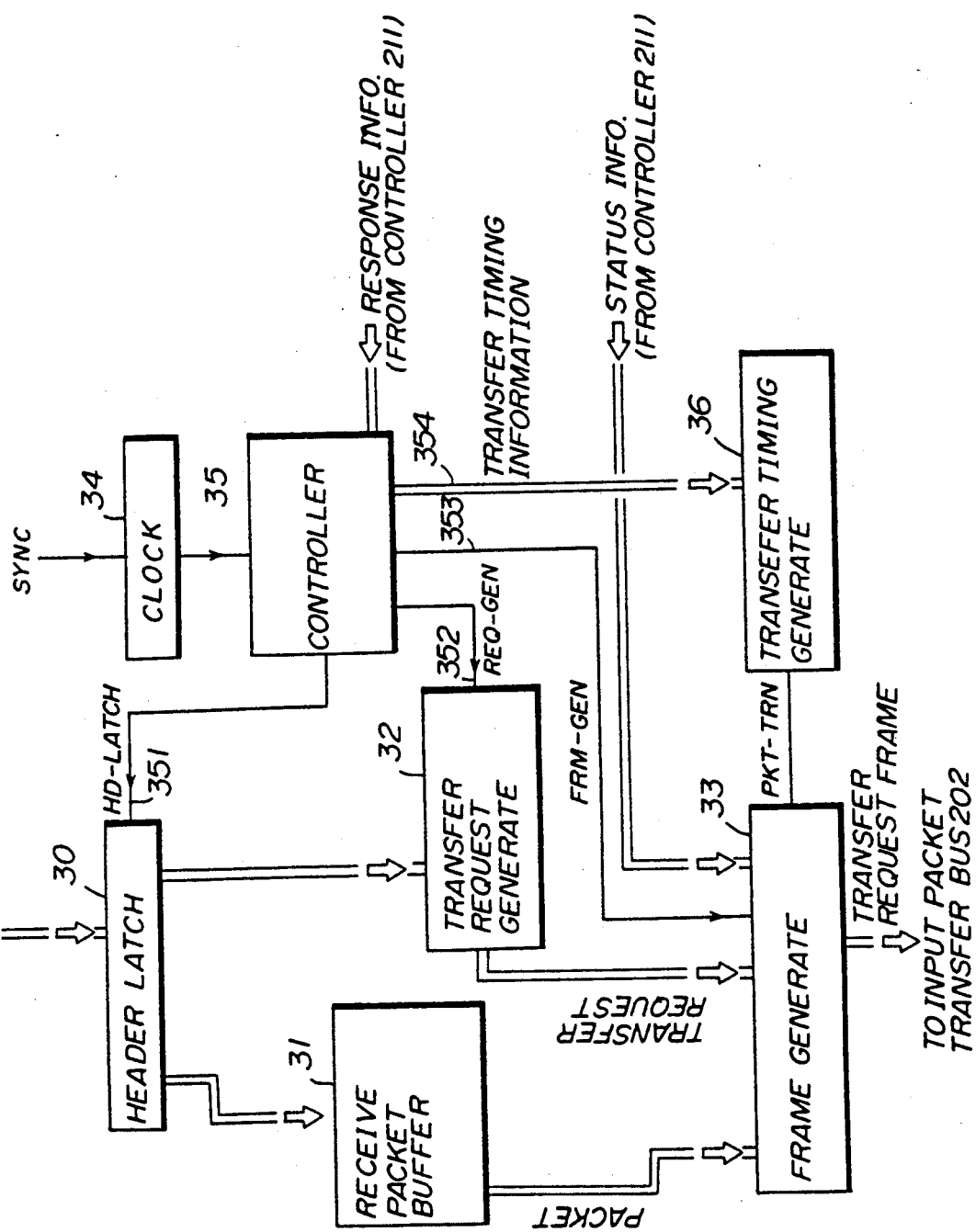
FIG. 7 is a block diagram of a receive packet transfer controller used in the packet switching system shown in FIG. 5.

FIG. 7 is a block diagram of each receive packet transfer controller 210 shown in FIG. 5. The receive packet transfer controller 210 in FIG. 5 is made up of a packet header latch circuit 30, a receive packet buffer 31, a transfer request generating circuit 32, a frame generating circuit 33, a clock circuit 34, a controller 35 and a transfer timing generating circuit 36. The packet header latch circuit 30 latches the packet header of a packet received through an input port (not shown). The receive packet buffer 31 stores the packet to be transferred and holds the same. The transfer request generating circuit 32 analyzes the packet header of the packet in the packet header latch circuit 30 and generates a transfer request addressed to the send packet transfer controller 211 related to a destination terminal on the basis of the analyzed result. The frame generating circuit 33 periodically assembles the status information and the transfer request and adds the corresponding packet to the assembled data at a transfer timing so that the aforementioned request frame is generated. The controller 35 controls the overall operation of the receive packet transfer controller 210, and generates various timing signals as well as transfer timing information to be supplied to the transfer timing generating circuit 36. The transfer timing generating circuit 36 receives the transfer timing information from the response information by the controller 35, and generates a transfer timing signal PKT-TRN used for inserting, into the transfer request frame, a packet that is stored in the receive packet buffer 31 and is related to a time at which packet transfer is permitted.

A description will now be given of the operation of the receive packet transfer controller 210 shown in FIG. 7. The packet from the input port is supplied to the packet header latch circuit 30. The packet header of the packet is stored in the packet header latch circuit 30 at a timing defined by a timing signal 351 (HD-LATCH) from the controller 35, which operates in synchronism with a clock signal from the clock circuit 34. The packet information of the packet latched in the packet header latch circuit 30 is then sent to the receive packet buffer 31. The clock circuit 34 is synchronized to a synchronizing signal (SYNC), which is also supplied to the send packet transfer controllers 211, the transfer buffers 204 and the packet switching controllers 500 shown in FIG. 5.

The packet header latched in the packet header latch circuit 30 is analyzed by the transfer request generating circuit 32. Then the transfer request generating circuit 32 generates, in response to a timing signal 352 (REQ-GEN) from the controller 35, the transfer request representative of the send packet transfer controller 211 to which the packet being considered is to be transferred. The packet is being held in the receive packet buffer 31 until the timing signal PRT-TRN from the transfer timing generating circuit 36 which represents the packet is permitted to be transferred is output.

The controller 35 is notified of the response information (a response to the transfer request from the receive packet transfer controller 210) from the paired send packet transfer controller 211. The controller 35 analyzes the received response information and generates transfer timing information on the packet stored in the receive packet buffer 31. The generated transfer timing information is supplied to the transfer timing generating circuit 36. The transfer timing generating circuit 36 sends the timing signal PKT-TRN indicative of transfer permission when the transfer timing for the packet in the receive packet buffer 31 is obtained. In response to the timing signal PRT-TRN, the frame generating circuit 33 reads out the corresponding packet from the receive packet buffer 31. Then the frame generating circuit 33 derives the transfer request frame from the status information, the transfer request information and the packet in response to a timing signal FRM-GEN from the controller 35. The request frame is sent to the corresponding input packet transfer bus 202 so that all the transfer buffers 204 connected thereto are provided with the request frame. The above operation is repeatedly carried out at a predetermined period defined by the clock signal from the clock circuit 34.

A description will now be given of each transfer buffer 204 shown in FIG. 5 with reference to FIG. 8. A controller 41 controls the entire operation of the transfer buffer 204 and generates various timing signals. A packet header analyzing circuit 42 analyzes the packet header of the received packet, and generates a gate ON/OFF signal used for turning ON or OFF a gate circuit 47. A receiver 43 receives the transfer request frame from the corresponding input packet transfer bus 202. A status latch circuit 44 separates the status information from the transfer request frame in response to a timing signal ST-LATCH from the controller 41, and holds the same therein. A transfer request latch circuit 45 separates the transfer request information from the transfer request frame in response to a timing signal REQ-LATCH from the controller 41. A packet header latch circuit 46 extracts the packet header of the packet from the transfer request frame in response to a timing signal HD-LATCH from the controller 41. The gate circuit 47 passes the packet from a first-in-first-out memory (hereafter simply referred to as an FIFO memory) 461 or prevents the same from passing therethrough in accordance with the gate ON/OFF signal from the packet header analyzing circuit 42. The packet passing through the packet header latch circuit 46 is stored in the FIFO memory 461. The packet passing through the gate circuit 47 is stored in an FIFO memory 471. A response information adding circuit 48 adds the response information supplied from the corresponding packet switching controller 500 through the control bus 206 to the packet from the FIFO memory 47 in response to an addition timing signal from the controller 41 so that the response frame shown in FIG. 6B is generated. A driver 49 sends the response frame from the response information addition circuit 48 to the corresponding output packet transfer bus 203.

A description will be given of the operation of the transfer buffer 204. The receiver 43 receives the transfer request frames which are sent, at predetermined intervals, from the corresponding receive packet transfer controller 210 (FIG. 5) through the corresponding input packet transfer bus 202. The status information, the transfer request information and the packet header contained in each transfer request frame are separated or extracted from each other and held in the status latch circuit 44, the transfer request latch circuit 45 and the packet header latch circuit 46 in response to the timing signals ST-LATCH, REQ-LATCH and HD-LATCH, respectively. The status information in the status latch circuit 44 and the transfer request in the transfer request latch circuit 45 are written into a memory 51 under the control of a driver 50. The contents of the memory 51 are periodically supplied to the corresponding packet switching controller 500 through the corresponding control bus 206 by a conventional poling operation.

The packet header latched in the packet header latch circuit 46 is extracted from the transfer request frame and then sent to the packet header analyzing circuit 42.

The packet consisting of the packet header and packet information is stored in the FIFO memory 461.

The packet header analyzing circuit 42 analyzes the packet header in response to a header analysis timing signal from the controller 41. When it is determined that the packet being considered is to be transferred to the output packet transfer bus 203 to which the transfer buffer 204 being considered is connected, the packet header analyzing circuit 42 sets the gate ON/OFF signal to "1". Thereby, the gate circuit 47 is opened and the corresponding packet from the FIFO memory 461 is allowed to pass therethrough. The packet passing through the gate circuit 47 is written into the FIFO memory 471 and held until the response information adding timing is obtained.

In the above-mentioned manner, the packet is input to the transfer buffer 204 indicated by the packet header added to the packet information, and is stored in the FIFO memory 471 through the circuits 44–47 so that the packet switching is executed.

The response information notified from the corresponding packet switching controller 500 (FIG. 5) is stored in the memory 51, and is then supplied to the response information adding circuit 48 via a receiver 52. When the timing signal supplied from the controller 41 at the predetermined interval is input to the response information adding circuit 48 it reads out the corresponding packet from the FIFO memory 471, and generates the response frame by adding the response information supplied from the receiver 52 to the readout packet. The response frame thus generated is sent to the corresponding output packet transfer bus 203 via the driver 49. When the gate circuit 47 is in the OFF state, the response frame has only the response information.

Figure 9:
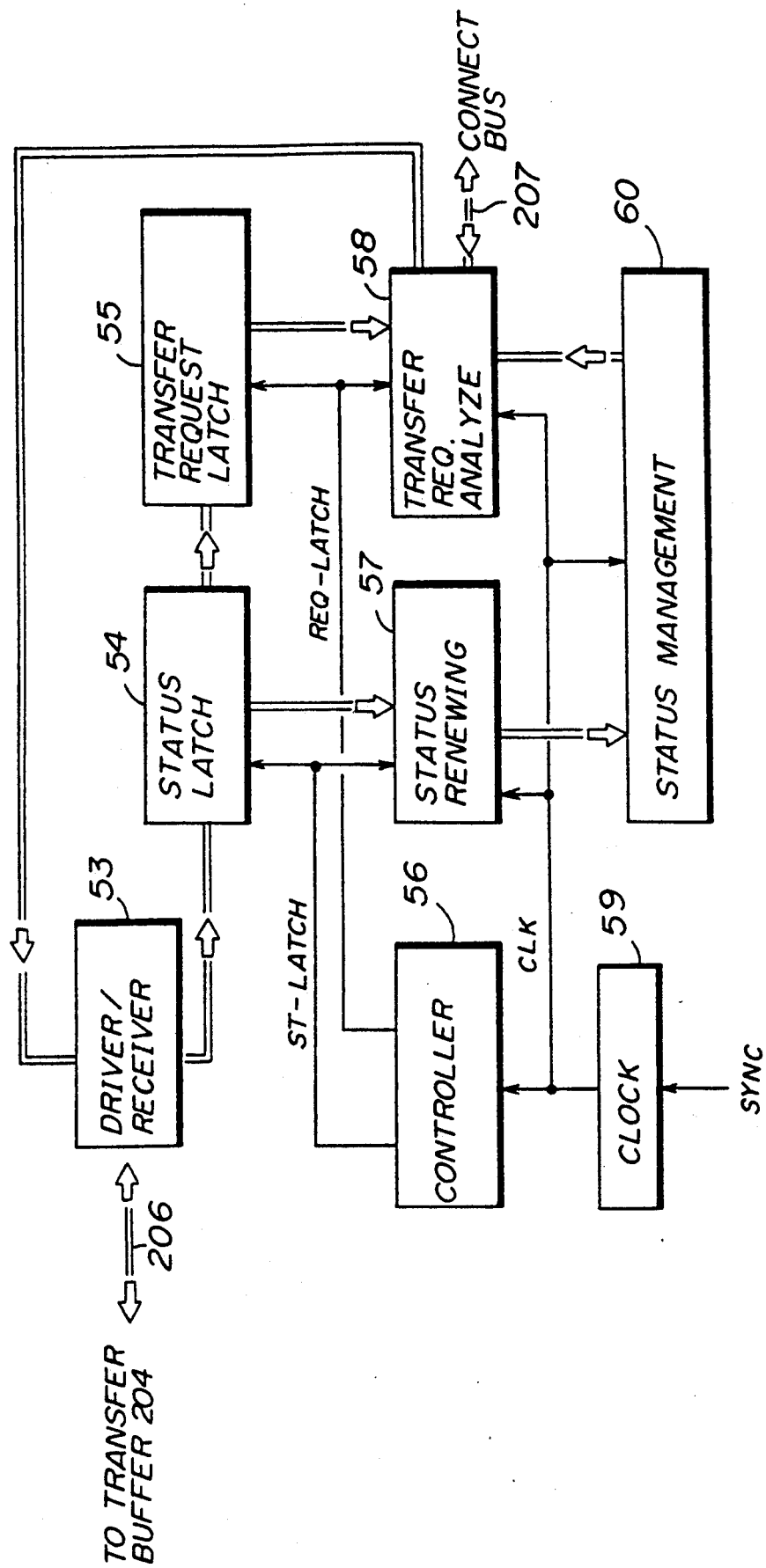
FIG. 9 is a block diagram of a packet switching controller used in the packet switching system shown in FIG. 5.

A description will be now given of each packet switching controller 500 with reference to FIG. 9. A driver/receiver 53 receives the status information and the transfer request information from the corresponding transfer buffers 204 through the related control bus 206, and sends the response information thereto. A status latch circuit 54 separates the status information from the received information and holds the same therein. A transfer request latch circuit 55 latches the transfer request information passing through the status latch circuit 54. A controller 56 controls the entire operation of the packet switching controller 500 and generates timing signals ST-LATCH and REQ-LATCH from a clock signal CLK generated by a clock circuit 59. A status renewing circuit 57 sends renewed status information derived from the status information from the status latch circuit 54 to a status management circuit 60. A transfer request analyzing circuit 58 generates the response information from information supplied from the status management circuit 60 in response to the transfer request from the transfer request latch circuit 55. The status management circuit 60 manages the renewed status information from the status renewing circuit 57 and sends the latest status information to the transfer request analyzing circuit 58.

During operation, the packet switching controller 500 accesses all the related transfer buffers 204 by poling and periodically collects status information and transfer request information through the corresponding control bus 206. The status information is latched in the status latch circuit 54 in synchronism with the timing signal ST-LATCH from the controller 56, and the transfer request information is latched in the transfer request latch circuit 55 in synchronism with the timing signal REQ-LATCH from the controller 56. The status information is sent to the status renewing circuit 57, which notifies the status management circuit 60 of, as renewed information, status information which is different from the previous status information (busy or idle).

The status management circuit 60 renews a management table on the basis of the received renewal information. The transfer request analyzing circuit 58 compares the transfer request from the transfer request latch circuit 55 with the status information from the status management circuit 60, and determines a transfer timing on the basis of the status of a load on the send packet transfer controller 211 requested by the transfer request and the status of the other send packet transfer controllers 211. Then the transfer request analyzing circuit 58 generates response information representative of the determined transfer timing. The response information thus generated is output to the driver/receiver 53 from the transfer request analyzing circuit 58, and is then sent to the control bus 206. The response information on the control bus 206 is supplied to the response information adding circuit 48 (FIG. 8) of each transfer buffer 204 connected to the control bus 206 being considered.

A description will now be given of each send packet transfer controller 211 with reference to FIG. 10. A packet send control circuit 62 transfers a packet in a send packet buffer 64 to an output port (not shown). A controller 63 controls the entire operation of the send packet transfer controller 211 and generates timing signals REQ-LATCH and ST-GEN. The send packet buffer 64 holds the packet contained in the response frame which is transferred from the corresponding output packet transfer bus 203 via a receiver 66 and a response latch circuit 65. The response latch circuit 65 stores the response information in the response frame. A status detection circuit 67 monitors the send packet buffer 64, and notifies the frame generating circuit 33 (FIG. 7) in the paired send packet transfer controller 210 of the status of the send packet buffer 64.

The operation of the send packet transfer controller 211 will be described below. The response frame is received by the receiver 66. Then the response information contained in the response frame is written into the response latch circuit 65 in response to the timing signal REQ-LATCH from the controller 63. The latched response information is transferred to the controller 35 (FIG. 7) of the paired receive packet transfer controller 210. The packet separated from the response frame is stored in the send packet buffer 64 in response to the timing signal REQ-LATCH from the controller 63. The status detection circuit 67 monitors the send packet buffer 64, and periodically notifies the frame generating circuit 33 (FIG. 7) in the send packet transfer controller 210 of the status of a load on the send packet buffer 64 as status information. Packets in the send packet buffer 64 are output in turn from the send packet buffer 64 to the output port.

Figure 11A:
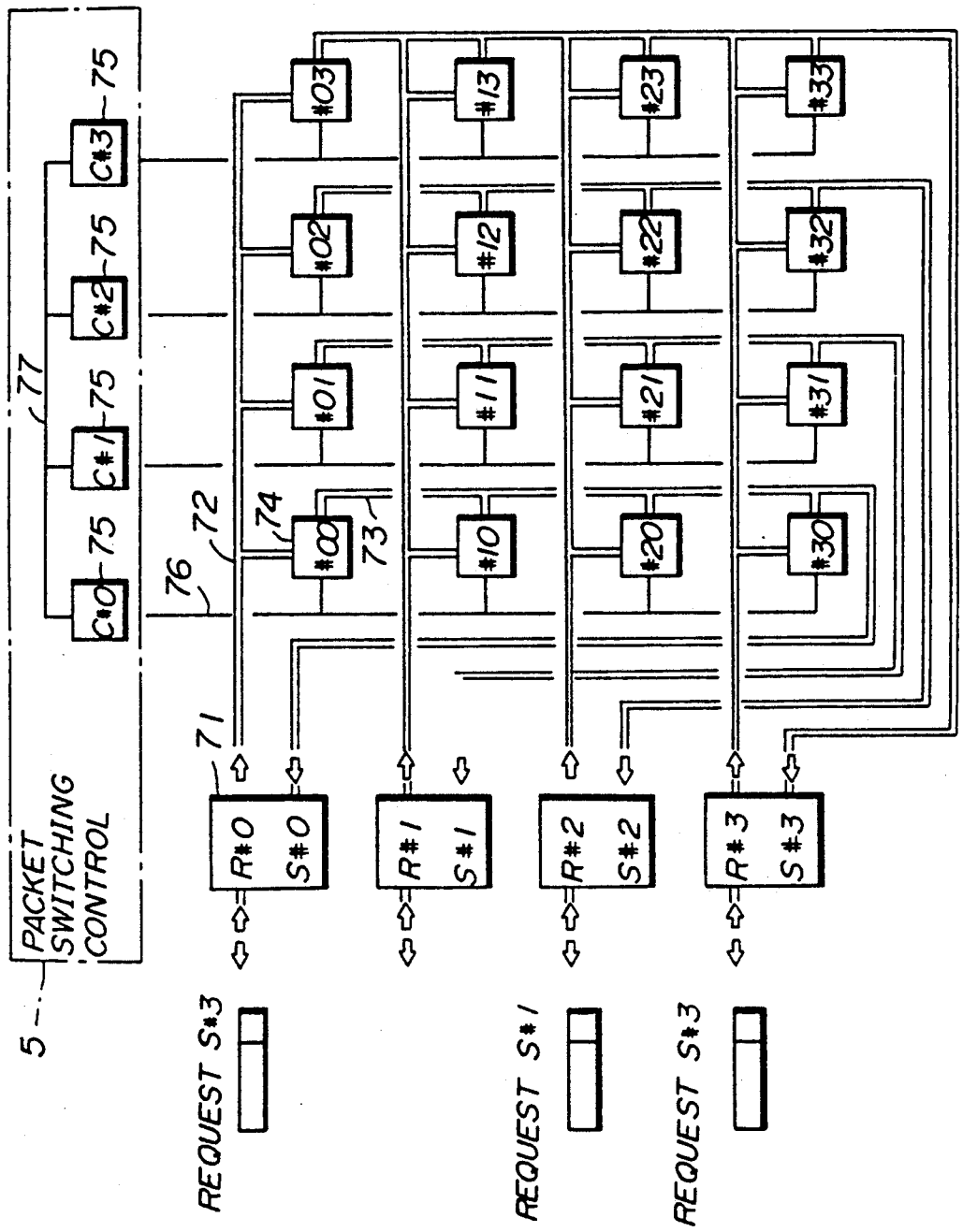
FIG. 11A is a block diagram of a 4×4 matrix switch structure.

A description will now be given of a processing executed by each packet switching controllers 500 (FIG. 5). Referring to FIG. 11A, there is illustrated a packet switching system having a 4×4 matrix switch structure according to the second embodiment of the present invention. The packet switching control block 5 is composed of four packet switching controllers 75 (which correspond to the packet switching controllers 500 shown in FIG. 5), and a connection bus 77 (corresponding to the connection bus 207 shown in FIG. 5). The system has four packet transfer controllers 71 (which correspond to the packet transfer controllers 201 shown in FIG. 5) and 16 transfer buffers 74 (which correspond to the transfer buffers 204 shown in FIG. 5). The transfer buffers 74 labeled from #00 to #33 are connected to input packet transfer buses 72 and output packet transfer buses 73, as shown in FIG. 11A. R#0–R#3 denote receive packet transfer controllers provided in the packet transfer controllers 71, and S#0–S#3 denote send packet transfer controllers provided therein.

FIG. 11A also shows a state where three packets have just arrived at the receive packet transfer controllers R#0, R#2 and R#3. It is now assumed that at this time two send packet transfer controllers S#0 and S#3 is not in the packet receivable state at a time when the just arrived packets will be subjected to the packet switching process by the matrix switch and will reach the send packet transfer controllers S#0 and S#3.

As shown in FIG. 11B, the status information, the transfer request information and the packet information (when packet transfer is permitted) are sent from the receive packet transfer controllers R#0–R33 by using the illustrated frame. The status has one-bit data provided for each of the send packet transfer controllers S#0–S#3. The status information about each send packet transfer controller has "1" when it is not in the packet receivable state, and has "0" when it is in the packet receivable state. For example, the leading head of the status information represents the status of the send packet transfer controller S#0, and the content of this status is determined by the receive packet transfer controller R#0. In FIG. 11B, the status of the send packet transfer controller S#0 is represented by "1" and is not in the packet receivable state. The other bits related to #1–#3 from R#0 are set to "0".

The transfer request information is as follows. When there is any packet from each of the receive packet transfer controllers R#0–R#3, the terminal destination for each packet information is detected, and "1" is written into a corresponding bit position of the transfer request information. On the other hand, "0" is written into the other bit positions thereof. In FIG. 11B, the receive packet transfer controller R#0 has a packet which is request to be transferred to the send packet transfer controller S#3. Thus, the last bit of the transfer request information (which corresponds to S#3) is set to "1". The receive packet transfer controller R#2 requests to transfer a packet to the send packet transfer controller S#1.

The transfer request frame which is transmitted from each of the receive packet transfer controllers R#0–R#3 at a predetermined period (τ) is received by the corresponding transfer buffers 74. The status information and the transfer request information are sent to the corresponding packet switching controllers 75 (C#0–C#3) through the control buses 76. Each packet switching controller 75 manages the status of each of the send packet transfer controllers S#0–S#3 and derives the aforementioned response information from the managed status.

Figure 12:
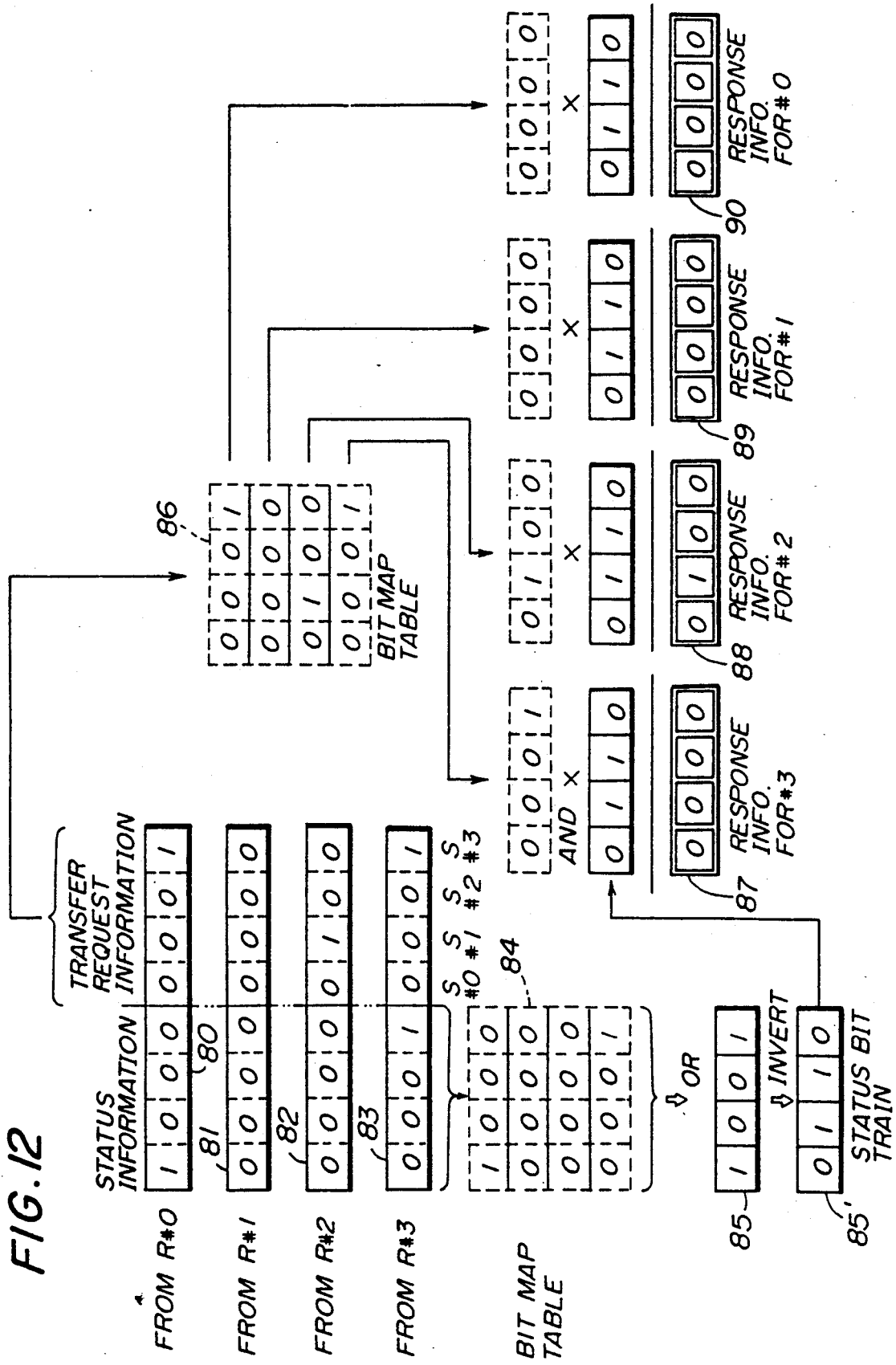
FIG. 12 is a diagram illustrating the operation of the packet switching controller shown in FIG. 9.

A description will now be given of the packet switching procedure executed by each packet switching controller 75 (FIG. 11A) with reference to FIG. 12. Each of the packet switching controllers 75 receives a header of the transfer request frame consisting of the status information and the transfer request information from each of the corresponding transfer buffers 74. Each of the headers 80, 81, 82 and 83 has four-bit status information and four-bit transfer request information. The status information consisting of 4 bits is stored in a bit map table 84. Then a logic OR operation between 4 bits having the same bit position is calculated. In the example illustrated in FIG. 12, the result of logic OR operation represented by a reference numeral 85 is "1001". The operation result indicated by numeral 85 is inverted so that a status bit train 85' of "0110" is obtained. The status bit train 85' indicates a send packet transfer controller or controllers which can receive packets in the next packet transfer procedure.

A bit map table 86 is generated from the transfer request information consisting of the fifth bit to the eighth bit of each of the headers 80–83. Then, a logic AND operation between the bit map table 86 and the status bit train 85' is calculated as shown in FIG. 12. The results of the logic AND operation indicated by reference numerals 87–90 are response information to be transmitted after time τ. The response information blocks 87, 88, 89 and 90 are addressed to the send packet transfer controllers S#3, S#2, S#1 and S#0, respectively. In the illustrate case, the transfer request from the receive packet transfer controller R#0 to the send packet transfer controller S#3 and the transfer request from R#3 to S#3 are not permitted since the send packet transfer controller S#3 is not in the packet receivable state. On the other hand, the transfer request from the receive packet transfer controller R#2 to the send packet transfer controller S#1 is permitted.

Each of the response information blocks 87–90 is sent from the corresponding packet switching controller 75 to the transfer buffer 74 through the control bus 76 so that it is transmitted to the send packet transfer controllers which is paired with the corresponding receive packet transfer controller which generates the transfer request. For example, the response information 90 is sent to the transfer buffer #00 from the packet switching controller #0. Then each of the response information blocks 87–90 is read out from the corresponding transfer buffer 74 and supplied to the receive packet transfer controller via the corresponding send packet transfer controller. Each of the receive packet transfer controllers manages transfer timing from the received information.

Figure 13:
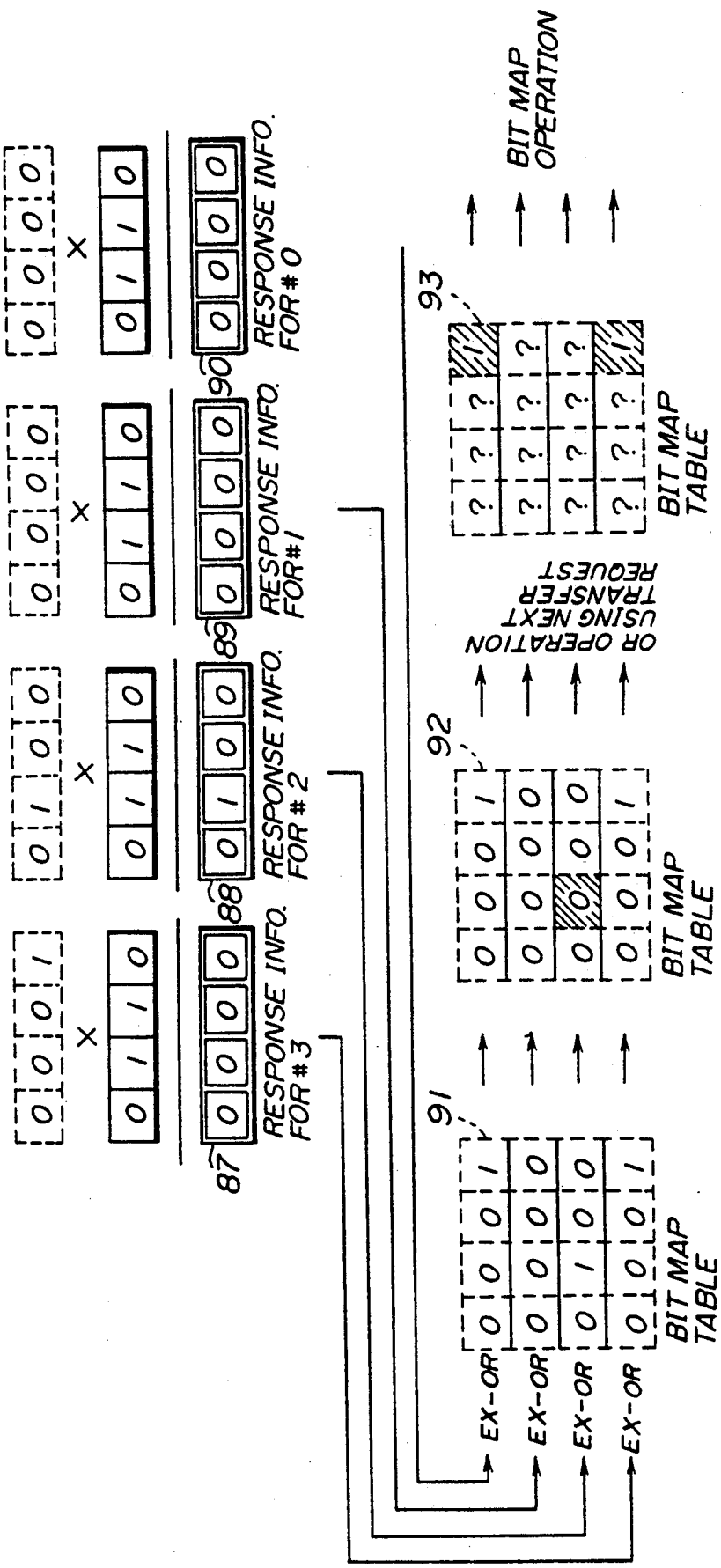
FIG. 13 is a diagram illustrating a procedure which is to be executed when a transfer request is not accepted.

A description will now be given of a procedure which is executed when the transfer request is not accepted with reference to FIG. 13. The result of the status calculation shown in FIG. 13 represents that the send packet transfer controller with respect to the transfer request is not in the receivable state. In this case, a timing calculation is required to be repeatedly carried until the transfer request is accepted. The timing calculation can be realized by either a first calculation method or a second calculation method which will be described below. The first calculation method is such that when the packet transfer controller 71 which generated the transfer request receives response information indicating that a packet is not permitted to be transferred, the transfer request for the present packet is sent therefrom again. The second calculation method is such that the transfer request information which is not accepted is managed by the corresponding packet switching controller 75 without generating the transfer request again, and the timing calculation using the managed transfer request information is performed again. It will be seen that the second calculation method is faster than the first calculation method since a time it takes to accept the transfer request by the second calculation method is less than that by the first calculation method.

A description will be given of a procedure based on the second calculation method which is executed when the transfer request is not accepted, by referring to FIG. 13. After the aforementioned bit map calculation (FIG. 12) is performed, an exclusive-OR operation on the response information and a bit map table 91 which has just been calculated is carried out for each of the numbers #0–#3 of the packet transfer controllers 71 at the same as the response information blocks 87–90 are sent. A reference numeral 92 indicates a bit map table obtained by the above-mentioned exclusive-OR operation. The bit map table 92 is used when a next bit map table is calculated at a next timing. In detail, a logic OR operation between the result of the exclusive-OR operation, that is, the bit map table 92 and the next transfer request information is calculated. The result of the logic OR operation is indicated by a reference numeral 93. Symbol "?" denotes that a corresponding bit assumes "1" or "0", depending on the contents of the next transfer request information.

The principle of the calculation procedure depicted in FIG. 13 is due to the fact that transfer request information which is accepted is reset by calculating the exclusive-OR operation between the transfer request information and the response information. As a result, the next request information is not affected by executing the exclusive-OR operation. Transfer request information which is not accepted is retained as it is even by executing the exclusive-OR operation, and is thus subjected to the bit map calculation at the next timing as it stands. In a case where the transfer request which is not accepted and the next transfer request both relate to the same packet transfer controller 71, it is possible for each packet transfer controller 71 to manage the number of queue packets by managing the number of transfer requests from its own and the number of response information blocks on these transfer requests.

A description will be given of an operating sequence of packet switching with reference to FIG. 14. A column on the left-hand end of the drawing represents time passage by the predetermined interval τ. A column (second column) adjacent to the above column represents the operation of the receive packet transfer controller 210 (FIG. 5). A column (third column) adjacent to the second column represents the operation of the send packet transfer controller 211 (FIG. 5). A column (fourth column) adjacent to the third column represents the operation of the transfer buffer 204 (FIG. 5), and a column (fifth column) adjacent to the fourth column represents the operation of the packet switching controller 205 (FIG. 5).

At time T1, a transfer request frame including the status information and the transfer request information (having no packet) is sent to the transfer buffer 204. Then the status information and the transfer request information are sent to the packet switching controller 205. After that, the response frame is sent back to the transfer buffer 204. Then the response frame is sent from the transfer buffer 204 to the send packet transfer controller 211. The send packet transfer controller 211 separates the response information from the response frame, and adds the status information about the present send packet transfer controller 211 to the separated response information. Then the status information and the response information are sent to the paired receive packet transfer controller 210. On the other hand, during the above-mentioned operation, packet 1 is received by the receive packet transfer controller 210 through the input port (not shown), and stored in the receive packet buffer 31 (FIG. 7). Then transfer request 1 is generated as described previously with reference to FIG. 7.

The receive packet transfer controller 210 analyzes the response information from the paired send packet transfer controller 211. In the illustrated case, the sending of packet has not yet been permitted. Thus, at time T2 after the elapse of the predetermined interval τ from time T1, the receive packet transfer controller 210 sends the status information and the transfer request information about packet 1 (transfer request 1) to the transfer buffer 204. Then the above information is sent to the packet switching controller 205 from the transfer buffer 204. The packet switching controller 205 generates response information, which is sent back to the transfer buffer 204, the send packet transfer controller 211 and the receive packet transfer controller 210 in this order. On the other hand, the receive packet transfer controller 210 receives packet 2 after time T2 and generates a transfer request 2 for the packet 2. At this time, the response information from the packet switching controller 205 and the status information from the send packet transfer controller 211 are supplied to the receive packet transfer controller 210 via the send packet transfer controller 210. The receive packet transfer controller 210 analyzes the received information. When the analyzed result indicates that the sending of packet is permitted, the status information and the transfer request information and the packet 1 stored in the receive packet buffer 31 (FIG. 7) are sent in the form of the transfer request frame, to the transfer buffer 204 at time T3.

The transfer request frame is received by the transfer buffer 204 connected to the send packet transfer controller 211 connected to the destination terminal. The status information and the transfer request information are separated from the transfer request frame and then sent to the packet switching controller 205. At the same time, the packet 1 (which has been permitted to be transferred by the aforementioned response information) is sent to the corresponding output packet transfer bus 202 via the corresponding transfer buffer 204. Then the packet 1 is received by the send packet transfer controller 211. The above-mentioned procedure is repeatedly carried out.

In the second embodiment described above, the request frame and the response frame are transmitted on the transfer buses 202 and 203 which also carry data packet. Alternatively, it is possible to carry the request frame and the response frame by control buses provided separately from the transfer buses 202 and 203.

A description will now be given of a third embodiment of the present invention. The third embodiment of the present invention is directed to an improvement in the aforementioned second embodiment of the present invention. In the second embodiment, a packet on input and output packet transfer buses is framed and transferred for every frame. In actuality, packets arriving at the input port have various lengths. A packet can have information less than one frame greater than one frame. When a packet has information greater than one frame, information must be transferred with a plurality of frames. In this case, the transfer request frame and the response frame must be generated for each of the frames according to the second embodiment of the present invention. This deteriorates the effectively in packet switching. The third embodiment of the present invention is directed to improving the above-mentioned problem. According to the third embodiment of the present invention, when a packet having a length greater than one frame is input to the system, the packet is divided into a plurality of frames each having a length transmittable by one frame. When a transfer request is sent, information about the time it takes to send the input packet (in other words, the number of divided packet frames) is sent together with the transfer request. The packet switching control block discriminates a timing with which the packet frames can be successively transferred, and issues a transfer permission. That is, a pair of transfer request and its response is generated for one packet even if it has a length greater than the predetermined length.

Referring to FIG. 15, there is illustrated a general structure of a packet switching system according to the third embodiment of the present invention. The packet switching system in FIG. 15 includes packet transfer controllers 301, input packet transfer buses 302, output packet transfer buses 303, transfer buffers 304 and a packet switching control block 305. Each of the packet transfer controllers 301 is composed of a receive packet transfer controller 310 and a send packet transfer controller 311. Each of the receive packet transfer controllers 310 is made up of a dividing circuit 3101, a receive packet buffer 3102 and a transfer request frame generator 3103. Each of the send packet transfer controller 311 is composed of a transfer packet buffer 3111 and a response frame analyzer 3112. The packet switching control block 305 has an analyzing circuit 305a and a table 305b.

Figures 16A, 16B, 16C, 16D:
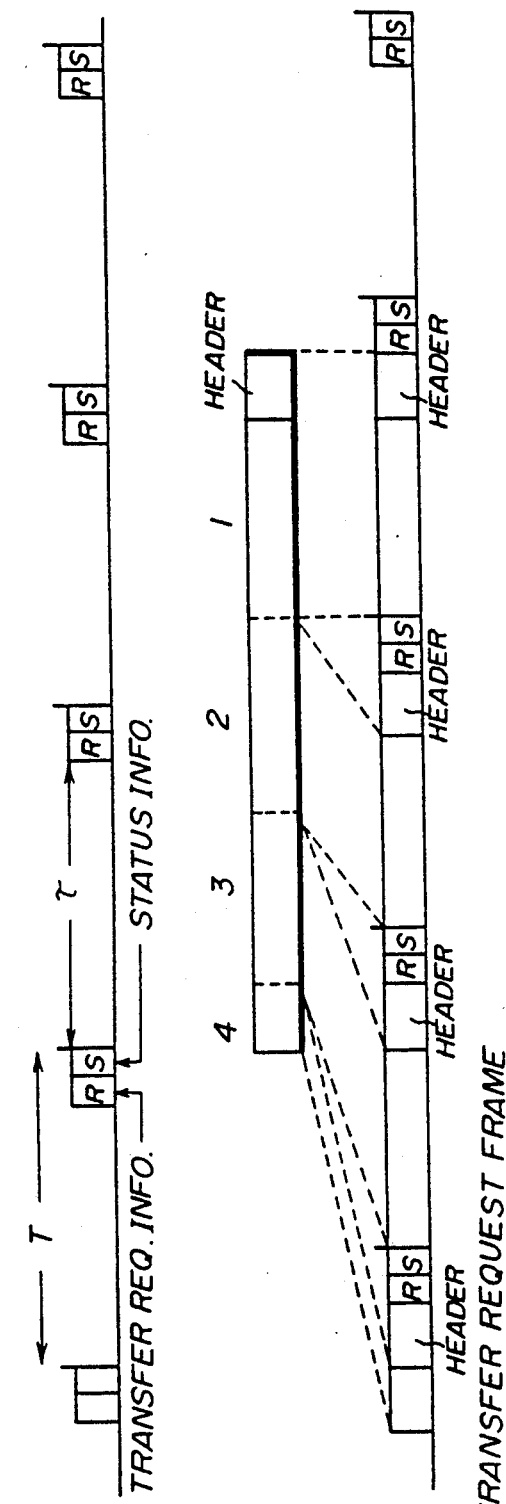
FIGS. 16A-16D are a diagram illustrating the principle of the operation of the packet switching system shown in FIG. 15 as well as formats of frames used therein.

A transfer request frame transmitted from each receive packet transfer controller 310 to the corresponding input packet transfer bus 302 has a length less than a transfer period T. In order to make the frame length obtained by adding the status information, the transfer request information, packet information and its packet header equal to or less than the transfer period T, as shown in FIG. 16-(A), an input (original) packet is divided so that the length of each divided packet including the packet header (packet frame) must be less than less than time τ. For this purpose, as shown in FIG. 16-(B), the input packet is divided so that a packet information block ① thereof is formed of packet data having a predetermined time length ($=\tau$) including the packet header added to the leading head of the input packet and that a packet information block ② is formed of header-added packet data which follows the packet data of the block ① and has the predetermined time length τ. In this manner, the input packet is divided into four packet information blocks (packet frames) ①, ②, ③ and ④.

FIG. 16-(C) shows a format of a transfer request frame used in the third embodiment of the present invention. The transfer request frame is composed of status information indicative of the status of a load on the send packet buffer 3111, transfer request information indicative of the send packet transfer controller 311 to which the input packet is to be transferred, requested packet frame number information representative of the number of divided packet frames, and a packet which is transferred to this request frame. It is possible to place, before the packet, continuation information indicating whether or not there is a divided packet information block (packet frame) following the packet contained in the transfer request frame being considered. It will be noted that "R" shown in FIG. 16-(B) denotes data which corresponds to the combination of the transfer request information and the requested packet frame number information, and "S" denotes status information.

FIG. 16-(D) shows a format of the response frame. The response frame is primarily composed of the response information and the packet frame. It is possible to add, before the packet frame, the above-mentioned continuation information.

A description will now be given of the operation of the system shown in FIG. 15. Since the operating principle of the third embodiment of the present invention is similar to that of the aforementioned second embodiment, the following explanation will be mainly taken for an improved procedure of the third embodiment.

When a packet from a transmission line or a terminal is longer than one frame, the dividing circuit 3101 of the receive packet transfer controller 310 divides the input packet into a plurality of packet frames for every predetermined time τ. The divided packet frames are successively stored in the receive packet buffer 3102. At this time, the number of divided packets frames is obtained. The transfer request frame generator 3103 stores the transfer request information provided in the packet header, the status information representative of the status of the paired send packet transfer controller 311, and a packet frame (including the continuation information) which has been permitted to be transferred. Then the transfer request frame generator 3103 sends the transfer request frame shown in FIG. 16-(C) to the corresponding input packet transfer bus 302 (FIG. 15).

All the transfer buffers 304 connected to the input packet transfer bus 302 being considered separate the status information, the transfer request information and the requested packet frame number information from the received transfer request frame and stores this information therein. The packet frame contained in the received transfer request frame is subjected to the switching procedure and is then sent to the output packet transfer bus 303 related to a destination terminal.

The status information, the transfer request information and the requested packet frame number information stored in each of the transfer buffers 304 are successively read out therefrom and then sent to the packet switching control block 305 (FIG. 15). The analyzing circuit 305a of the packet switching control block 305 analyzes the received status information and the transfer request information, and renews the status of all the packet transfer controllers 301. Then the analyzing circuit 305a refers to the table 305 on the basis of the status of the send packet transfer controller 311 related to the transfer request and the requested packet frame number information. The table 305 has a plurality of table areas (1, ..., n). The table areas correspond to mutually different transfer times (number of packet frames), and store the status of the transfer destination and the status of the corresponding output transfer bus. Then the analyzing circuit 305a determines whether or not the present transfer request should be permitted. Answer information representative of the result of the determination procedure is sent to the corresponding transfer buffer 304.

The transfer buffer 304 transfers the response information to the corresponding send packet transfer controller 311 through the output packet transfer bus 303. On the other hand, at the time when the packet is permitted to be transferred by the packet switching control block 305, the packet input from the input packet transfer bus 302 is timing-controlled so that it is passed through the corresponding transfer buffer 304 and then output to the output packet transfer bus 303. In this procedure, the response information is sent at a timing before the packet frame is sent. The format of the response frame including the response information is illustrated in FIG. 16-(D). The send packet transfer controller 311 receives the response frame and supplies the response information contained therein to the paired receive packet transfer controller 310. Then the send packet transfer controller 311 executes the packet sending procedure during the next period. Thereby, the packet frame is sent to a destination terminal from the send packet transfer controller 311.

Each packet frame transferred by the transfer request frame or the response frame is discriminated from other information by using the continuation information positioned immediately before the packet frame in the transfer buffers 304 and the send packet transfer controllers 311. Thus, it can be determined whether or not there is the subsequent packet information.

A description will be given of a detailed structure of each receive packet transfer controller 310 shown in FIG. 15 with reference to FIG. 17. In FIG. 17, those parts which are the same as those shown in FIG. 7 are given the same reference numerals. A packet division number counter 38 divides an input packet into packet frames and write the same into the receive packet buffer 31. The packet division number counter 38 also counts the number of packet frames (division number). The division number is sent to a transfer request generating circuit 39.

During operation, a packet supplied from the input port (not shown) is input to the packet header latch circuit 30. The packet header is extracted from the input packet in response to the timing signal 251 (HD-LATCH) from the controller 35. The packet information contained in the input packet passes through the packet header latch circuit 30 and is supplied to the packet division number counter 38. This counter 38 divides the packet information for every predetermined length (corresponding to the aforementioned time length τ). The divided packets are successively written into the receive packet buffer 31. During this operation, the packet division number counter 38 counts the number of divided packet frames (division number, or the number of packet frames by which the input packet is transferred). The length of each packet frame corresponding to the time length τ is determined so that the entire transfer request frame consisting of the status information, the transfer request information, the requested packet frame number information and the continuation information is less than the transfer period T.

FIG. 18 illustrates how to manage divided packet frames. Packet information contained in an input packet is divided into three packet information blocks. The first packet information block adjacent to the packet header forms a unit of transfer (a packet frame) together with continuation information and the switching header (packet header). The continuation information is one-bit data and has a value of "1" when there is packet information included in the subsequent packet information block (frame). On the other hand, when continuation information is "0", there is no packet information included in the next packet information block. The second packet information block forms a unit of transfer together with the continuation information and the switching header, which is a copy of the switching header positioned at the leading head of the input packet. In this manner, packet frames (unit of transfer) are generated from the input packet and stored in the receive packet buffer 31. The number of packet frames is supplied to the transfer request generating circuit 23.

The packet header latched by the packet header latch circuit 30 is analyzed by the transfer request generating circuit 39. In response to the timing signal 352 (REQ-GEN) from the controller 35, the transfer request generating circuit 39 generates a transfer request indicating the send packet transfer controller 311 related to the destination terminal as well as the requested packet frame number information (division number). The packet frames stored in the receive packet buffer 31 are held therein until the timing signal PKT-TRN is generated by the transfer timing generating circuit 36.

The controller 35 is supplied with the response information (which is a response to the transfer request from the receive packet transfer controller 310) from the paired send packet transfer controller 311. The controller 35 determines the transfer timing with which the packet frames are successively transferred by analyzing the response information. The transfer timing generating circuit 36 is notified of the determined transfer timing information 354. The transfer timing generating circuit 36 generates the transfer permission timing signal PKT-TRN for the queuing packet frames in response to the timing information 354 from the controller 35. In response to the timing signal PKT-TRN, the frame generating circuit 33 outputs the corresponding packet frame from the receive packet buffer 31, and generates the transfer request frame shown in FIG. 16-(C) together with the transfer request information, the requested packet frame number information and the continuation information. The transfer request frame thus formed is sent to the corresponding input packet transfer bus 302 (FIG. 15).

When the transfer permission to the packet frame is obtained as response information, a series of packet frames are successively read out from the receive packet buffer 31 at the period T. This operation is repeatedly carried out on the basis of the clock signal from the clock circuit 34.

Figure 8:
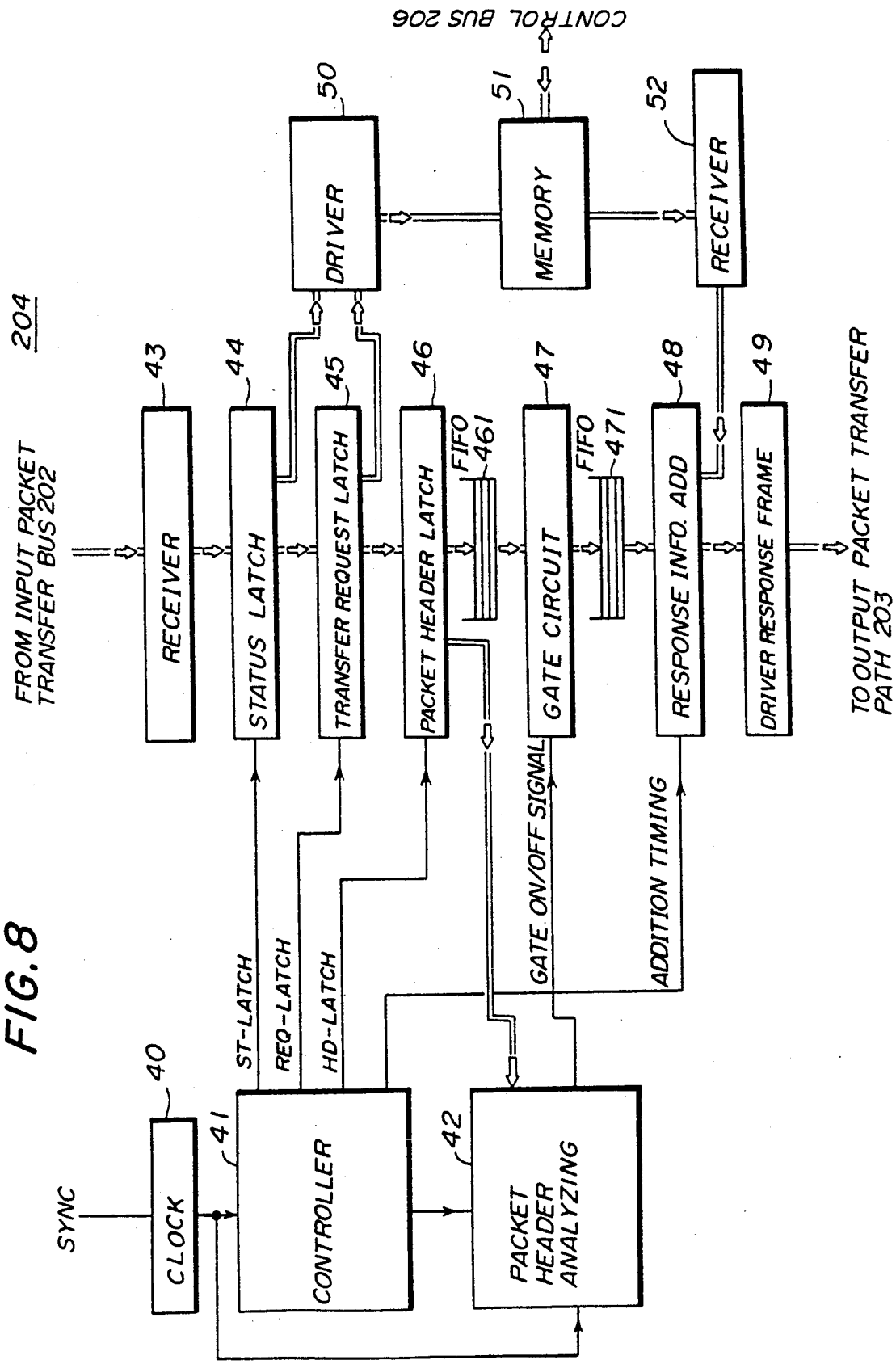
FIG. 8 is a block diagram of a transfer buffer used in the packet switching system shown in FIG. 5.

Each of the transfer buffers 304 has the same structure as that shown in FIG. 8.

Figure 19:
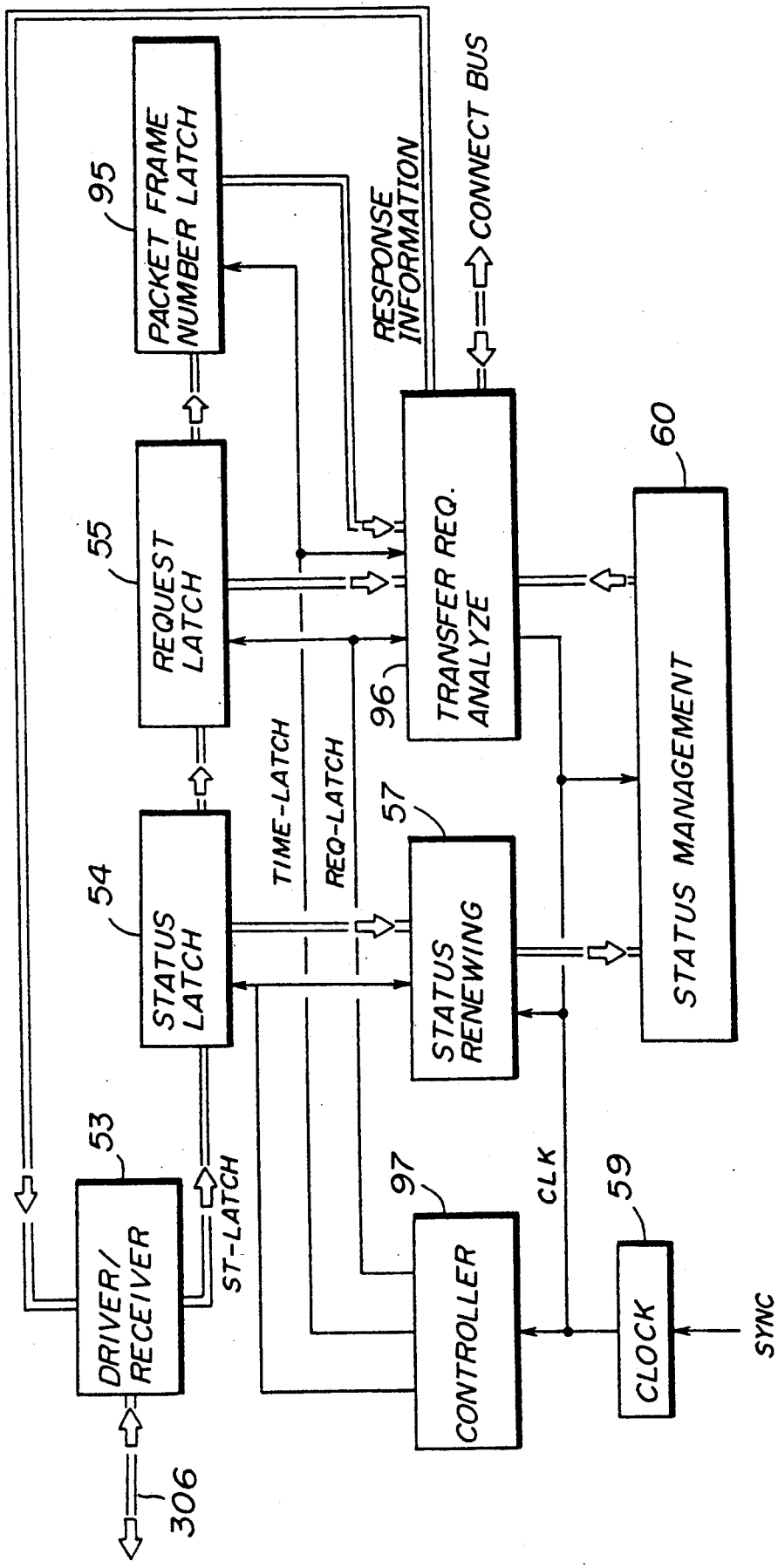
FIG. 19 is a block diagram of a packet switching controller used in the packet switching system shown in FIG. 15.

A description will now be given of the packet switching controller 305 with reference to FIG. 19. The structure shown in FIG. 19 is provided for each of the control buses 306. In FIG. 9, those parts which are the same as those shown in FIG. 9 are given the same reference numerals. A requested packet frame number latch circuit 95 latches the requested packet frame number information contained in the transfer request frame shown in FIG. 16-(C). A controller 97 controls the entire operation of the illustrated configuration and generates a timing signal TIME-LATCH in addition to the aforementioned timing signals ST-LATCH and REQ-LATCH. The timing signal TIME-LATCH is supplied to the requested transfer number latch circuit 95. A transfer request analyzing circuit 96 generates response information from status information supplied from the status management circuit 60.

The operation of the structure shown in FIG. 19 will be described below. The status information, transfer request information and the requested packet frame number information are periodically collected through the corresponding control buds 306 from the transfer buffers 304 by poling. The collected information is supplied to the status latch circuit 54, the transfer request latch circuit 55 and the requested transfer number latch circuit 95 in this order through the driver/receiver 53. The related information is latched by the corresponding latch circuit in response to the corresponding timing signal from the controller 97. The status information is transferred to the status renewing circuit 57, and the transfer request information and the requested packet frame number information are transferred to the transfer request analyzing circuit 96. The status renewing circuit 57 notifies the status management circuit 60 of, as renewed status information, status information (busy or idle) which is different from the previous status information. The status management circuit 60 renews management tables on the basis of the renewed status information. The management tables are of a bit map type, and are capable of accepting transfer requests which would occur at n times from now. That is, n management tables are provided. The status renewing circuit 57 renews the table area related to the present time.

The transfer request analyzing circuit 96 refers to the n management tables by using the transfer request information and the requested packet frame number information, and seeks a period of time which the transfer request can occupy continuously by the requested transfer number. When finding such a period of time, the transfer request analyzing circuit 96 determines a transfer timing and derives the response information from the determined transfer timing. Each of the management tables has a bit indicating whether or not the transfer between each of the input packet transfer buses and each of the output packet transfer buses is possible. When the transfer request is generated, the status management circuit 60 checks the states of the bits related to the transfer route of the input and output packet transfer buses related to the transfer request. The response information is output to the driver/receiver 53 from the transfer request analyzing circuit 96, and is then output to the corresponding control bus 306. The response information is written into the memory 51 (FIG. 8) of each of the related transfer buffers 304.

Figure 10:
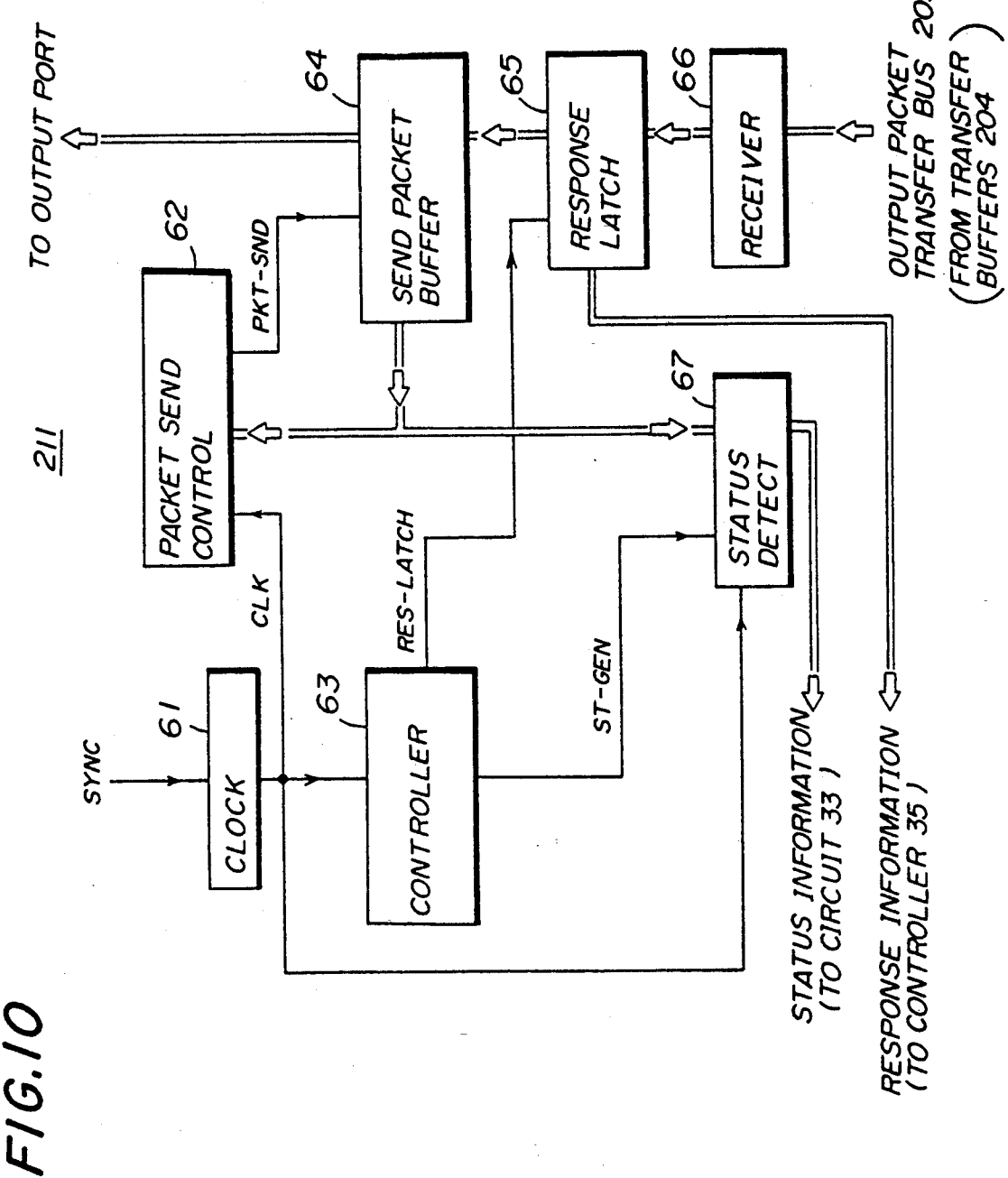
FIG. 10 is a block diagram of a send packet transfer controller used in the packet switching system shown in FIG. 5.

Each of the send packet transfer controllers 311 has the same structure as that shown in FIG. 10. The send packet buffer 64 restores the original packet from the packet frames on the basis of the continuation information contained in the response frame shown in FIG. 16-(D).

FIGS. 20A-20F illustrate how an input (original) packet having a length greater than one frame is processed. FIG. 21 shows the status of the receive packet transfer controller 310, the packet transfer control block 305 and the send packet transfer controller 311 at different times during the operation shown in FIGS. 20A-20F.

FIG. 20-(A) represents a time axis on which times i-3, i-2, ..., i+4 and i+5 are plotted. FIG. 20-(B) shows an input state of a packet to be transferred. In the illustrated example, packets ①②and ③ having different lengths are successively input. FIG. 20-(C) represents the transfer status of a request frame on an input packet transfer bus #j. "S" denotes status information and "R" denotes transfer request information and the requested packet frame number information. FIG. 20-(D) represents transfer information on a control bus #j connecting the packet switching controller 305 and the transfer buffers 304, that is, the status of information supplied from each transfer buffer (such as transfer request information and status information) and the status of response information supplied from the packet switching controller 305. FIG. 20-(E) shows the transfer state on an output packet transfer bus #j. FIG. 20-(F) represents the n management tables provided in the status management controller 60 shown in FIG. 19. It is possible to book packet transfer at up to n times from now. Each of the n management tables is renewed with passage of time and the execution of booking. For the sake of simplicity, management tables for times i-1 to i+6 are illustrated in FIG. 20-(F).

Letters 'k', 'l', 'm', 'n' and 'o' attached to columns of each management table indicate output packet transfer buses 303 (send packet transfer controllers 311), and rows thereof correspond to input packet transfer buses 302 (receive packet transfer controllers 310). The hatched row denotes input packet transfer bus #j. Information at each of the cross points of the rows and columns represents whether or not packet can be transferred therebetween. That is, information is determined depending on the status of the send packet transfer circuits 311 and the status of the transfer buses (that is, depending on whether each transfer bus has been booked for another packet transfer).

Referring to FIG. 21, packet ① having a short length is received at time i-3. When the packet header of packet ① has k, the receive packet transfer controller 310 sends a transfer request frame having transfer request k and a required packet frame number of 1 at time i-2 to input packet transfer bus #j (FIG. 20-(C)). The packet switching control block 305 receives the transfer request frame and executes the aforementioned operation on the same. Thereby, the management table corresponding to time i (FIG. 20-(F)) is booked and the response information frame is sent to the send packet transfer controller 311 at time i-1 (FIG. 20-(E)). That is, packet ① is booked to be transferred at time i.

On the other hand, at time i-1, packet ② having a length of 2τ+α is received by the receive packet transfer controller 310, and a transfer request of 1 (destination) and a requested packet frame number of 3 are obtained. This information is sent to the input packet transfer bus 302 at time i. At this time, packet ① which has been permitted to be transferred is transferred (the continuous information contained in the transfer request frame has a value of "0" since packet ① is completely transferred during this time). Packet ① is transferred to the send packet transfer controller 311 related to the destination terminal (#k) via the transfer buffer 304.

The packet switch control block 305 executes the operation on the received transfer request information and the requested packet frame number. In this case, it is determined that a period of time which satisfies a requested packet frame number of 3 is available from i+2 to i+4. This period of time is booked and the response frame is sent to the send packet transfer controller 311 at time i+1. The receive packet transfer controller 310 receives the response frame via the paired send packet transfer controller 311. Then the receive packet transfer controller 310 successively sends a series of three packet frames in the period of time starting from time i+2 (FIG. 20-(C)). Along with the transfer procedure for packet ②, a procedure for transferring packet ③ is executed as shown in FIGS. 20 and 21.

A description will now be given of a packet switching system according a fourth embodiment of the present invention. In each of the aforementioned first, second and third embodiments of the present invention, the receive packet transfer controllers receive transfer requests from terminals or interface circuits which are provided between buses and terminals. The receive packet transfer controllers must collect the transfer requests one by one. That is, the receive packet transfer controllers must sequentially determine whether or not each of the terminals or interface circuits generates the transfer request. It takes a long time to access all the terminals or interface circuits and collect the transfer requests. As a result, there is a possibility that the status of the system may change when accessing to all the terminals or interface circuits have been completed. The fourth embodiment of the present invention is directed to effectively and efficiently collecting status information including transfer requests from terminals or interface circuits.

Figure 22:
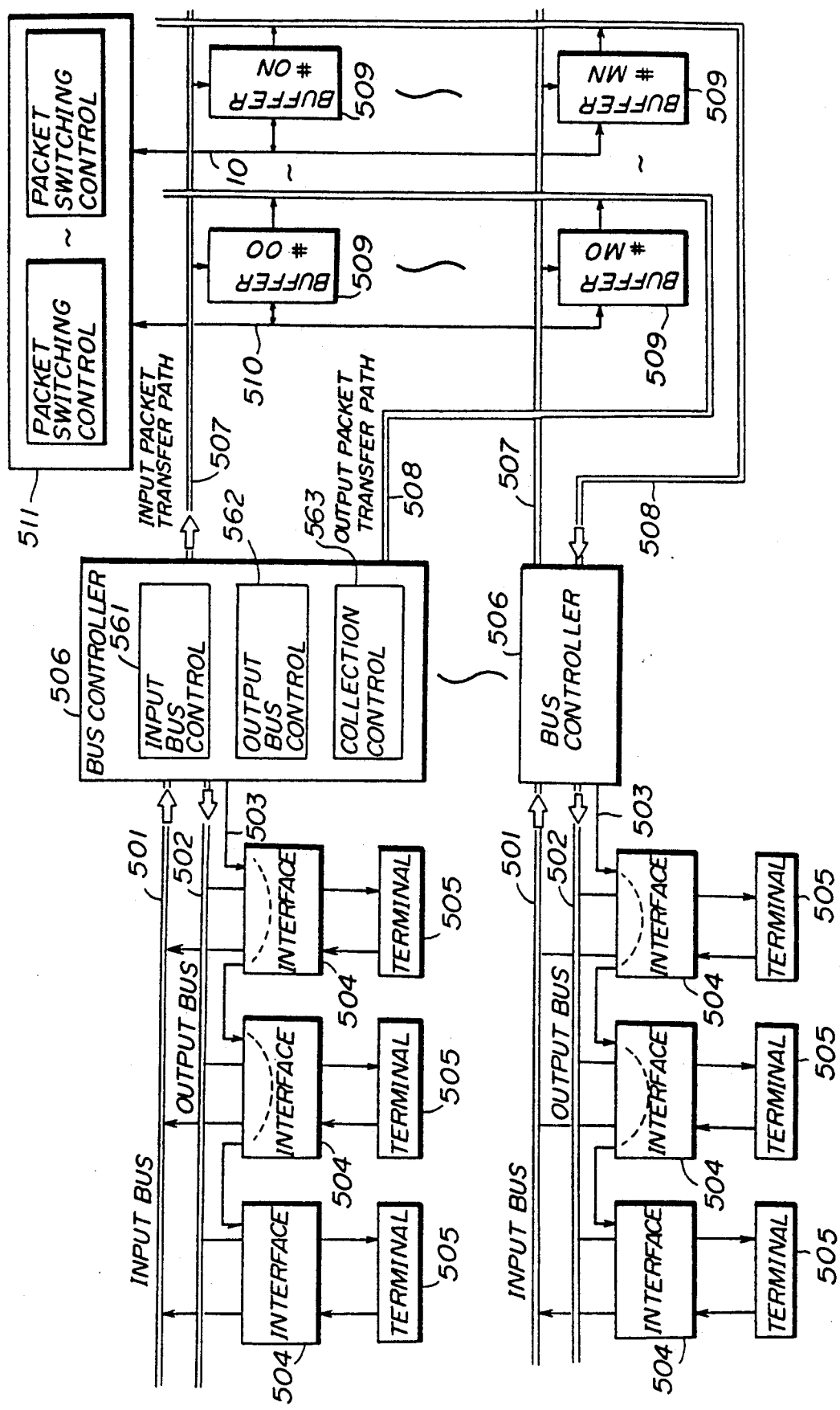
FIG. 22 is a block diagram of a packet switching system according to a fourth preferred embodiment of the present invention.

Referring to FIG. 22, there is illustrated the packet switching system according to the fourth embodiment of the present invention. The packet switching system in FIG. 22 includes input buses (paths) 501, output buses (paths) 502, collection control buses 503, line interface circuits 504, terminals 505 and bus controllers 506. The input buses 501 and the output buses 502 connect the interface circuits 504 and the bus controllers 506. The collection control buses 503 are physical or logical buses and connect the line interface circuits 504 in tandem form so that status information about the interface circuit 504 is sent to the bus controllers 506. Physical buses are realized by providing special buses. Logical buses are realized by providing special channels on the input buses 501 and the output buses 502. The interface circuits 504 accommodate terminals 505 or transmission lines, and send and receive control information to and from the corresponding bus controllers 506. Transmission lines can be provided in place of the terminals 505. Each of the bus controllers 506, which corresponds to the aforementioned packet transfer controller, is connected to the input and output buses 501 and 502, input packet transfer buses 507 and output packet transfer buses 508. Each of the bus controllers 506 is composed of an input bus controller 561, an output bus controller 562 and a collection controller 563. The input bus controller 561 and the output bus controller 562 are paired and include the functions of the aforementioned receive packet transfer controller and send packet transfer controller. The collection controller 563 is connected to the collection control bus 503 and collects information from the interface circuits 504. Further, the system includes transfer buffers 509, control buses 510 and a packet switching control block 511. The packet switching control block 511 has a packet switching controller provided for each of the control buses 510.

The input packet transfer buses 507, the output transfer buses 508, the transfer buffers 509, the packet switching control block 511 and the control buses 510 are the same as the corresponding elements of the second or third embodiment of the present invention. The switching control (that is, transfer control via transfer buffers) executed at the input bus controller 561 and the output bus controller 562 provided in each of the bus controllers 506 is the same as that executed in the second or third embodiment of the present invention.

A description will now be given of transfer control between interface circuits 504 and the bus controllers 506. Each of the interface circuits 504 receives information on packet storage status or transfer request information sent from the terminals 505 (or transmission lines), and stores the received information in a buffer (not shown in FIG. 22) provided therein. Each of the interface circuits 504 transfers the received information through the collection control bus 503 which is independent of the input buses 501 and the output buses 502. The information on the collection control bus 503 is collected under the control of the collection controller 563 of the corresponding bus controller 506.

As has been described previously, each of the collection control buses 503 is arranged in tandem form. When it is assumed that a portion of each collection control bus 503 close to the corresponding bus controller 506 is on the upstream side of information transfer, information is transferred from the downstream side to the upstream side. The collection of the above-mentioned information is periodically executed by an instruction from the corresponding collection controller 563. During this operation, each of the interface circuits 504 on the downstream side compresses its own information, and sends the compressed information to the interface circuit 504 which is adjacent to the interface circuit 504 being considered on the upstream side. In this manner, each of the collection controllers 563 obtain information from the corresponding interface circuits 504. In response to an instruction from the related collection controller 563, each of the interface circuits 504 adds its own compressed information (information representative of its own status) to the last compressed information which is sent from the downstream accommodating terminals 504.

Each of the collection controllers 563 of the bus controllers 506 manages the status information about the related interface circuits 504. Each of the input bus controllers 561 generates the aforementioned transfer request frame which includes the status information about the paired output bus controller 562 and a packet which has been permitted to be transferred. Then the transfer request frame is transferred to the corresponding packet switching controller of the packet switching control block 511 via the corresponding transfer buffer 509 and control bus 510.

Each of the packet switching controllers in the blocks 511 generates response information by the aforementioned procedure, and sends the same to the related transfer buffer 509. Then the response frame is sent from the transfer buffer 509 to the corresponding bus controller 506. The packet contained in the response frame is sent to the destination terminal 505 via the corresponding interface circuit 504. On the other hand, the response information is supplied from the output bus controller 562 to the related input bus controller 561, and the transfer control of packets sent to the corresponding input packet transfer bus 507 is excuted.

Figure 23:
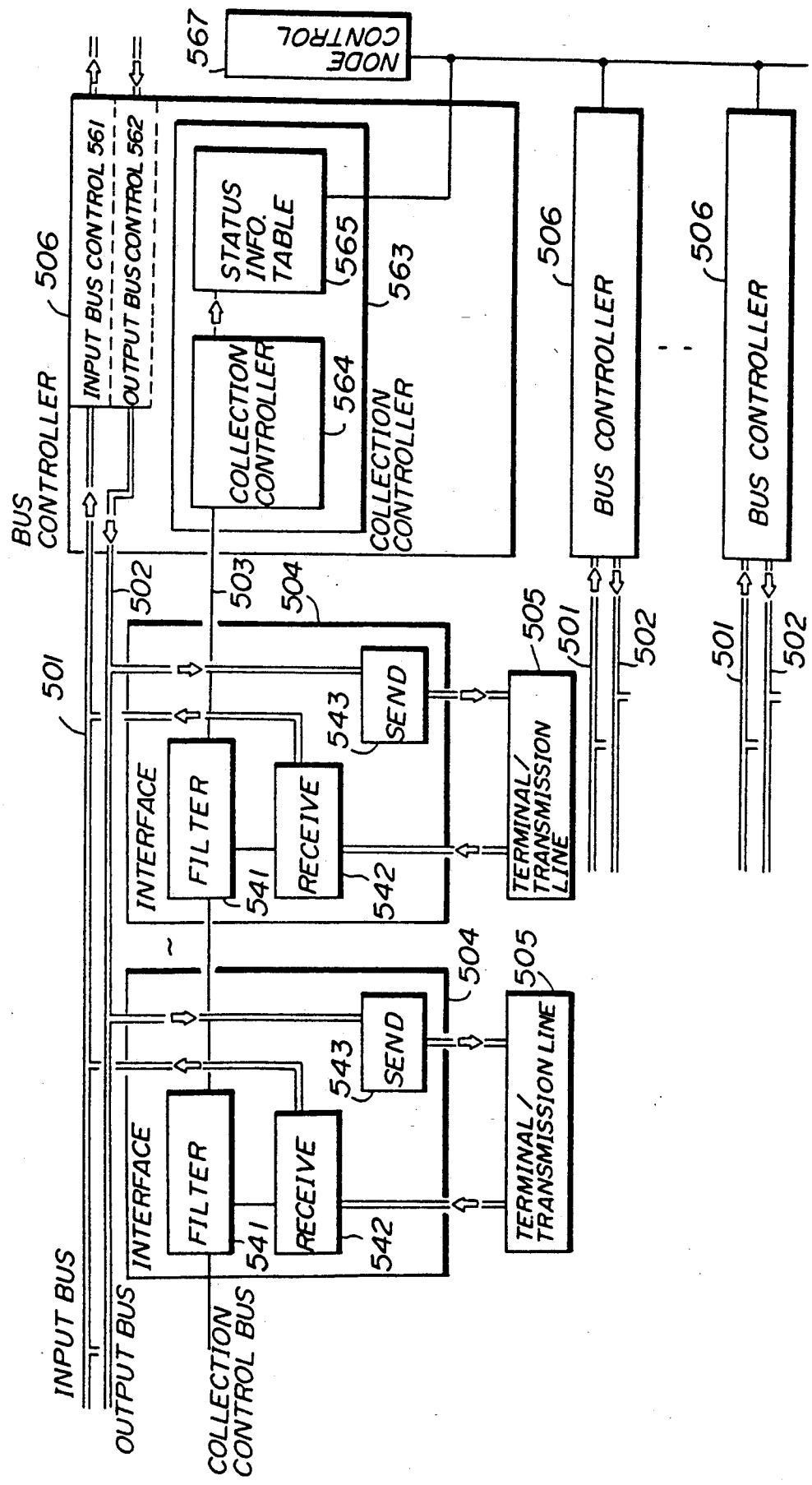
FIG. 23 is a block diagram of an interface circuit and a bus controller used in the packet switching system shown in FIG. 22.

A description will be given of a detailed structure of the interface circuits 504 and the bus controllers 506 shown in FIG. 22 with reference to FIG. 23. In FIG. 23, those parts which are the same as those shown in FIG. 22 are given the same reference numerals. Each of the interface circuits 504 is made up of a filter circuit 541, a receive circuit 542 and a send circuit 543. Each of the bus controllers 506 is composed of a pair of input bus controller 561 and output bus controller 562 as well as the collection controller 563. The collection controller 563 is composed of a collection control circuit 564 and a status information table 565. A node controller 567 is connected to the status information table 565 of each of the bus controllers 506 and controls a read/write operation on the status information tables 565.

Send-packets from the terminals 505 or transmission lines are stored in the receive circuits 542 of the corresponding interface circuits 504. The status information of the interface circuits 504 is sent to the collection control bus 503 at a timing defined by the filter circuits 541. The send packets are read out from the receive circuits 542 and then supplied to the input bus 501. Receive-packets are supplied from the output bus 502 and then written into the send circuits 543. The send circuits 543 input receive packets having address information representative of its own.

Each of the interface circuits 504 adds its own status information to data received from the neighboring interface circuit 504 positioned on the downstream side (left-hand side of the drawing) thereof, and sends the status-information-added-data to the upstream interface circuit 504. In this manner, status information is sequentially added to the received data and then transferred to the collection controller 563. Status information about all the related interface circuits 504 is written into corresponding areas of the status information table 565.

Figure 24:
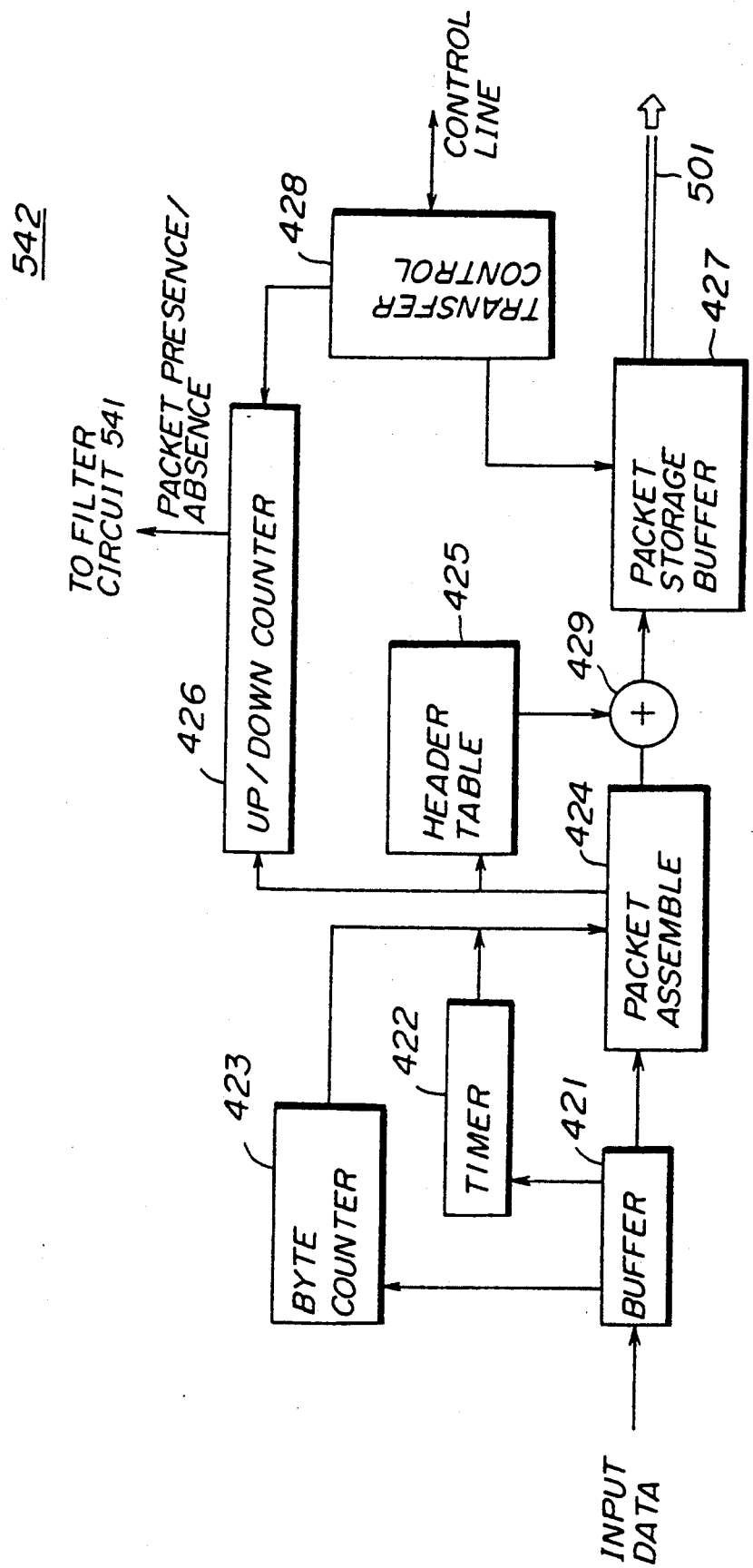
FIG. 24 is a block diagram of a receive circuit in the interface circuit shown in FIG. 23.

A description will be given of each receive circuit 542 shown in FIG. 23 with reference to FIG. 24. Input data from the corresponding terminal (or transmission line) 505 is input to a buffer 421. A byte counter 423 counts the number of bytes forming the input data. A timer 422 measures a predetermined time. A packet assembling circuit 424 assembles a packet having a predetermined byte length from the input packet in the buffer 421 for every predetermined time on the basis of the contents of the byte counter 423 and the timer 422. When the assembled packet is output from the packet assembling circuit 424, it outputs an instruction to a packet header table 425 and an up/down counter 426. An adder 429 adds header information including a destination address and a source address to the packet having the predetermined byte length from the packet assembling circuit 424. The packet with the header added is then stored in a packet storage buffer 427. In response to the aforementioned instruction from the packet assembling circuit 424, the up/down counter 426 is incremented by +1.

The packet in the packet storage buffer 427 is read out therefrom and sent to the input bus 501 in a transfer permission signal, which is supplied to the packet storage buffer 427 from a transfer control circuit 428. At this time, the up/down counter 426 is decremented by +1. Thus, the up/down counter 426 outputs a count value equal to or greater than "1" when there is one or more packets in the packet store buffer 427. The up/down counter 426 outputs a packet presence/absence signal to the filter circuit 541 (FIG. 23). The transfer control circuit 428 is controlled by a signal on a control line contained in the input bus 501.

Figure 25:
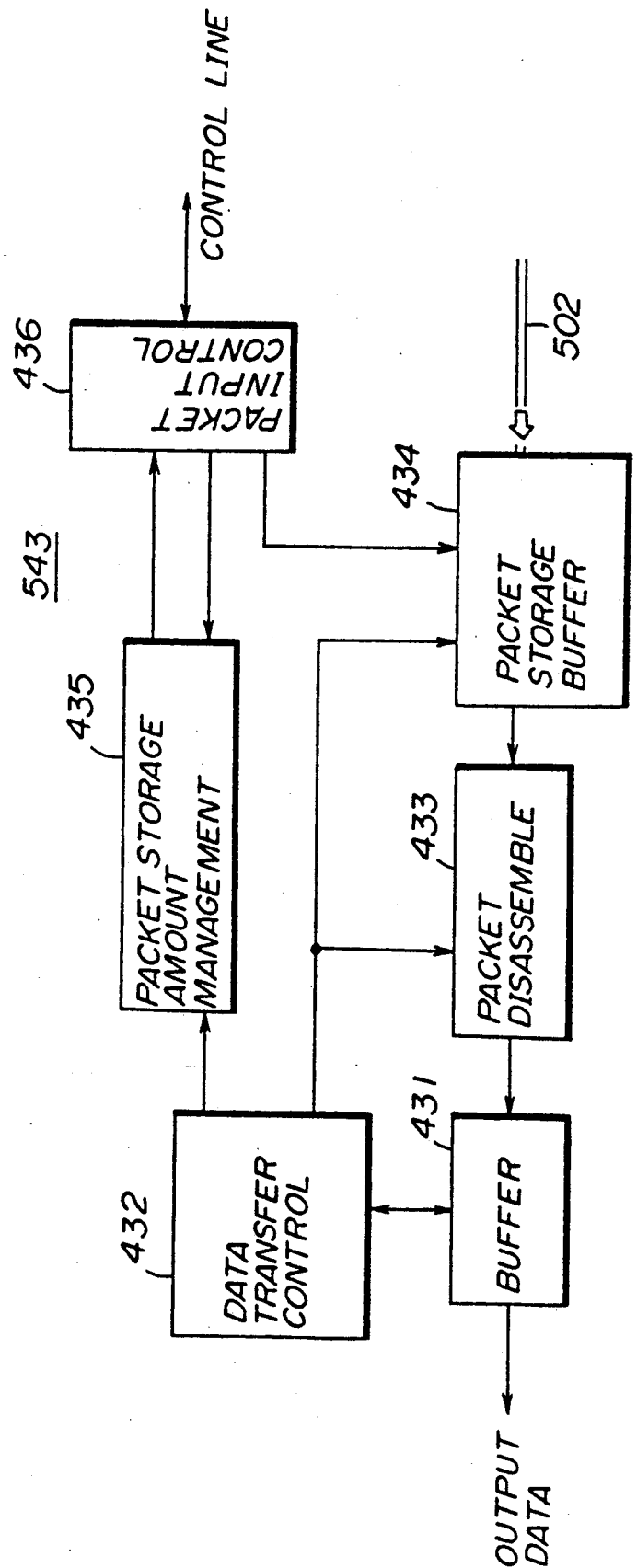
FIG. 25 is a block diagram of a send circuit in the interface circuit shown in FIG. 23.

FIG. 25 is a block diagram of each send circuit 543 shown in FIG. 23. When a packet sent from the bus controller 506 (FIG. 23) is input to each interface circuit 504, a packet input control circuit 436 is controlled by a signal on a control line contained in the output bus 502. At this time, a packet storage buffer 434 is activated by the packet input control circuit 436 and stores a packet on the output bus 502. Each time a packet is input, a packet storage amount managing circuit 435 receives an instruction from the packet input control circuit 436, and counts the number of packets stored in the packet storage buffer 434. Packets stored in the packet storage buffer 434 are successively read out therefrom and supplied to a packet disassembling circuit 433. The packet disassembling circuit 433 disassembles each packet from the packet storage buffer 434, and outputs data contained in disassembled packets to a buffer 431. The data is then output, as output data, to the corresponding terminal (or transmission line) 505 under the control of a data transfer control circuit 432. Each time the packet is transferred to the terminal 505 from the buffer 431, a signal representative of this transfer is supplied to the packet storage amount managing circuit 435 so that the number of packets stored in the packet storage buffer 434 is always managed in accordance with the signals from the packet input control circuit 436 and the data transfer control circuit 432. When a number of packets in the packet storage buffer 434 becomes equal to or greater than a predetermined number, the bus controller 506 is notified of this fact.

A description will be given of each filter circuit 541 (FIG. 23) with reference to FIGS. 26 and 27A-27B. Referring to FIG. 26, a down collection control bus line 5031 and an up collection control bus line 5032 form the aforementioned collection control bus 503 (FIG. 22). The down and up collection control buses 5031 and 5032 on the right (upstream) side of the drawing are connected to the interface circuit 504 of the next stage, and the down and up collection control buses 5031 and 5032 on the left (downstream) side of the drawing are connected to the interface circuit 504 of the previous stage.

Command ① having a format shown in FIG. 27-(A) is sent to the down collection bus line 5031 from the bus controller 506 via the interface circuits 504 located on the upstream side. The command ① is used for collecting necessary information. The command ① is composed of a starting code, and a total number of interface circuits 504 connected to the input and output buses 501 and 502, and an area which is not used. A header detecting circuit 415 detects the starting code of the command ① on the up collection control bus line 5032 from the previous stage, and activates a collection notifying circuit 413. The activated collection notifying circuit 413 notifies the receive circuit 542 (FIG. 23) of the detection of the starting code. In response to this notice, the receive circuit 542 outputs the status information indicating whether or not there is any packet to be transmitted. The status information from the receive circuit 542 is then written into a memory circuit 418.

The total number of interface circuits 504 is input to a decrement circuit 412 via the header detection circuit 411. The decrement circuit 412 decrements the total number contained in the command ① and writes a decremented total number in the same position in the command ①. Then the command having the renewed total number of interface circuits 504 is transferred to the interface circuit 504 of the previous stage.

In this manner, the command ① is seriously transferred to the tandem-connected interface circuits 504. When the command ① reaches the interface circuit 504 of the final stage, the total number of interface circuits 505 included in the command ① is "0". The interface circuit 504 of the final stage sends response ② having a format shown in FIG. 27-(B) to the up collection control bus line 5032. The response ② includes a response code provided at the leading portion thereof. Subsequent to the response code, a fixed-length block consisting of an interface circuit identification number and a data area is arranged in turn starting from the interface circuit 504 farthest from the bus controller 506 (having an interface circuit identification number of "0"). Each interface circuit 504 writes data into the corresponding data area. A delimiter is provided at the end of the response ②.

In the interface circuit 504 having an interface circuit identification number of "0" farthest from the bus controller 506, status information about the receive circuit 542 in the memory circuit 418 is written into the data area specified by its own interface circuit identification number ("0"). This operation is carried out in the filter circuit 541 of each of the interface circuits 504. Referring to FIG. 26, a header detection circuit 415 detects the response code (FIG. 27-(B)). After that, each time the header detection circuit 415 detects a pair of interface circuit identification number and data area, it instructs a counter circuit 416 to increment the counter value by +1. Thus, the counter circuit 416 indicates how many pairs of interface circuit identification number and data area are detected. A setting circuit 417 has an address of the interface circuit 504 being considered, and compares the same and the counter value in the counter circuit 416. When it is determined that the counter value in the counter circuit 416 is equal to the address provided in the setting circuit 417, the counter circuit 416 activates the memory circuit 418, which outputs the status information. A delay circuit 414 delays the response signal from the header detecting circuit 415 so that the status information is positioned at the predetermined position in the response. In the above-mentioned manner, each of the interface circuits 504 writes the status information about the related receive circuit 542 into the corresponding data area in the response shown in FIG. 27-(B).

Figure 28:
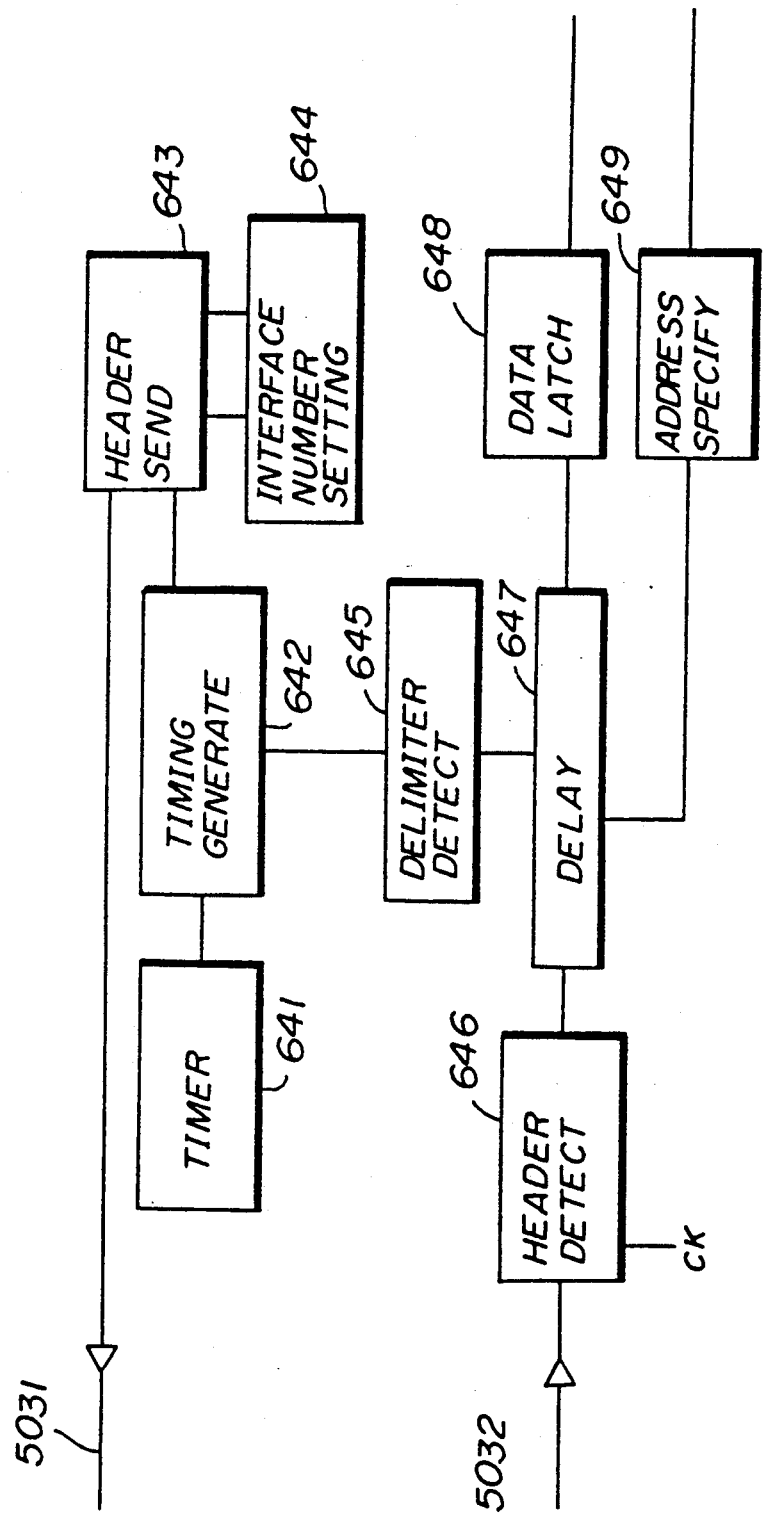
FIG. 28 is a block diagram of a collection control circuit provided in a bus controller shown in FIG. 23.
Figure 29:
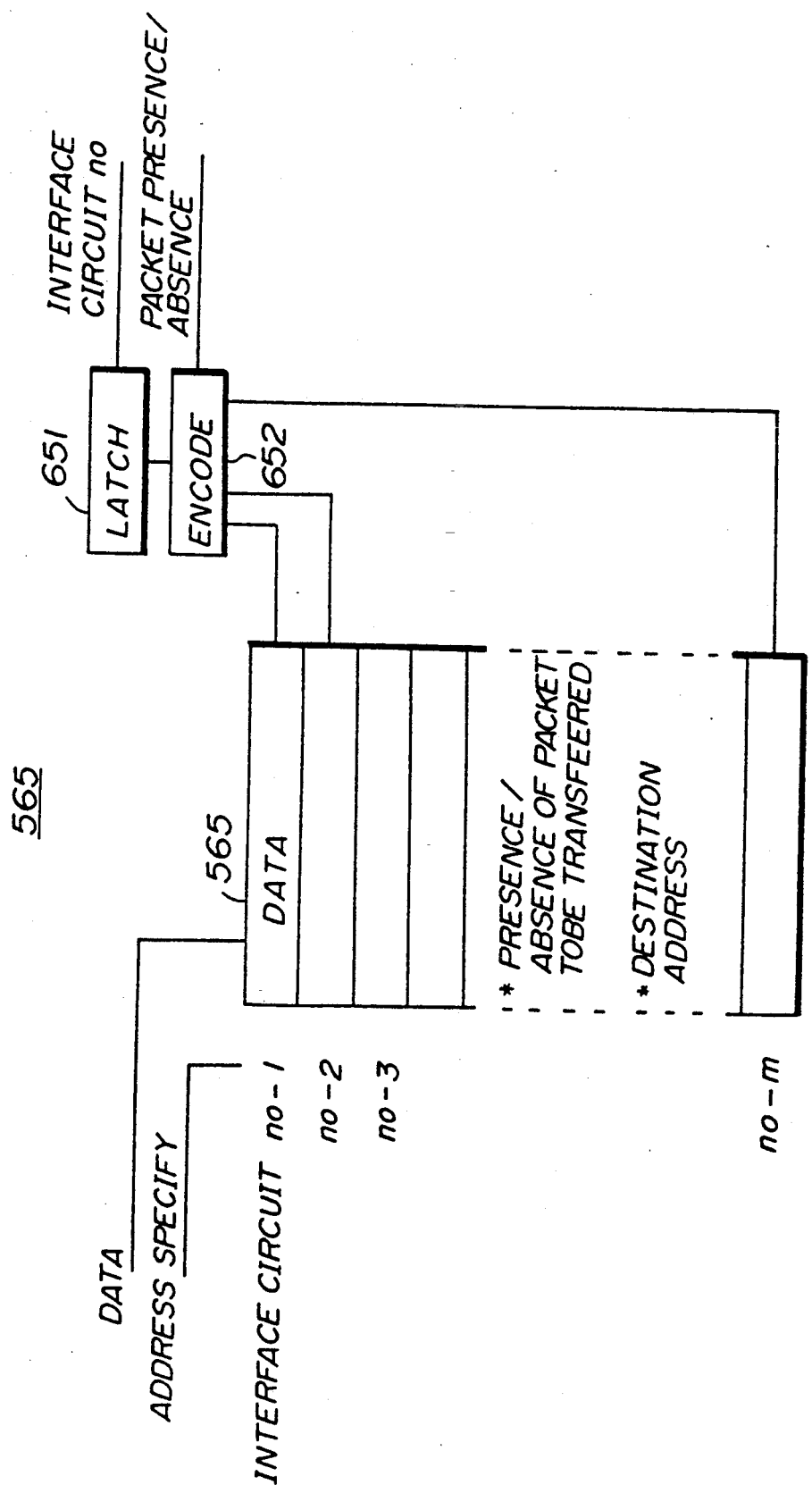
FIG. 29 is a block diagram of a status information table provided in the bus controller shown in FIG. 23.

A description will now be given of a detailed structure of each bus controller 506 (FIG. 23) with reference to FIGS. 28 and 29. FIG. 28 is a block diagram of the collection control circuit 564, and FIG. 29 is a block diagram of the status information table 565. As has been described previously, the collection control circuit 564 collects the status information from the interface circuits 504 via the down collection control bus line 5031 and the up collection control bus line 5032. The status information table 565 holds the collected status information, which is used for packet transfer control.

Referring to FIG. 28, a timer circuit 641 generates a time-out signal when a predetermined time elapses. A delimiter detecting circuit 645 detects the delimiter contained in the response frame shown in FIG. 27-(B). When the timer circuit 641 generates the time-out signal or when the delimiter detecting circuit 645 detects the delimiter, a timing generating circuit 642 generates a timing signal for collecting information. In response to this timing signal, a header sending circuit 643 sends command ① shown in FIG. 27-(A). A setting circuit 644 stores data indicative of the total number of interface circuits 504. Subsequent to the header, the total number from the setting circuit 644 is sent to the down collection control bus 5031 via the header sending circuit 643. When the response is sent back from the interface circuits 504 after sending command ①, a header detecting circuit 646 detects the response code provided in the leading portion of the response shown in FIG. 27-(B) in response to a clock CK. Pairs of interface circuit identification numbers and data are delayed by a delay circuit 647. The interface circuit identification numbers from the delay circuit 647 are written into an address specifying circuit 649, and data are written into a data latch circuit 648.

Referring to FIG. 29, when data and interface circuit identification numbers (hereinafter also referred to addresses) are written into the data latch circuit 648 and the address specifying circuit 649, respectively, a write operation on the status information table 565 is started. The status information table 565 has a table area provided for each of the interface circuit identification numbers no-1, no-2, no-3, ..., no-m. Data read out from the data latch circuit 648 is written into the corresponding table area specified by the interface circuit identification number in the address specifying circuit 649. When data related to the interface circuit identification numbers contained in the response are input to the status information table 565, the latest status information on the interface circuits 504 are obtained.

The status information table 565 stores the aforementioned information indicating whether or not there is any packet requested to be transferred, and address information about a destination. When there is one packet transfer request, the transfer request to the input bus controller 561 (FIG. 23) is generated. At this time, the packet presence/absence information and address information on the destination are read out from each of the table areas of the status information table 565 and are then supplied to an encoder 652. The encoder 652 encodes the packet presence/absence information into a code. The address information from the status information table 565 is encoded into a corresponding interface circuit identification number, which is then latched in a latch circuit 651.

A description will now be given of each input bus controller 561 shown in FIG. 23 with reference to FIG. 30, in which those parts which are the same as those shown in FIG. 7 are given the same reference numerals. The input bus controller 561 inputs a packet supplied from one of the interface circuits 504 in accordance with an instruction from the aforementioned status information table 565, and outputs the same to the related transfer buffer 509.

Figure 30:
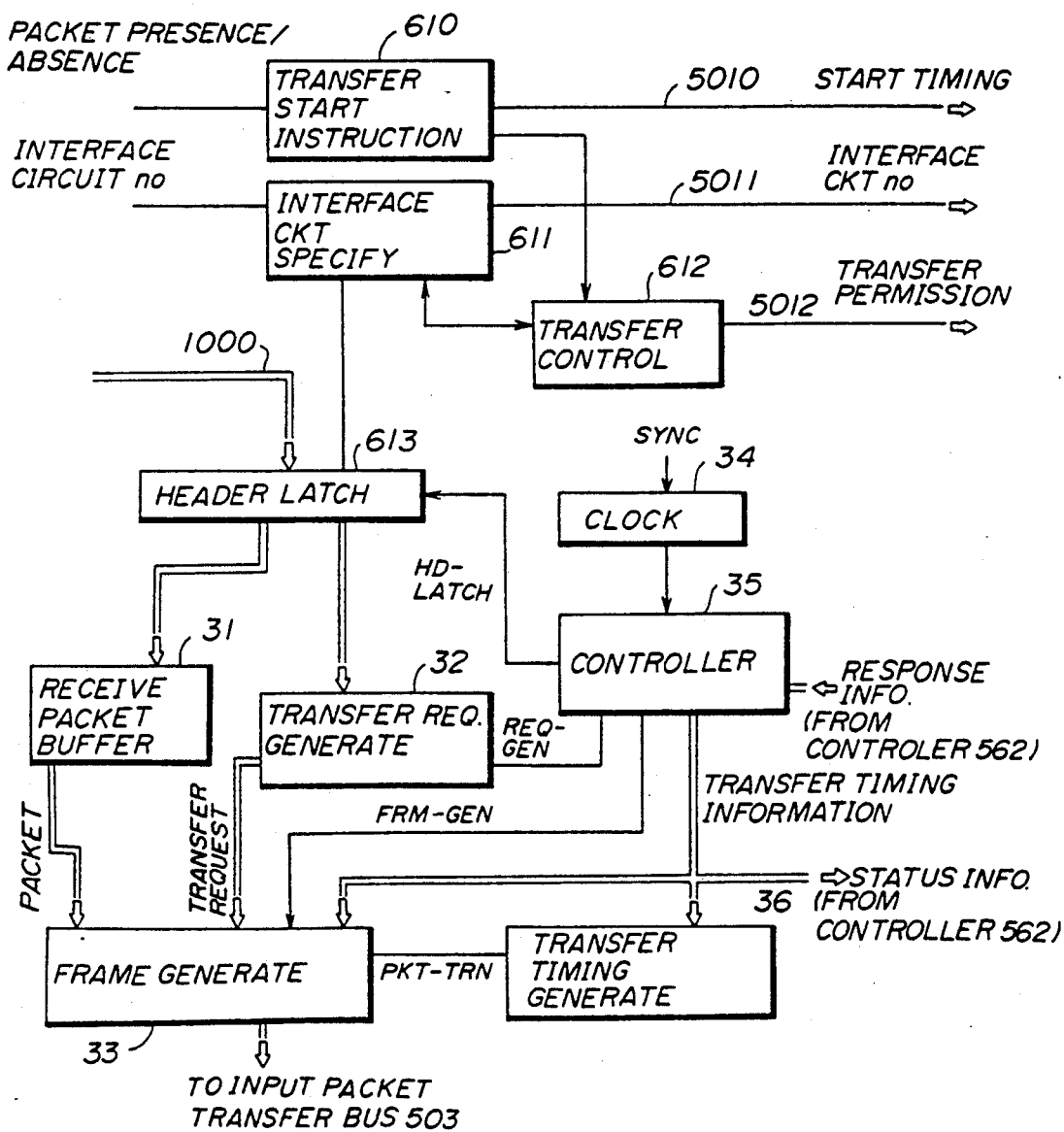
FIG. 30 is a block diagram of an input bus controller shown in FIG. 23.

Referring to FIG. 30, a packet header latch circuit 613 latches the packet header included in the received packet through an input bus 1000 connected to the input bus 501 (FIG. 23). The packet presence/absence information and the interface circuit identification number read out from the status information table 565 (FIG. 29) are input to a transfer start instruction circuit 610 and an interface circuit specifying circuit 611, respectively. A transfer control circuit 612 discriminates the packet presence/absence information in the circuit 610 and the interface circuit identification number in the circuit 611. Then the transfer control circuit 612 instructs the transfer start instruction circuit 610 to output an input start timing signal to a control bus line 5010. Also, the transfer control circuit 612 instructs the interface circuit specifying circuit 611 to output the latched interface circuit identification number to a control bus line 5011. Further, the transfer control circuit 612 outputs a transfer permission signal to a control bus line 5012. The control bus lines 5010, 5011 and 5012 form a control bus included in the input bus 501 (FIG. 22). The signals on the control bus lines 5010, 5011 and 5012 are received by the receive circuit 542 (FIG. 23) of the interface circuit 504 specified by the signal on the line 5011, and are detected by the transfer control circuit 428 (FIG. 24). Then the transfer control circuit 428 controls the packet storage buffer 427 (FIG. 24) so that a packet is output to the input bus 501.

The packet from the input bus 501 is applied to the packet header latch circuit 613 (FIG. 30), and the packet header thereof is latched therein in response to the timing signal HD-LATCH from the controller 35. The received packet is written into the receive packet buffer 31. The packet header in the packet header latch circuit 613 is supplied to the transfer request generating circuit 32, which analyzes the same. In response to the timing signal REQ-GEN, the transfer request generating circuit 32 generates a transfer request representative of the output bus controller 562 related to the destination terminal. The controller 35 is supplied with the aforementioned response information via the paired output bus controller 562. The controller 35 analyzes the received response information, and generates transfer timing information about the packet stored in the receive packet buffer 31. The generated transfer timing information is sent to the transfer timing generating circuit 36. Then the transfer timing generating circuit 36 sends the transfer permission timing signal PKT-TRN to the frame generating circuit 33. In response to the timing signal PKT-TRN, the frame generating circuit 33 generates the transfer request frame (FIG. 6A) from the packet read out from the receive packet buffer 31 and the transfer request information from the transfer request generating circuit 32. The transfer request frame thus generated is sent to all the transfer buffers 509 (FIG. 22 connected to the corresponding input packet transfer bus 507 (FIG. 22). The above-mentioned operation is repeatedly carried out at the predetermined period based on the clock signal from the clock circuit 34.

Figure 31:
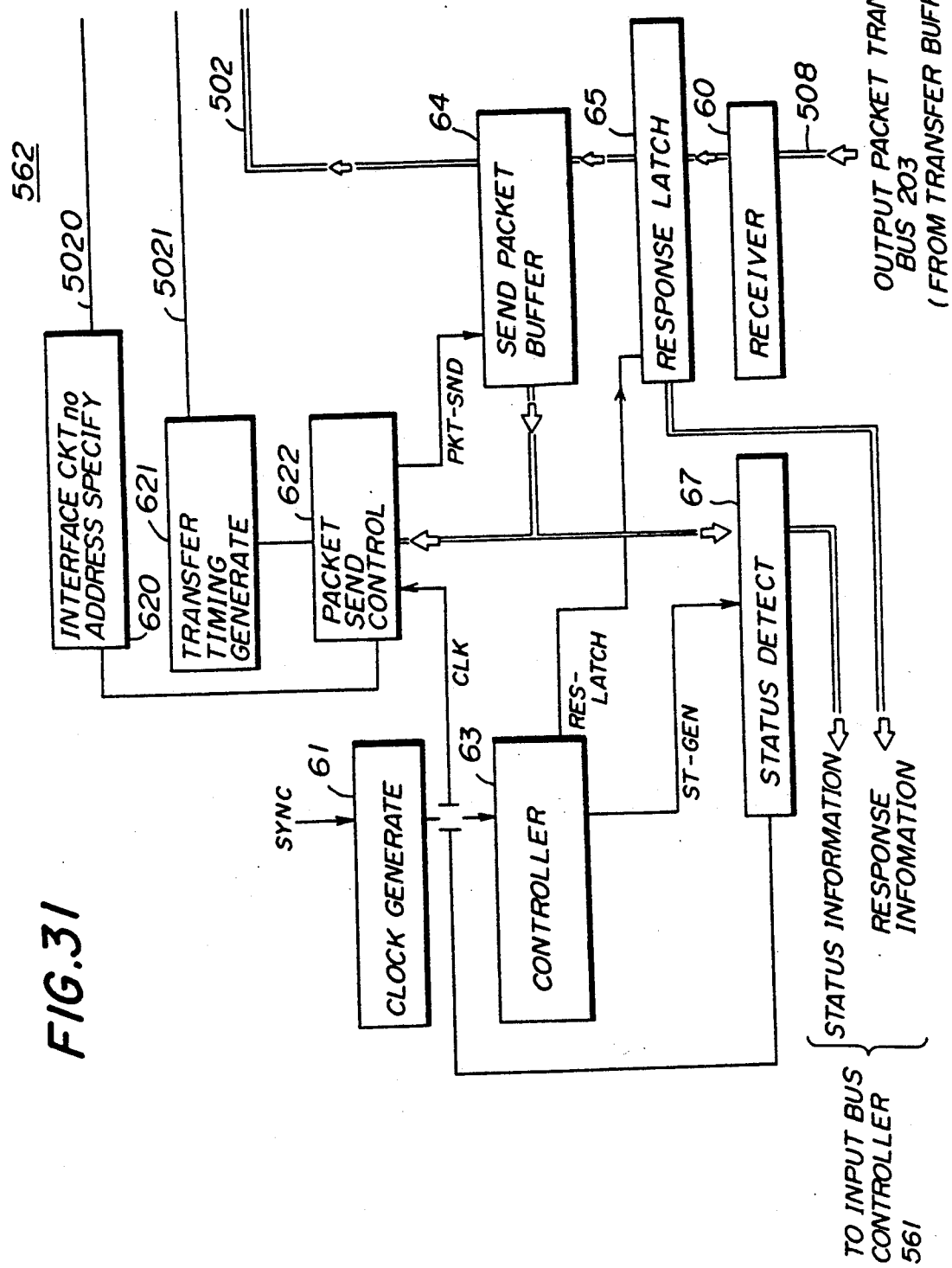
FIG. 31 is a block diagram an output bus controller shown in FIG. 23.

A description will now be given of the output bus controller 562 (FIG. 23) provided in each of the bus controllers 506 with reference to FIG. 31. In FIG. 31, those parts which are the same as those shown in FIG. 10 are given the same reference numerals. A packet send control circuit 622 executes a procedure for transferring a packet in the transfer packet buffer 64 to the corresponding output bus 502.

The response frame carried on the output packet transfer bus 508 is input to the receiver 66, which outputs the same. In response to the timing signal REQ-LATCH from the controller 63, the response latch circuit 65 latches the response information contained in the received packet frame. The response information is then sent to the controller 35 of the paired input bus controller 561 (FIG. 30). The packet information extracted from the response frame is stored in the send packet buffer 64. The status detecting circuit 67 monitors the send packet buffer 64, and periodically notifies the frame generating circuit 33 of the paired input bus controller 561 (FIG. 30) of status information about the send packet buffer 64 representative of the status of a load thereon.

The packet information stored in the send packet buffer 64 is sent to the output bus 502 under the control of the packet send control circuit 622. During this operation, the interface circuit identification number supplied from the packet send control circuit 622 is written into an address specifying circuit 620. The address in the address specifying circuit 620 indicates the interface circuit identification number of an interface circuit to which the packet in the send packet buffer 64 is to be sent. Further, the packet send control circuit 622 controls a transfer timing generating circuit 621 so that it outputs a transfer timing signal. The interface circuit identification number (address) and the transfer timing signal are sent to control bus lines 5020 and 5021, both of which are included in the output bus 502. When the packet input control circuit 436 of the send circuit 543 (FIG. 25) determines that the interface circuit identification number is the same as its own number, the packet on the output bus 502 is written into the packet storage buffer 434.

A description will now be given of a packet switching system according to a fifth embodiment of the present invention. The fifth embodiment of the present invention is directed to providing a packet switching system which is simpler than each of the aforementioned first, second, third and fourth embodiments of the present invention.

Figure 32:
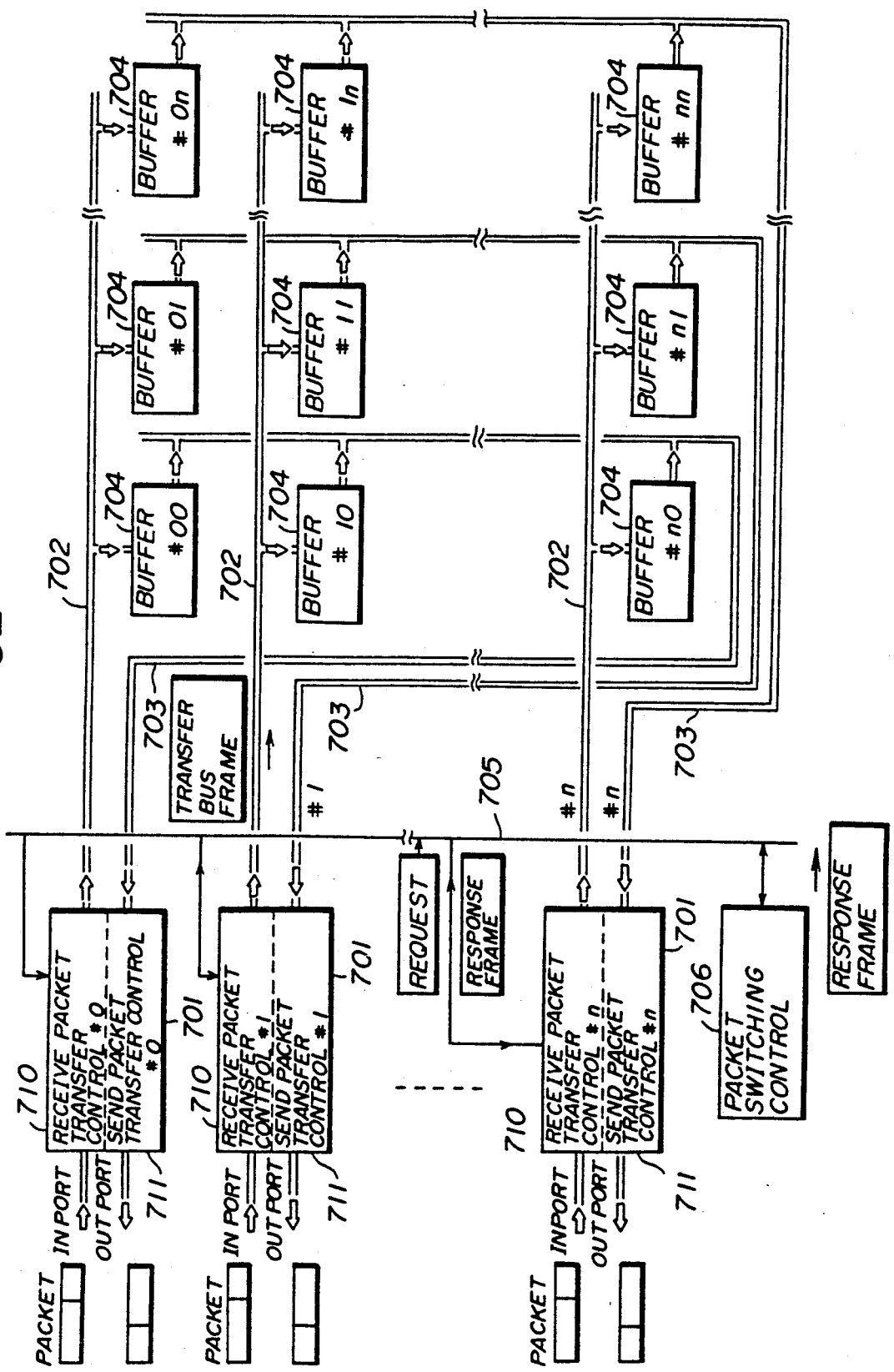
FIG. 32 is a block diagram of a packet switch system according to a fifth preferred embodiment of the present invention.

FIG. 32 is a block diagram of a general structure of the packet switching system according to the fifth embodiment of the present invention. The system in FIG. 32 includes packet transfer controllers 701, input packet transfer buses 702, output packet transfer buses 703, transfer buffers 704, a control bus 705 and a packet switching controller 706. Each of the packet transfer controller 701 is composed of a receive packet transfer controller 710 and a send packet transfer controller 711. The control bus 705 connects the receive packet transfer controllers 710 and packet switching controller 706. The packet switching controller 706 executes a transfer control in response to a transfer request from each of the receive packet transfer controllers 710.

During operation, a packet from a terminal or an interface circuit (not shown) is input to a corresponding one of the packet transfer controllers 701, and is temporarily stored in the receive packet transfer controller 710 thereof. The receive packet transfer controller 710 being considered generates a transfer request frame when the packet is input thereto and status information from the paired send packet transfer controller 711 is input thereto. The generated transfer request frame is supplied to the packet switching controller 706 through the control bus 705. The transfer request frame is composed of a packet transfer controller identification number, transfer request information representative of the address of a destination send packet transfer controller 711, requested packet frame number information and status information about the send packet transfer controller 711 paired with the receive packet transfer controller being considered.

When the packet switching controller 706 receives the transfer request frame from one of the receive packet transfer controllers 710, the packet switching controller 706 analyzes the transfer request information and status of each of the send packet transfer controllers 711, and determines a timing at which the packet can be transferred. The determination result is sent, as response frame, to the receive packet transfer controller 710 being considered. The receive packet transfer controller 710 detects the response frame and sends the transfer request frame and packet information to the corresponding input packet transfer bus 702. The transfer request frame is analyzed by each of all the transfer buffers 704 connected to the input packet transfer bus 702 being considered, and it is determined whether or not the transfer request information contained therein indicates the send packet transfer controller 711 connected to its own. When the determination result is affirmative, the transfer buffer 704 inputs the packet information. The other transfer buffers 704 do not input the packet information.

Each of the send packet transfer controllers 711 inquires, at a predetermined period, each of the related transfer buffers 704 via the corresponding the output packet transfer bus 703 whether or not there is any packet to be transferred. When the determination result is affirmative, the the send packet transfer controller 711 instructs the transfer buffer 704 being considered to output the packet. The send packet transfer controller 711 receives the packet from the transfer buffer 704 being considered, and outputs the same to a corresponding output bus via its own output port.

A description will be given of a detailed structure of each receive packet transfer controller 710 with respect to FIG. 33. A receiver 720 receives a packet passing through an input port. A packet header latch circuit 721 latches a packet header of the packet. A packet division number counter 722 determines how many packet frames are necessary to transfer the received packet. A receive packet buffer 723 receives the received packet. A driver 724 transfers the packet in the receive packet buffer 723 to the corresponding input packet transfer bus 702. A controller 725 controls the overall operation of the receive packet transfer controller 710 and generates timing information and timing signals HD-LATCH, COUNT-ENB, WR and REQ-GEN. A clock circuit 726 derives a clock signal from a synchronizing signal SYNC. The controller 725 generates the timing signals from the clock signal supplied from the clock circuit 726. A transfer request generating circuit 727 generates transfer request information placed in the transfer request frame, which is to be sent to the control bus 705. A transfer timing generating circuit 728 generates a timing signal used for outputting the received packet to the input packet transfer bus 702 from the receive packet buffer 723 via the driver 724. A register 729 generates the transfer request frame from the transfer request information and status information. A driver 730 sends the transfer request frame to the control bus 705. The synchronizing signal SYNC is also supplied to the send packet transfer controllers 711, the transfer buffers 704 and the packet switching controller 706.

The operation of the receive packet transfer controller shown in FIG. 33 will be described below. The receiver 702 receives a packet through the input port, and supplies the same to the packet header latch circuit 721, the packet division number counter 722, and the receive packet buffer 723. The packet header latch circuit 721 latches the packet header contained in the packet in response to the timing signal HD-LATCH from the controller 725. The packet information of the packet is written into the receive packet buffer 723 in response to the timing signal WR from the controller 725. The packet division number counter 722 determines, in response to the timing signal COUNT-ENB from the controller 725, how many packet frames correspond to the length of the packet. As has been described previously, one packet frame is a unit of transfer.

The packet header in the packet header latch circuit 721 is analyzed by the transfer request generating circuit 727, which generates information on the destination terminal in response to the timing signal REQ-GEN from the controller 725. That is, the information indicates the send packet transfer controller 711 which is connected to the destination terminal. On the other hand, information about the number of packet frames is sent to the transfer request generating circuit 727. Then the transfer request frame generating circuit 727 generates transfer request information from the information about the destination and the number of packet frames. The transfer request information is added to the status information from the paired send packet transfer controller 711 in the register 729 so that the transfer request frame is formed.

FIG. 34-(A) shows a format of the transfer request frame which is transferred on the control bus 705. As shown, the transfer request frame is composed of a packet transfer controller identification number, status information transfer request information and requested packet frame number information. As has been described previously, the transfer request information indicates the send packet transfer controller 711 to which the packet is to be transferred, and the requested packet frame number information indicates the number of packet frames necessary to transfer the packet.

FIG. 34-(B) shows a format of the response frame on the control bus 705. The response frame is composed of a packet transfer control identification number and response information. The response information indicates whether or not transfer permission has been issued.

FIG. 34-(C) shows a format of a transfer bus frame on the input or output packet transfer bus 702 or 703. The transfer bus frame is composed of continuation information and packet information. As has been described previously with respect of the third embodiment of the present invention, the continuation information indicates whether or not there is a packet frame which follows the packet frame being considered. The packet frames obtained by dividing the input packet are successively transferred. The continuation information is one-bit data. When a packet input to the receive packet transfer controller 710 can be formed by a single frame, the continuation information indicates that there is no packet frame following its own.

Figure 33:
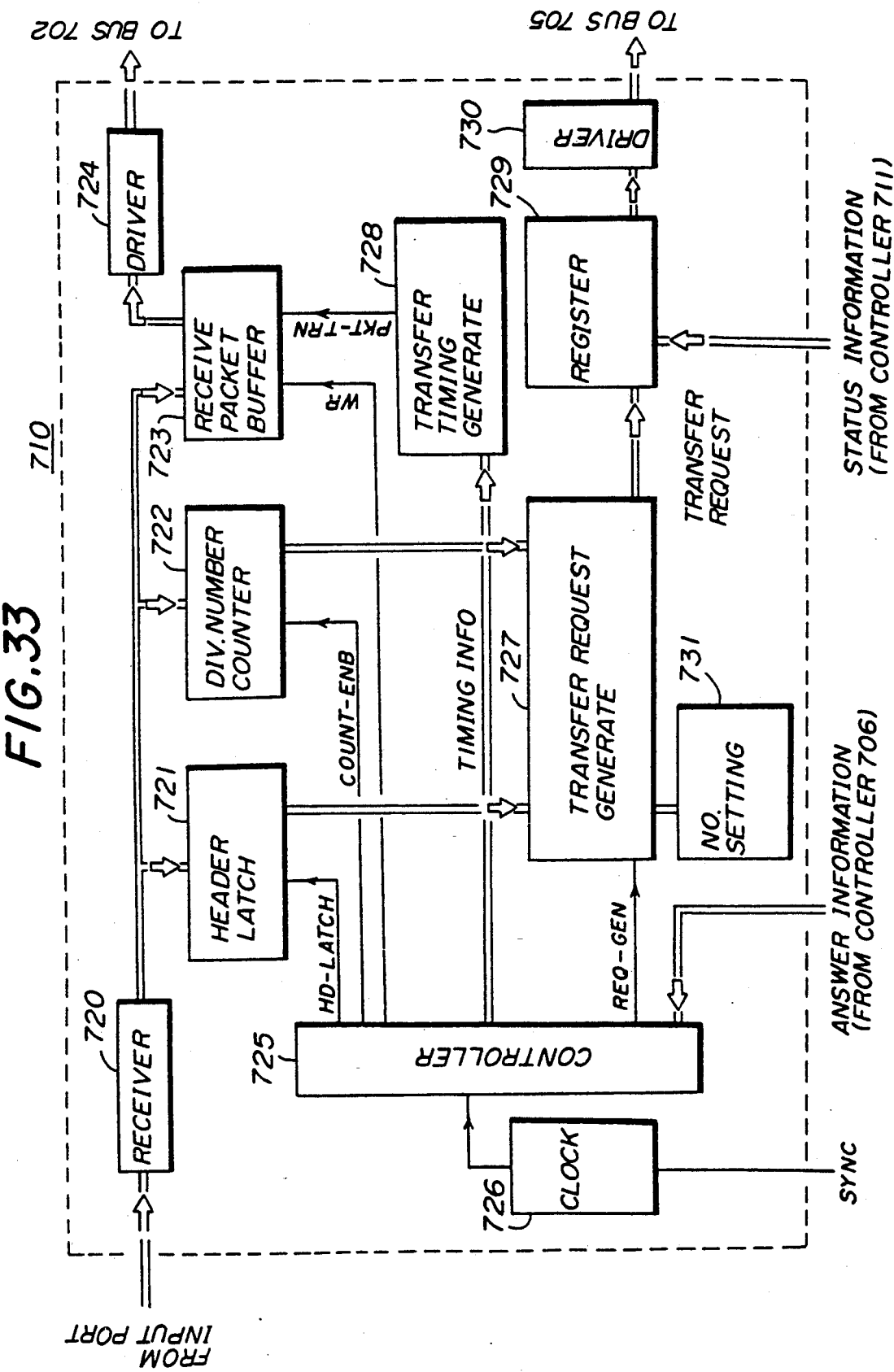
FIG. 33 is a block diagram of a receive packet transfer controller used in the packet switching system shown in FIG. 32.

Turning to FIG. 33, upon receiving the response information from the packet switching controller 706 (FIG. 32), the controller 725 analyzes the same. When the response information indicates that the packet is permitted to be transferred, the controller 725 sends the timing information to the transfer timing generating circuit 728. When the transfer timing with which a corresponding packet in the receive packet buffer 723 is output is obtained, the transfer timing generating circuit 728 sends a transfer permission timing signal PRT-TRN to the receive packet buffer 723. Then the transfer bus frame shown in FIG. 34-(C) is sent to the input packet transfer bus 702 via the driver 724. The above-mentioned operation is repeatedly carried out at the predetermined period on the basis of the clock signal from the clock circuit 726.

Figure 35:
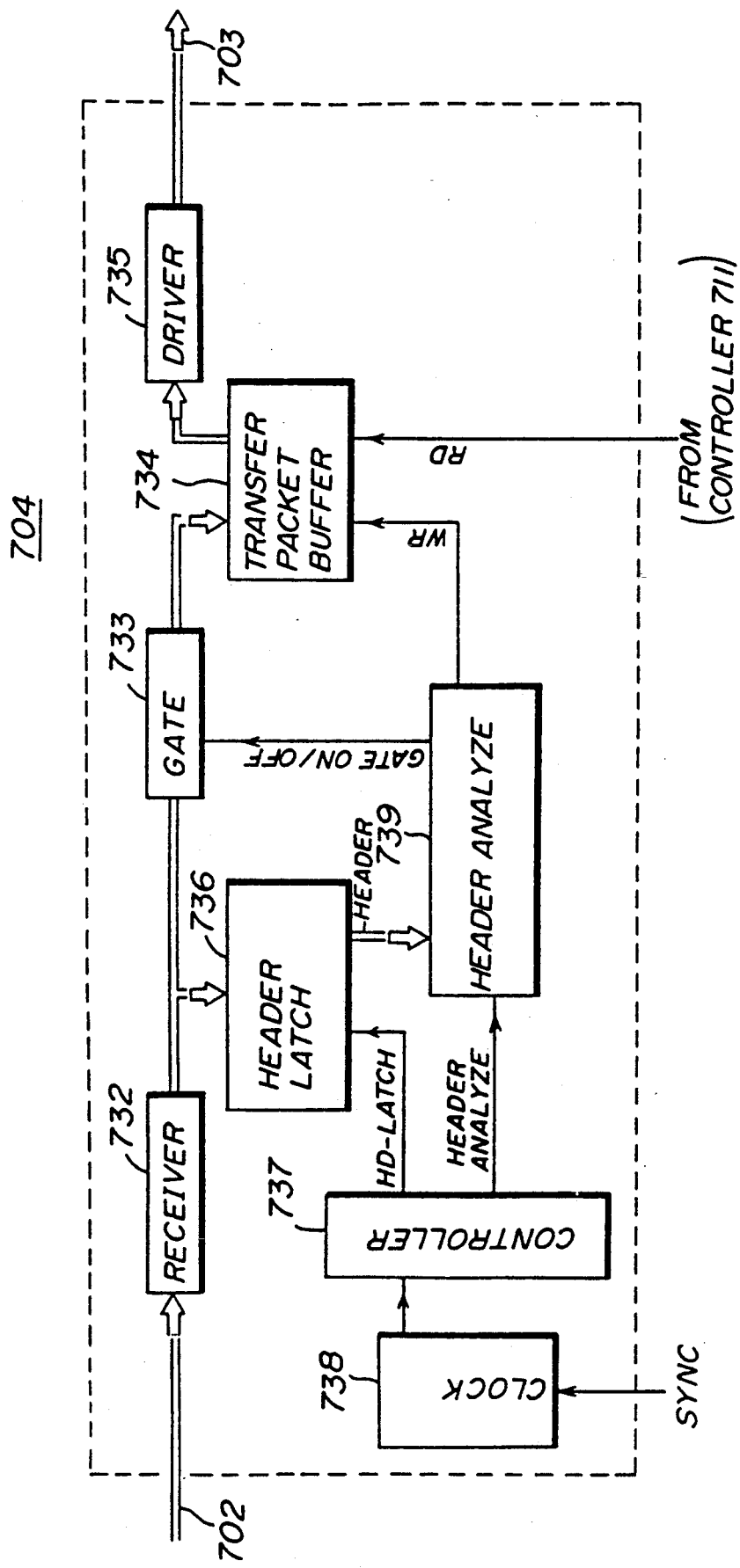
FIG. 35 is a block diagram of a transfer buffer used in the packet switching system shown in FIG. 32.

A description will now be given of a detailed structure of each transfer buffer 704 with reference to FIG. 35. A receiver 732 receives the transfer bus frame (FIG. 34-(C)) from the corresponding input packet transfer bus 702. A gate circuit 733 determines whether or not the transfer bus frame is input to its own buffer. A transfer packet buffer 734 stores the received packet passing through the receiver 732 and the gate circuit 733. A driver 735 outputs the packet in the transfer packet buffer 734 to the corresponding output packet transfer bus 703. A packet header latch circuit 736 latches the packet header contained in the packet information of the transfer bus frame (FIG. 34-(C)). A controller 737 controls the overall operation of the transfer buffer 704 and generates timing signals. A clock circuit 738 generates a clock signal from the synchronizing signal SYNC. A packet header analyzing circuit 739 analyzes the packet header latched in the packet header latch circuit 736 and determines whether or not the transfer bus frame should be input to the transfer packet buffer 734.

During operation, the packet header latch circuit 736 latches the packet header in the packet information of the transfer bus frame in response to timing signal HD-LATCH from the controller 737. Then the packet header is supplied to the packet header analyzing circuit 739, which determines, in response to the corresponding timing signal, whether or not the destination address represented by the packet header indicates the send packet transfer controller to which its own is connected through the output packet transfer bus 703. The determination result is supplied, as a gate ON/OFF signal, to the gate circuit 733. The gate circuit 733 is closed when the determination result obtained by the packet header analyzing circuit 739 is negative. On the other hand, the gate circuit 733 is opened when the determination result is affirmative. The transfer bus frame passes through the gate circuit 733 and is then written into the transfer packet buffer 734 in synchronism with a write signal WR supplied from the packet header analyzing circuit 739. A read signal RD is supplied from the paired send packet transfer controller 711. In response to the read signal RD, the transfer bus frame is read out from the transfer packet buffer 734 and supplied to the corresponding output packet transfer bus 703 via the driver 735.

Figure 36:
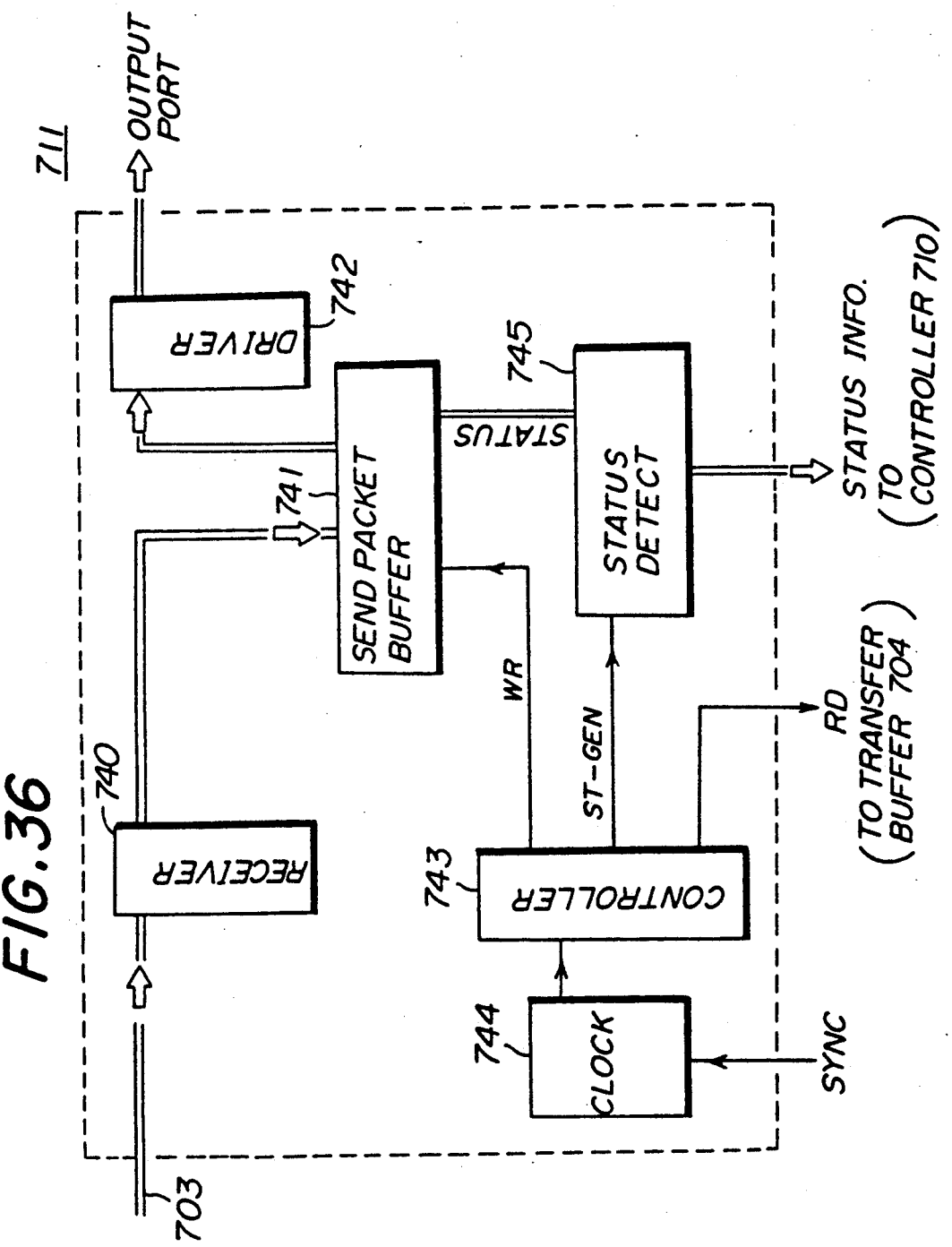
FIG. 36 is a block diagram of a send packet transfer controller used in the packet switching system shown in FIG. 32.

A detailed structure of each send packet transfer controller 711 will be described with reference to FIG. 36. The transfer bus frame on the corresponding output packet transfer bus 70 is received by a receiver 740. A send packet buffer 741 stores the transfer bus frame. A driver 742 sends the transfer bus frame to the corresponding output port (not shown). A controller 743 controls the entire operation of the send packet transfer controller 711 and generates timing signals WR, ST-GEN and RD. The read signal RD is sent to the transfer packet buffer 734 of the transfer buffer 704 (FIG. 35). A clock circuit 744 generates a timing signal from the synchronizing signal SYNC. A status detecting circuit 745 monitors the send packet buffer 741 and detects the status of a load on the send packet buffer 741. The detected status information is periodically sent, as status information, to the register 729 of the receive packet transfer controller 710 (FIG. 33).

Figure 37:
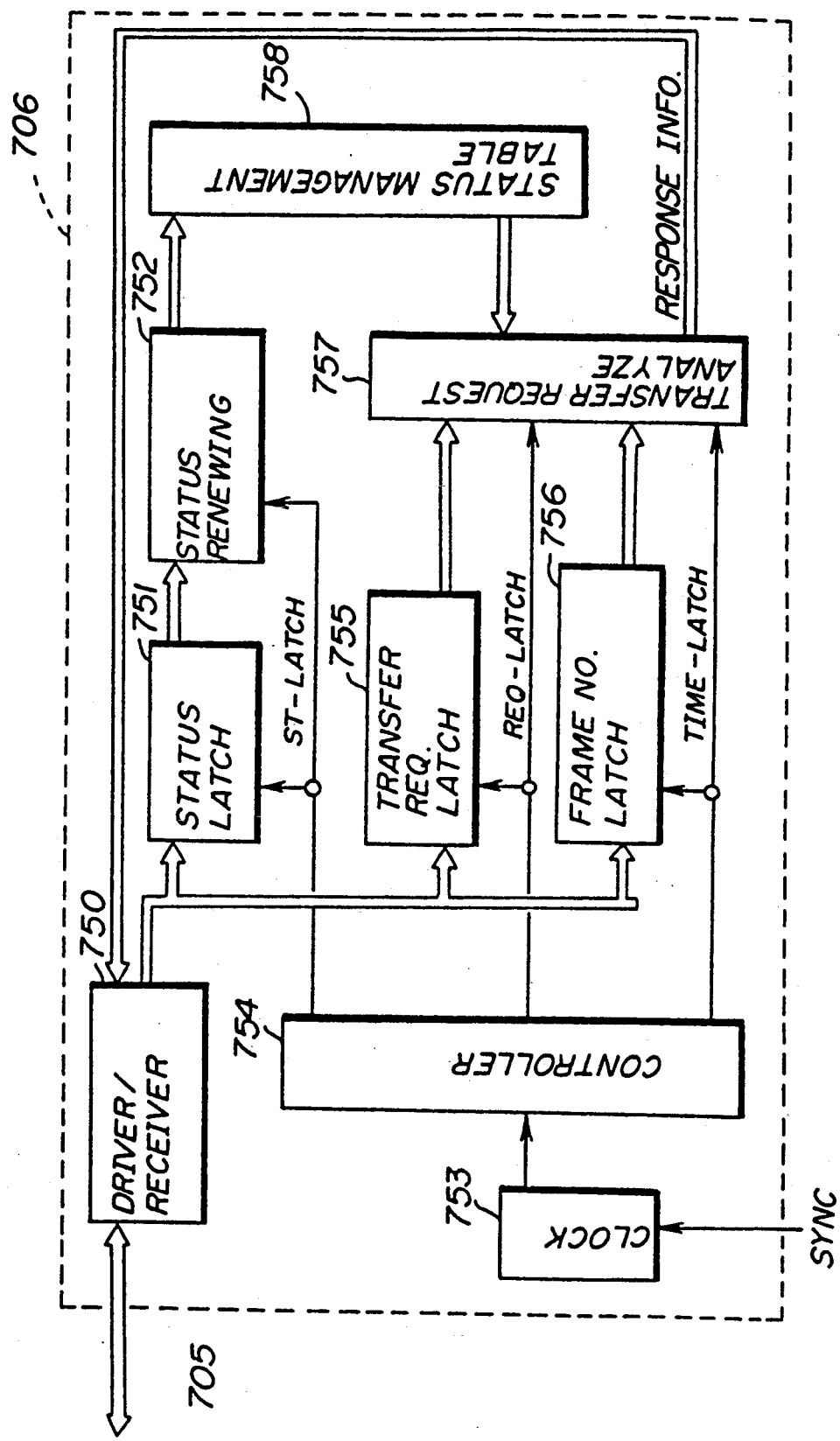
FIG. 37 is a block diagram of a packet switching controller used in the packet switching system shown in FIG. 32.

A description will be given of a detailed structure of the packet switching controller 706 (FIG. 32) with reference to FIG. 37. A driver/receiver 750 is connected to the control bus 705, and exchanges control information with each of the packet transfer controllers 701. The packet switching controller 706 periodically accesses the packet transfer controllers 701 by poling. The transfer request frame is transferred on the control bus 706 and then received by the driver/receiver 750. A controller 754 generates three timing signals ST-LATCH, REQ-LATCH and TIME-LATCH, which are supplied to a status latch circuit 7512, a transfer request latch circuit 755 and a requested packet frame number latch circuit 756, respectively. The transfer request frame is supplied to the latch circuits 751, 755 and 756. The status latch circuit 751 latches the status information in response to the timing signal ST-LATCH. The transfer request latch circuit 755 latches the transfer request information in response to the timing signal REQ-LATCH. The requested packet frame number latch circuit 756 latches the requested packet frame number information in response to the timing signal TIME-LATCH.

The status information is supplied to a status renewing circuit 752, which renews the contents of a status management table 758 in response to the timing signal ST-LATCH. Status information related to all of the send packet transfer controllers 711 is stored in the status management table 758. The status of a send packet transfer controller changes, the related status information is renewed.

The transfer request information and the requested packet frame number information are supplied to a transfer request analyzing circuit 757 from the latch circuits 755 and 756. Then the transfer request analyzing circuit 757 generates response information, depending on the status of the destination send packet transfer controller 711 indicated by the status management table 758. The generated response information is sent to the receive packet transfer controller 710 which generated the transfer request being considered through the driver/receiver 750 and the control bus 705. The transfer request analyzing circuit 757 determines the timing at which it is possible to start to transfer a series of packet frames by referring to the status of the send packet transfer controller 711 related to the transfer request being considered. If it is impossible to start to transfer a series of packet frames, the transfer request analyzing circuit 757 generates response information indicating that the packet is not permitted to be transferred. Alternatively, no response information is generated.

The present invention is not limited to the specifically described embodiments, and variations and modifications may be made without departing from the scope of the present invention.

What is claimed is:
1. A packet switching system, comprising:
   a plurality of input packet transfer buses;
   a plurality of output packet transfer busses being arranged in a matrix with said input packet transfer buses;
   a plurality of transfer means for transferring packets, one at a time, from one of said input packet transfer buses to one of said output packet transfer buses;
   a plurality of packet receiving means for receiving an input packet to be switched, each of said packet receiving means provided for one of said input packet transfer buses and including at least two packet buffers capable of storing the input packet;
   queue management means, coupled to said plurality of packet receiving means, for determining when one of said packet buffers of one of said packet receiving means is idle and for storing the input packet in said one of said packet buffers of said one of said packet receiving means when idle;
   selecting means for selecting, in response to a select signal, one of said packet buffers in one of said packet receiving means and for transferring the input packet to a corresponding one of said output packet transfer buses, the corresponding one of the output packet transfer buses to be used for a next packet transfer cycle in response to the select signal; and
   control means, operatively coupled to said packet receiving means and said selecting means, for providing the select signal to said selecting means and controlling said selecting means to transfer only one input packet from said packet receiving means to said corresponding output packet transfer bus via said transfer means during one packet transfer cycle.

2. A packet switching system, comprising:
- a plurality of input packet transfer buses;
- a plurality of output packet transfer buses being arranged in a matrix with said input packet transfer buses;
- a plurality of transfer means for transferring packets, one at a time, from one of said input packet transfer buses to one of said output packet transfer buses;
- a plurality of packet receiving means for receiving an input packet to be switched, provided for one of said input packet transfer buses and including at least two packet buffers capable of storing the input packet;
- queue management means, coupled to said plurality of packet receiving means, for determining when one of said packet buffers of one of said packet receiving means is idle and for storing the input packet in said one of said packet buffers of said one of said packet receiving means when idle;
- selecting means for selecting in response to a select signal, one of said packet buffers in one of said packet receiving means and for transferring the input packet to a corresponding one of said output packet transfer buses used for a next packet transfer cycle in response to the select signal; and
- control means, operatively coupled to said packet buffers and said selecting means, for providing the select signal to said selecting means and controlling said selecting means to transfer only one input packet transferred from said packet receiving means to said corresponding output packet transfer bus via said transfer means during one packet transfer cycle.

3. A packet switching system as claimed in claim 2, wherein said transfer means comprises gate means, provided at a cross point of one of said input packet transfer buses and one of said output packet transfer buses, for passing the input packet from said packet receiving means from said one of said input packet transfer buses without storing the input packet therein and for outputting the input packet to said one of said output packet transfer buses.

4. A packet switching system as claimed in claim 2, wherein said transfer means comprises transfer buffer means, provided at a cross point of one of said input packet transfer buses and one of said output packet transfer buses, for temporarily storing the input packet from said one of the input packet transfer buses and for outputting the input packet to said one of the output packet transfer buses.

5. A packet switching system as claimed in claim 2, wherein said control means determines whether each of said packet buffers has any packet and generates the select signal at the same time as each of said output packet transfer buses carries only one packet transferred from said packet receiving means via said transfer means.

6. A packet switching system as claimed in claim 2, wherein said input packet has a variable length of no more than a predetermined length and each of said at least one packet buffer has a storage capacity corresponding to the predetermined length.

7. A packet switching system, comprising:
- a matrix switch including
  - input packet transfer buses;
  - output packet transfer buses; and
  - a plurality of transfer buffers provided for cross points of said input packet transfer buses and said output packet transfer buses arranged into a matrix, each of said transfer buffers temporarily storing an input packet from a corresponding one of said input packet transfer buses and then outputting, as an output packet, the input packet to a corresponding one of said output packet transfer buses;
- a plurality of packet transfer controllers each connected to a corresponding one of said input packet transfer buses and a corresponding one of said output packet transfer buses, each of said plurality of packet transfer controllers including
  - input packet transfer control means for storing the input packet supplied from an input bus and for sending said input packet to said corresponding one of said input packet transfer buses in accordance with response information; and
  - output packet transfer control means for storing the output packet from said corresponding one of the output packet transfer buses and for sending the output packet to an output bus;
- transfer request frame generating means, provided for each of said packet transfer controllers, for generating a transfer request frame, the transfer request frame including transfer request information indicating whether said input packet transfer control means has any packet requesting to be transferred over said packet switching system, and status information indicating whether said output packet transfer control means paired with said input packet transfer control means is busy; and
- packet switching control means, operatively coupled to said plurality of packet transfer controllers, for receiving the transfer request frame from said transfer request frame generating means and for generating the response information on the basis of the transfer request frame, the response information indicative of a transfer timing with which said input packet transfer control means sends the input packet to said corresponding one of said input packet transfer buses.

8. A packet switching system as claimed in claim 7, wherein said plurality of transfer buffers are grouped into a plurality of groups, each group connected to a corresponding one of said output packet transfer buses;
- wherein said packet switching system further comprises control buses each connected to said transfer buffers included in a corresponding one of said groups; and
- wherein said transfer request frame is sent from said transfer request frame generating means to said packet switching control means through said corresponding one of said input packet transfer buses, said transfer buffers corresponding to said groups and said control buses.

9. A packet switching system as claimed in claim 8, wherein the response information from said packet switching control means is sent to said output packet transfer control means through said control buses, said transfer buffers, and said output packet transfer buses.

10. A packet switching system as claimed in claim 9, wherein each of the plurality of transfer buffers comprises response frame generating means for generating a response frame, the response frame including the response information, and for sending the response frame to a corresponding one of said output packet transfer buses.

11. A packet switching system as claimed in claim 7, wherein said packet switching control means comprises a plurality of divided packet switching controllers, each divided packet switching controller provided for a corresponding one of said output packet transfer buses;
wherein said plurality of transfer buffers are grouped into a plurality of groups, each group connected to a corresponding one of said output packet transfer buses; and
wherein each of said divided packet switching controllers comprises
first means for receiving said transfer request frame from each of said transfer buffers included in a corresponding one of said output packet transfer buses, and
second means for generating the response information to be supplied to said plurality of transfer buffer controllers.

12. A packet switching system as claimed in claim 7, wherein said transfer request frame includes the input packet.

13. A packet switching system as claimed in claim 10, wherein the response frame includes the output packet.

14. A packet switching system as claimed in claim 7, wherein said packet switching control means comprises bit map generating means for generating a first bit map table having the status information about said output packet transfer control means provided in each of said packet transfer controllers and a second bit map table having said transfer request information about said input packet transfer control means provided in each of said packet transfer controllers, and
wherein said packet switching control means generates the response information on the basis of the first bit map table and the second bit map table.

15. A packet switching system as claimed in claim 14, wherein said packet switching control means comprises logic operation means for performing a predetermined logic operation between said first bit map table and said second bit map table.

16. A packet switching system as claimed in claim 7, wherein the response information includes a plurality of flag bits, each flag bit provided for said input packet transfer control means of a corresponding one of said packet transfer controllers, each flag bit having a first value when said input packet transfer control means of said corresponding one of said packet transfer controllers is permitted to send said input packet, and each flag bit having a second value when said input packet transfer control means of said corresponding one of said packet transfer controllers is not permitted to send said input packet.

17. A packet switching system as claimed in claim 7, wherein said output packet transfer control means provided for each of said packet transfer controllers comprises send packet buffers for temporarily storing output packets to be supplied to said output bus; and
wherein said status information indicates whether or not said send packet buffer means is filled with said output packets.

18. A packet switching system comprising:
a matrix switch including
input packet transfer buses;
output packet transfer buses; and
a plurality of transfer buffers provided for cross points of said input packet transfer buses and said output packet transfer buses arranged into a matrix, each of said transfer buffers temporarily storing an input packet from a corresponding one of said input packet transfer buses and then outputting, as an output packet, the input packet to a corresponding one of said output packet transfer buses;
a plurality of packet transfer controllers each connected to a corresponding one of said input packet transfer buses and a corresponding one of said output packet transfer buses, each of said plurality of packet transfer controllers including
input packet transfer control means for storing the input packet supplied from an input bus and for sending the input packet to said corresponding one of said input packet transfer buses in accordance with response information, and
output packet transfer control means for storing the output packet from said corresponding one of said output packet transfer buses and for sending the output packet to an output bus;
transfer request frame generating means, provided for each of said packet transfer controllers, for generating a transfer request frame, the transfer request frame including size information indicative of a number of packet frames obtained by dividing said input packet by a predetermined length, transfer request information indicating whether said input packet transfer control means has any packet requesting to be transferred over said packet switching system, and status information indicating whether said output packet transfer control means paired with said input packet transfer control means is busy; and
packet switching control means, operatively coupled to said plurality of packet transfer controllers, for receiving the transfer request frame from said transfer request frame generating means and for generating the response information on the basis of the transfer request frame, the response information indicative of a transfer timing with which said input packet transfer control means continuously sends the packet frames forming the input packet to said corresponding one of said input packet transfer buses.

19. A packet switching system as claimed in claim 18, wherein said packet switching control means comprises analyzing means for determining, on the basis of the status information, said transfer request information and said size information, whether a duration of time can be obtained to enable said packet frames forming the input packet to be successively transferred.

20. A packet switching system as claimed in claim 18, wherein the transfer request frame includes one of the packet frames and continuation information indicating whether the one of the packet frames is followed by a next transfer request frame which includes another one of the packet frames subsequent to the one of the packet frames.

21. A packet switching system as claimed in claim 18, wherein each of said transfer buffers comprises response frame generating means for generating a response frame including the response information, and the response frame is supplied to said input packet transfer control means.

22. A packet switching system as claimed in claim 21, wherein the response frame includes one of the packet frames and continuation information indicating whether the one of the packet frames is followed by a next response frame which includes another one of the packet frames subsequent to the one of the packet frames.

23. A packet switching system as claimed in claim 18,
wherein said plurality of transfer buffers are grouped into a plurality of groups, each group connected to a corresponding one of said output packet transfer buses;
wherein said packet switching system further comprises control buses, each control bus connected to said transfer buffers belonging to a corresponding one of said groups; and
wherein said transfer request frame is sent from said transfer request frame generating means to said packet switching control means through said corresponding one of the input packet transfer buses, said transfer buffers corresponding to said groups and said control buses.

24. A packet switching system as claimed in claim 18, wherein the response information is sent from said packet switching control means to said packet output transfer controllers through said control buses, said transfer buffers, and said output packet transfer buses.

25. A packet switching system as claimed in claim 18,
wherein said packet switching control means comprises a plurality of divided packet switching controllers, each provided for a corresponding one of said output packet transfer buses;
wherein said plurality of transfer buffers are grouped into a plurality of groups, each group connected to a corresponding one of said output packet transfer buses; and
wherein each of said divided packet switching controllers comprises
first means for receiving the transfer request frame from each of said transfer buffers included in a corresponding one of said output packet transfer buses, and
second means for generating the response information to be supplied to said plurality of transfer buffer controllers.

26. A packet switching system as claimed in claim 18, wherein said input packet transfer control means comprises dividing means for dividing said input packet into said packet frames, each packet frame having a length of at most the predetermined length.

27. A packet switching system comprising:
a matrix switch including
input packet transfer buses;
output packet transfer buses; and
a plurality of transfer buffers provided for cross points of said input packet transfer buses and said output packet transfer buses arranged into a matrix, each of said transfer buffers temporarily storing an input packet from an corresponding one of said input packet transfer buses and then outputting, as an output packet, the input packet to a corresponding one of said output packet transfer buses;
a plurality of bus controllers, each bus controller connected to a corresponding one of said input packet transfer buses and a corresponding one of said output packet transfer buses and connected to an input bus, an output bus and a collection control bus;
a plurality of interface circuits which are tandem-connected to each other and are connected to said input bus and said output bus, each of said interface circuits including status information generating means for generating interface circuit status information indicative of whether any packet requesting is to be switched by said matrix switch and for outputting the status information to said collection control bus;
a plurality of terminals, each terminal provided for a corresponding one of said interface circuits; and
control means, coupled to said bus controllers and said matrix switch, for controlling said matrix switch on the basis of the interface circuit status information supplied from said collection control bus through said bus controllers and a status of said matrix switch so that said input packet passing through said input bus, a corresponding one of said bus controllers and said corresponding one of said input packet transfer buses is transferred to said output bus related to one of said bus controllers through one of said transfer buffers, one of said output packet transfer buses and said one of the bus controllers.

28. A packet switching system as claimed in claim 27,
wherein each of said bus controllers comprises command generating means for generating an interface command which is sent to said interface circuits through said collection control bus;
wherein each of said interface circuits comprises response generating means for generating a response having the status information of each of said interface circuits at a predetermined position in response to the interface command and for outputting the response to said collection control bus.

29. A packet switching system as claimed in claim 28, wherein the response includes the status information about a corresponding one of said interface circuits.

30. A packet switching system as claimed in claim 29,
wherein said response generating means receives the response, supplied from one of said interface circuits positioned on a downstream side of said collection control bus, and writes the interface circuit status information in the response, and
wherein said response generating means outputs the response to one of said interface circuits positioned on an upstream side of said collection control bus close to said bus controllers.

31. A packet switching system as claimed in claim 27, wherein each of said bus controllers comprises:
input bus controller means for storing the input packet supplied from said input bus and for sending the input packet to said corresponding one of said input packet transfer buses in accordance with response information;
output bus controller means for storing the output packet from said corresponding one of said output packet transfer buses and for sending the output packet to said output bus;
transfer request frame generating means for generating a transfer request frame including transfer request information indicating whether said input bus controller means has any packet requesting to be transferred to a destination which is one of said terminals and status information indicating whether said output packet transfer control means corresponding to said input packet transfer control means is busy; and packet switching control means for receiving the transfer request frame from said transfer request frame generating mean and for generating, on the basis of the transfer request frame, the response information indicative of a transfer timing with which said provided input bus controller means sends the input packet to said corresponding one of said input packet transfer buses.

32. A packet switching system as claimed in claim 31, wherein each of said bus controllers comprises timing generating means for determining, on the basis of the interface circuit status information and a status of the matrix switch, a timing with which said output packet is sent through said output bus to said destination which is one of said terminals.

33. A packet switching system comprising:
a matrix switch including
input packet transfer buses;
output packet transfer buses; and
a plurality of transfer buffers provided for cross points of said input packet transfer buses and said output packet transfer buses arranged into a matrix, each of said transfer buffers temporarily storing an input packet from a corresponding one of said input packet transfer buses and then outputting, as an output packet, the input packet to a corresponding one of said output packet transfer buses;
a plurality of packet transfer controllers each connected to a corresponding one of said input packet transfer buses and a corresponding one of said output packet transfer buses, each of said plurality of packet transfer controllers including
input packet transfer control means for storing said input packet supplied from an input bus and for sending said input packet to said corresponding one of said input packet transfer buses in accordance with response information; and
output packet transfer control means for storing the output packet from said corresponding one of said output packet transfer buses and for sending the output packet to an output bus;
transfer request frame generating means, provided for each of said packet transfer controllers, for generating a transfer request frame, the transfer request frame including transfer request information indicating whether said input packet transfer control means has any packet requesting to be transferred over said packet switching system, and status information indicating whether or not said output packet transfer control means paired with said input packet transfer control means is busy;
a control bus coupled to said transfer request frame generating means provided for each of said packet transfer controllers; and
packet switching control means, operatively coupled to said plurality of packet transfer controllers and said control bus, for receiving the transfer request frame from said transfer request frame generating means through said control bus and for generating the response information on the basis of the transfer request frame, the response information indicative of a transfer timing with which said input packet transfer control means sends the input packet to said corresponding one of said input packet transfer buses, the response information being sent to said transfer request frame generating means through said control bus.

34. A packet switching system as claimed in claim 33, wherein said transfer request frame generating means generates the transfer request frame before the input packet requesting to be transferred is sent to said corresponding one of said input packet transfer buses.

35. A packet switching system as claimed in claim 33, wherein when the response information is supplied to said transfer request frame generating means, said transfer request frame generating means generates the transfer request frame to include the input packet.

36. A packet switching system as claimed in claim 33, wherein each of said packet transfer controllers comprises:
packet dividing means for dividing the input packet into a plurality of packet frames each having a length of at most a predetermined length; and
counter means for counting a number of the packet frames, the transfer request frame including information indicating the number of the packet frames; and
wherein said packet switching control means comprises analyzing means for determining, on the basis of the status information, the transfer request information and the information indicating the number of the packet frames forming the input packet, whether a duration of time can be obtained to enable said packet frames forming said input packet to be successively transferred.

37. A packet switching system as claimed in claim 36, wherein the transfer request frame includes one of the packet frames and continuation information indicating whether the one of the packet frames is followed by a next transfer request frame which includes another one of the packet frame subsequent to the one of the packet frames.

38. A packet switching system as claimed in claim 37, wherein the response frame includes one of the packet frames and continuation information indicating whether the one of the packet frames is followed by a next response frame which includes another one of the packet frames subsequent to the one of the packet frames.

39. A packet switching method for transferring an input packet from one of a plurality of packet receiving means each including at least two packet buffers, over one of a plurality of input packet transfer buses to one of a plurality of output packet transfer buses via a transfer means, said method comprising the steps of:
(a) receiving an input packet to be switched;
(b) determining if one of the packet buffers of one of the packet receiving means is idle;
(c) storing the input packet received in said step (a) in the one of the packet buffers determined in said step (b) to be idle;
(d) selecting, in response to a select signal, one of the packet buffers;
(e) transferring to a corresponding one of the output packet transfer buses the input packet stored in the packet buffer selected in step (d); and
(f) providing the select signal for controlling the transferring in said step (e) of only one input packet from the packet receiving means to a corresponding of the output packet transfer buses during one packet transfer cycle.

40. A method according to claim 39, wherein the selecting in said step (d) is performed at the same time as said receiving, determining and storing in steps (a) through (c).

41. A method according to claim 39, wherein the transferring in said step (e) comprises the steps of:
 (e1) transferring to the one of the input packet transfer buses, the input packet stored in the packet buffer selected in said step (d);
 (e2) temporarily storing the input packet in the transfer means; and
 (e3) transferring to the corresponding one of the output packet transfer buses the input packet temporarily stored in step (e2).

42. A packet switching method for transferring an input packet from one of a plurality of receive packet buffers, through one of a plurality of transfer buffers to a selected one of a plurality of send packet buffers, said method comprising the steps of:
 (a) receiving an input packet over an input bus;
 (b) storing in a receive packet buffer the input packet received in said step (a);
 (c) generating from the receive packet buffer a transfer request frame indicating that the receive packet buffer is ready to send the input packet stored therein in said step (b);
 (d) determining if a corresponding send packet buffer, corresponding to the receive packet buffer storing the input packet in said step (b), is idle;
 (e) generating response information, indicative of a transfer timing of the input packet from the receive packet buffer to one of the transfer buffers and to one of the send packet buffers, based on the transfer request frame generated by the receive packet buffer in said step (c) when the corresponding send packet buffer is determined to be idle in said step (d);
 (f) transferring the input packet from the receive packet buffer to a transfer buffer over an input packet transfer bus in accordance with the response information generated in said step (e); and
 (g) transferring the input packet from the transfer buffer to one of the send packet buffers over an output packet transfer bus in accordance with the response information generated in said step (e).

43. A method according to claim 42, further comprising the step of (h) temporarily storing the input packet in the transfer buffer before transferring in said step (g) and after transferring in said step (f).

44. A method according to claim 43, wherein said transferring in said steps (f) and (g) transfers the input packet as a plurality of divided packets, each divided packet being transferred one at a time.

45. A method according to claim 44, wherein said generating said in step (c) generates a transfer request frame indicating a requested one of the divided packets.

46. A method according to claim 42, wherein said transferring in said steps (f) and (g) transfers the input packet as a plurality of divided packets, each divided packet being transferred one at a time.

* * * * *

UNITED STATES PATENT AND TRADEMARK OFFICE
CERTIFICATE OF CORRECTION

PATENT NO. :   5,140,582
DATED      :   August 18, 1992
INVENTOR(S) :  MITSURO TSUBOI et al.

It is certified that error appears in the above-identified patent and that said Letters Patent is hereby corrected as shown below:

Title Page [73] (Assignee) "Dawasaki" should be --Kawasaki--;

item [22] (Filing Date) "1991" should be --1990--.

Col. 6, line 44, "frame frame" should be --frame--.
Col. 7, line 67, "switching" should be deleted.
Col. 25, line 48, "illustrate" should be --illustrates--.
Col. 41, line 59 (claim 17), "buffers" should be --buffer means--.
Col. 43, line 58 (claim 27), "an" should be --a--. (second occurrence).

Signed and Sealed this

First Day of February, 1994

Attest:

BRUCE LEHMAN

*Attesting Officer*     *Commissioner of Patents and Trademarks*